United States Patent
Takeda et al.

[19]

[11] Patent Number: 5,926,244
[45] Date of Patent: Jul. 20, 1999

[54] LIQUID CRYSTAL DISPLAY

[75] Inventors: Arihiro Takeda; Yoshio Koike, both of Kawasaki, Japan

[73] Assignee: Fujitsu Limited, Kawasaki, Japan

[21] Appl. No.: 08/895,948

[22] Filed: Jul. 17, 1997

[30] Foreign Application Priority Data

Dec. 26, 1996 [JP] Japan .................................. 8-347767

[51] Int. Cl.⁶ .................................................. G02F 1/1343
[52] U.S. Cl. ........................................... 349/139; 349/141
[58] Field of Search ................................... 349/139, 141, 349/142, 143, 144, 146, 147

[56] References Cited

U.S. PATENT DOCUMENTS

| | | | |
|---|---|---|---|
| 5,434,690 | 7/1995 | Hisatake et al. | 349/144 |
| 5,646,705 | 7/1997 | Higuchi et al. | 349/143 |
| 5,666,179 | 9/1997 | Koma | 349/143 |

*Primary Examiner*—William L. Sikes
*Assistant Examiner*—James Dudek
*Attorney, Agent, or Firm*—Greer, Burns & Crain, Ltd.

[57] ABSTRACT

Liquid crystal 20 is sealed between a first substrate 10 and a second substrate 16 opposed each other. A first electrode 12 is formed on the first substrate 10 at a prescribed position in a prescribed region. A second electrode 18 is formed on the second substrate 16 at a position offset with respect to the first electrode 12 in the prescribed region. When a voltage is applied between the first and second electrodes 12 and 18, the prescribed region is divided in at least two regions of a first region and a second region where application of the voltage to the liquid crystal 20 is different between the two regions. Orientations of the liquid crystal 20 in the first region and that in the second region are different from each other. As a result, a view angle which is equal or larger than that obtained by in-plane switching can be obtained. The first electrode 12 and the second electrode 18 are formed on the substrates 10, 16, which are different from each other, whereby it is not necessary to consider short-circuit between the adjacent electrodes 12, 18. The liquid crystal display device having a large view angle can be fabricated with high yields.

36 Claims, 43 Drawing Sheets

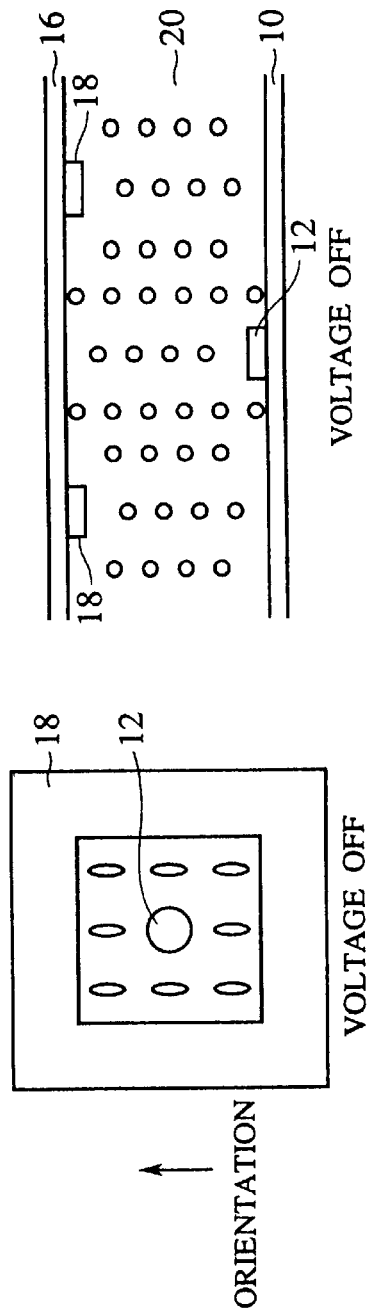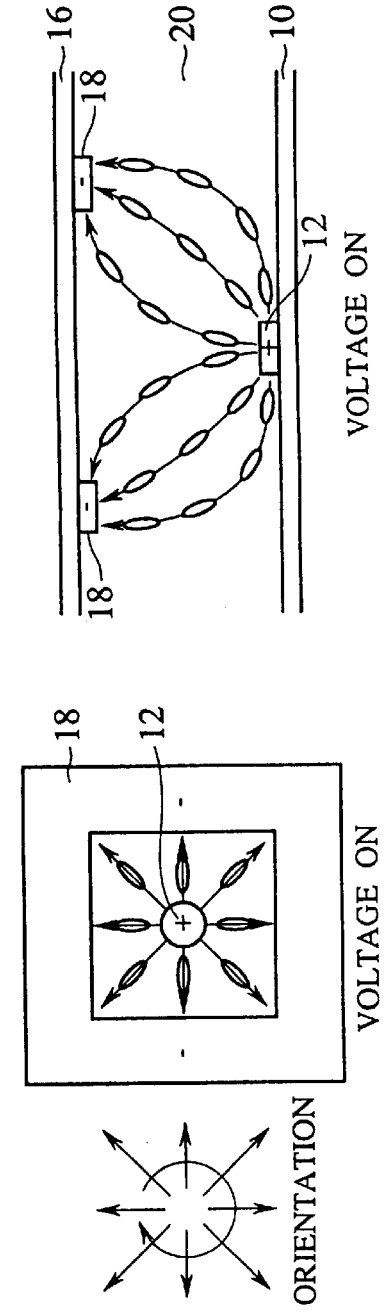

VOLTAGE OFF

VOLTAGE ON
(TWO ORIENTATIONS)

VOLTAGE ON
(ONLY ONE
ORIENTATION)

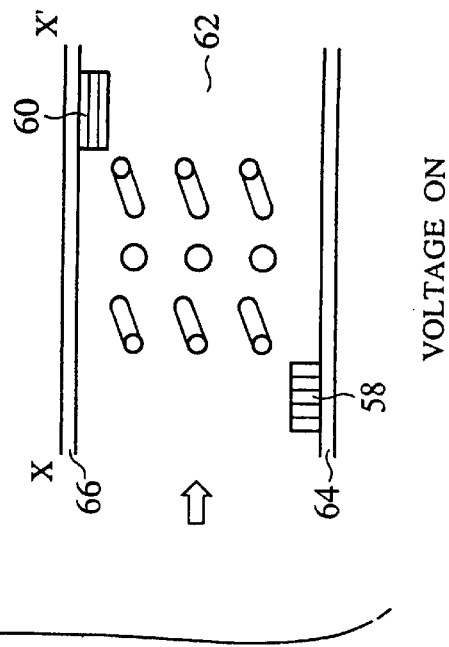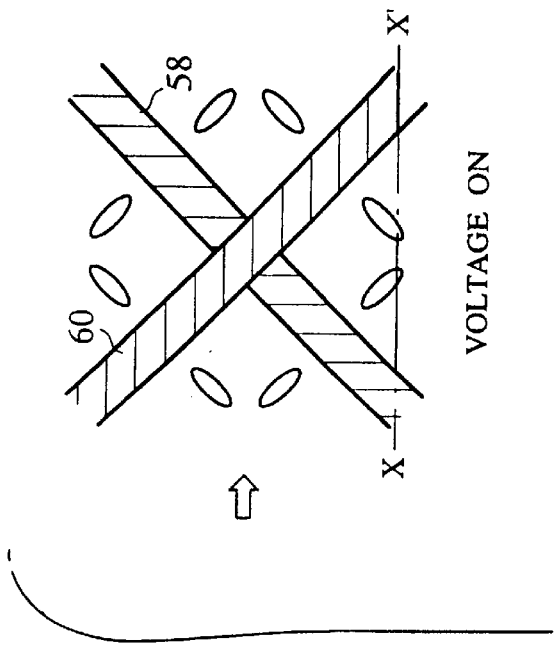
FIG. 18B
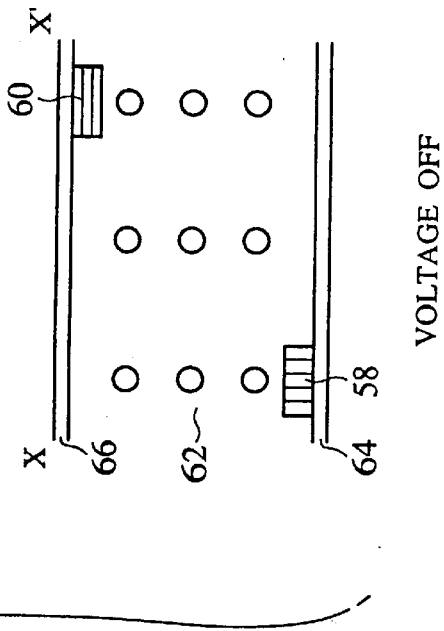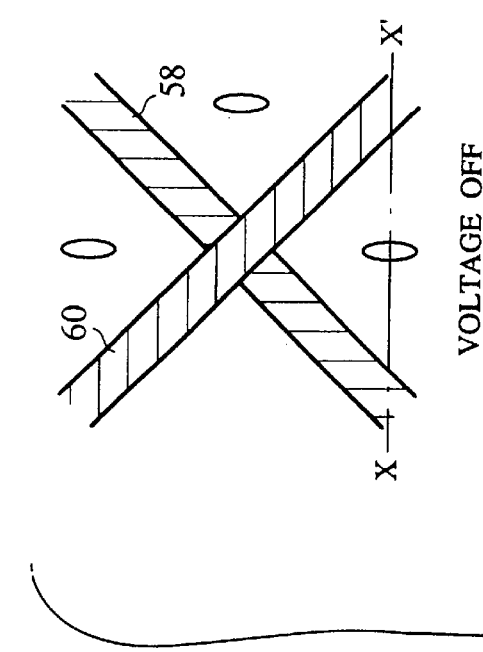
FIG. 18A

INTER-ELECTRODE DISTANCE d (IN FACE DIRECTION): ($\mu$m)

FIG. 31
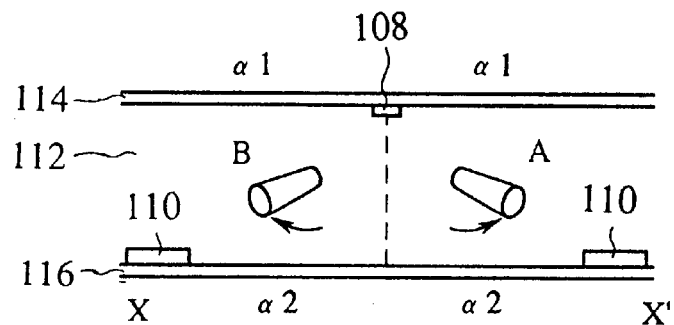
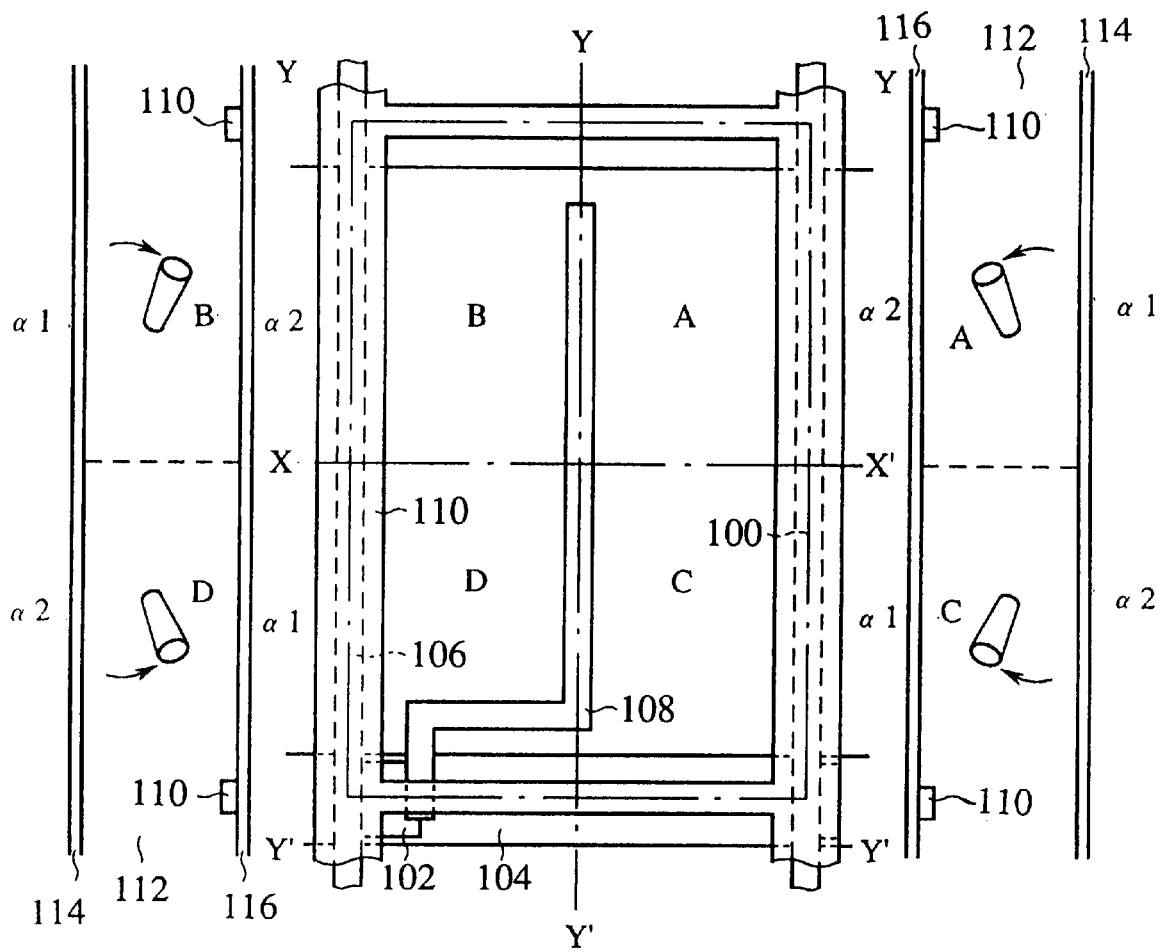
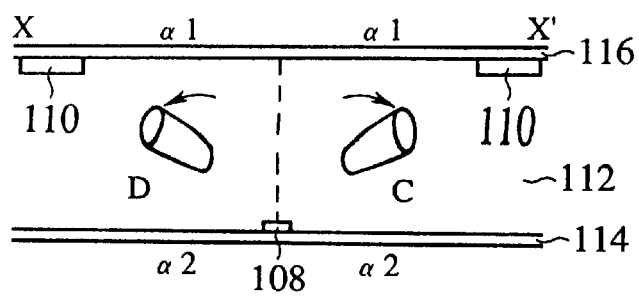

FIG. 35
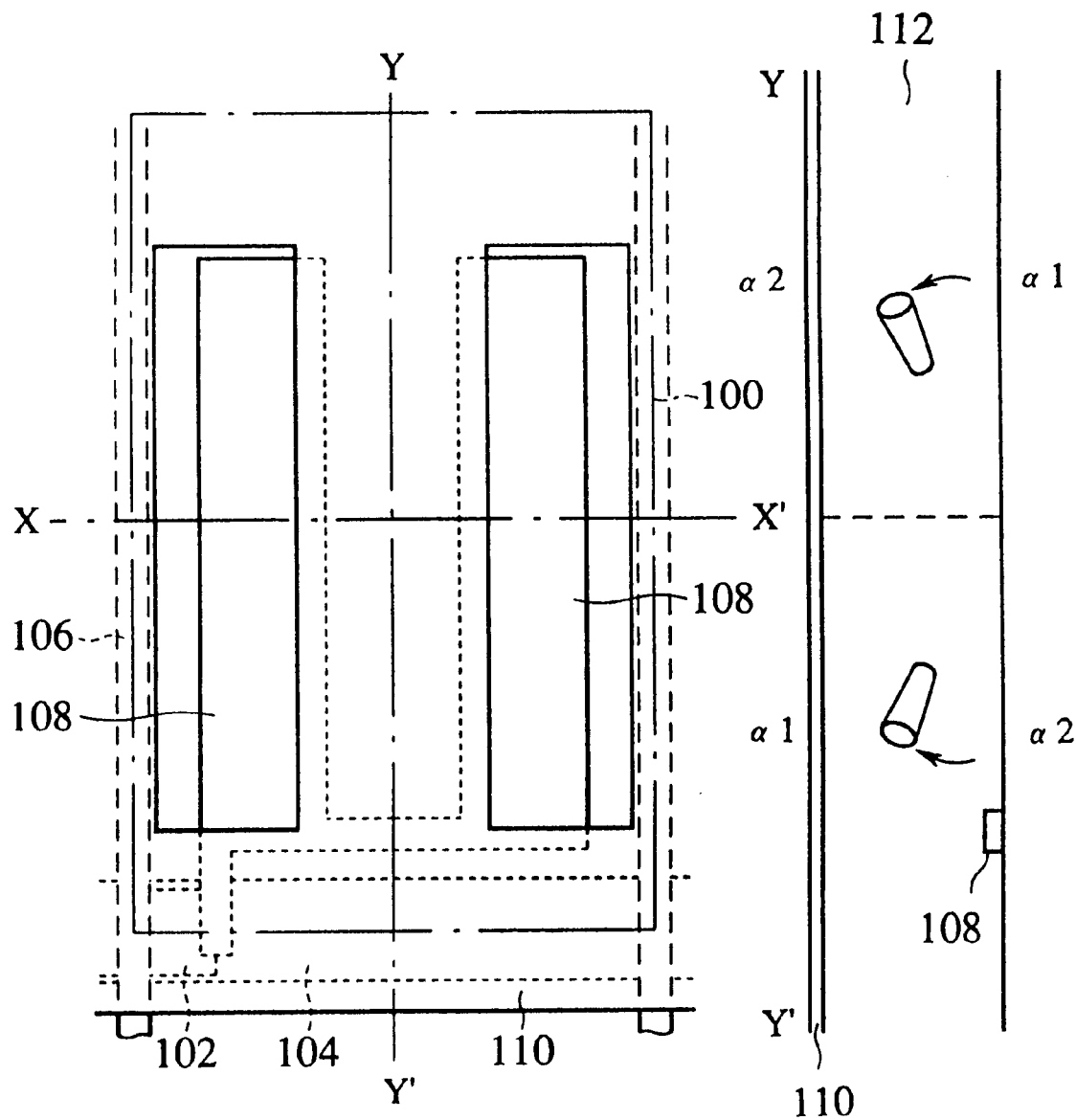
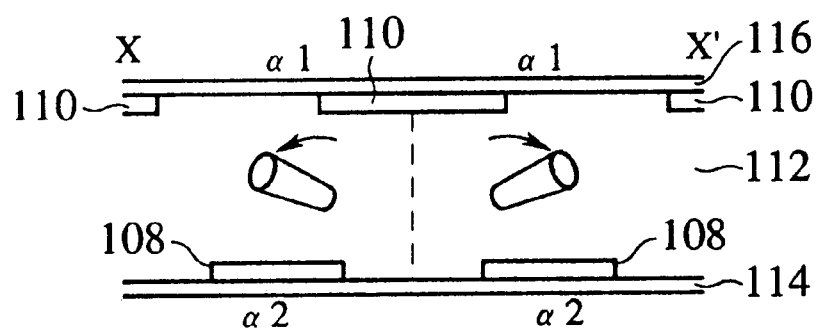

CELL GAP : 5 μm, INTER-ELECTRODE GAP : 8 μm
c=90°

CELL GAP : 5 μm, INTER-ELECTRODE GAP : 8 μm
c=90°

FIG. 42A
(PRIOR ART)
FIG. 42B
(PRIOR ART)
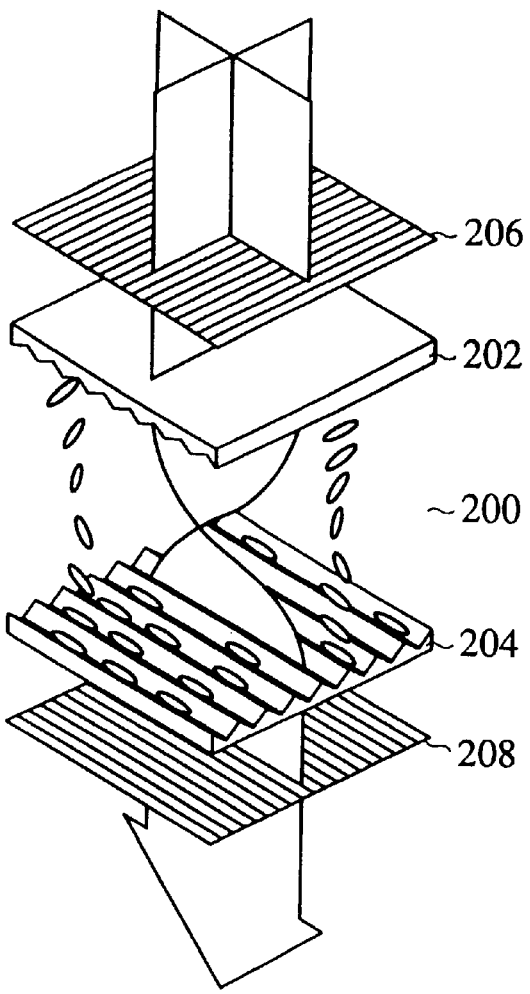
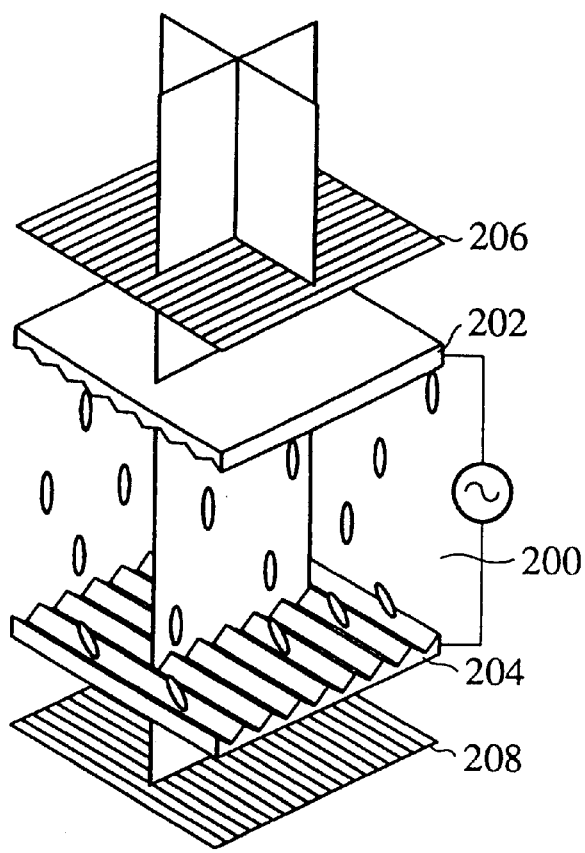

LIQUID CRYSTAL DISPLAY

BACKGROUND OF THE INVENTION

The present invention relates to a liquid crystal display comprising a first substrate and a second substrate opposed to each other, and liquid crystal charged between the first and the second substrates.

The most prospective one of the flat panel displays which are able to replace CRT displays is TFT-LCDs (Thin Film Transistor Liquid Crystal Displays). The TFT-LCDs are expected to expand their market by being applied in civil equipment, such as personal computers, word processors, OA (Office Automation) equipment, portable televisions, etc., and domestic electric equipment.

The fabrication technique of TN (Twisted Nematic) TFT-LCDs has made remarkable progress to have eventually surpassed CRT displays in properties of contrast, color reproducibility, etc.

The currently most popular normally white mode-TN liquid crystal display will be explained with reference to FIG. 42. FIG. 42A shows the state of the display with no voltage applied, and FIG. 42B shows the state of the display with a voltage applied.

An about 5 $\mu$m-thickness TN liquid crystal layer 200 is sandwiched by a pair of glass substrates 202, 204. An orientation direction of oriented films of the glass substrates 202, 204 are offset by 90° with respect to each other. The TN liquid crystal layer 200 is oriented along the orientation directions of the oriented films of the glass substrates 202, 204, and, as shown in FIG. 42A, a direction of liquid crystal molecules are twisted by 90°. A polarizing plate 206 is disposed outside the glass substrate 204 in parallel with the orientation direction of the glass substrate 202. A polarizing plate 208 is disposed outside the glass substrate 204 in parallel with the orientation direction of the glass substrate 204.

In the state in which no voltage is applied to the TN liquid crystal layer 200, as shown in FIG. 42A, light incident on the TN LCD passes the polarizing plate 206 to be linearly polarized light, passes the glass substrate 202 to be incident on the TN liquid crystal layer 200, and is twisted by 90° along the orientation of the TN liquid crystal layer 200. The light which has passed the TN liquid crystal layer 200 passes the glass substrate 204 and passes the polarizing plate 208. The display at this time is bright.

When a voltage is applied to the TN liquid crystal layer 200, as shown in FIG. 42B, the twist of the liquid crystal molecules in the liquid crystal layer 200 vanishes. Light incident on the TN liquid crystal layer 200 advances without twist of the polarizing direction and is blocked by the polarizing plate 208. The display at this time is dark.

Thus, the TN liquid crystal display can control brightness of displays.

However, the TN liquid crystal display has a disadvantage of small field angles. To eliminate this disadvantage, improvements have been proposed using 1) phase difference film, 2) diffusion film, 3) orientation division, 4) random orientation, 5) in-plane switching (IPS), etc.

In the proposal using phase difference film, anisotropy of a refractive index due to an orientation direction of the liquid crystal molecules is compensated by phase difference film. However, this proposal cannot sufficiently improve field angles.

In the proposal using diffusion film, light which has passed the liquid crystal display is diffused to substantially obtain a wider view angle. However, in this proposal widening the view angle lowers display resolution.

In the proposal using orientation division, the liquid crystal is divided in a number of tiny domains, and the tiny domains have different orientations of the liquid crystal molecules to mutually compensate view angle characteristics by the domains. However, this proposal cannot sufficiently improve field angles.

In the proposal using random orientation, an amorphous TN liquid crystal is used to form at random a number of tiny domains having different orientations. However, this proposal does not sufficiently improve the view angle either.

In the proposal using in-plane switching (IPS), two drive electrodes apply an in-plane voltage to one of a pair of substrates sandwiching the liquid crystal, and the voltage application to the drive electrodes is controlled, whereby orientation of the liquid crystal molecules is controlled.

This proposal has been long known as a structure of the liquid crystal displays but is noted because of its good field angle characteristics (Japan Display 95 Digest, p. 707, 1. 995). In this in-plane switching, the liquid crystal molecules change orientation, keeping horizontal to the surfaces of the substrates. Thus the in-plane switching is principally superior in visual characteristics.

However, in the in-plane switching (IPS), two drive electrodes for the voltage application are disposed on one of a pair of substrates sandwiching the liquid crystal, and a resulting short circuit tends to occur between the adjacent electrodes, which makes it difficult to ensure high yields in the fabrication of liquid crystal displays of high precision picture elements.

As shown in FIG. 43A, the drive voltage heavily depends on the thickness of the liquid crystal. For a liquid crystal to be driven, it must have a thickness smaller than a certain thickness. As shown in FIG. 43B, a drive voltage heavily depends on a gap between the electrodes. To drive the liquid crystal, it is necessary to provide a gap larger than a certain value, which hinders micronization.

Since the two drive electrodes are formed on the other substrate, liquid crystal displays having high precision picture elements have extremely low aperture ratios.

SUMMARY OF THE INVENTION

An object of the present invention is to provide a liquid crystal display device having an improved field angle, and a wide field angle.

Another object of the present invention is to provide a liquid crystal display device having a wide field angle which can be fabricated with high yields.

The above-described objects are achieved by the liquid crystal display device according to a liquid crystal display device including a first substrate and a second substrate which are opposed to each other, and a liquid crystal sealed between the first and the second substrates, the liquid crystal display device comprising: a first electrode formed on the first substrate at a prescribed position in a prescribed region; and a second electrode formed on the second substrate at a position which is offset with respect to the first electrode in the prescribed region, when a voltage is applied between the first and the second electrodes, the prescribed region is divided into at least two regions, a first region and a second region where the voltage application to the liquid crystal is different from each other, an orientation of the liquid crystal in the first region and an orientation of the liquid crystal in the second region being different from each other.

In the above-described liquid crystal display device, it is possible that the first electrode is formed on the first substrate within the prescribed region, and the second electrode is formed on the second substrate along an outer edge of the prescribed region.

In the above-described liquid crystal display device, it is possible that the first electrode is formed on the first substrate within the prescribed region, and the second electrode is formed on the second substrate along outer edges of the prescribed region opposed to each other.

In the above-described liquid crystal display device, it is possible that the prescribed region is substantially rectangular, the first electrode is formed on the first substrate along a line traversing the prescribed region, and the second electrode is formed on the second substrate along an outer edge of the prescribed region.

In the above-described liquid crystal display device, it is possible that the prescribed region is substantially rectangular, the first electrode is formed on the first substrate along a line traversing the prescribed region, and the second electrode is formed on the second substrate along outer edges of the prescribed region opposed to each other.

In the above-described liquid crystal display device, it is possible that the device further comprises a third electrode formed on the second substrate between the second electrodes opposed to each other, the first electrode and the third electrode having substantially the same potential, and a voltage is applied between the first and the third electrodes, and the second electrode.

In the above-described liquid crystal display device, it is possible that the device further comprises a third electrode formed on the second substrate at a position enclosed by the second electrodes, the first and the third electrodes have substantially the same potential, and a voltage is applied between the first and the third electrodes, and the second electrode.

In the above-described liquid crystal display device, it is possible that the first electrode is formed on the first substrate along a first line, and the second electrode is formed on the second substrate along a second line intersecting the first line.

In the liquid crystal display device, it is possible that the prescribed region is substantially rectangular, the first electrode is formed on the first substrate along a first line slantly traversing the prescribed region, the second electrode is formed on the second substrate along a second line slantly traversing the prescribed region and intersecting the first line.

In the above-described liquid crystal display device, it is possible that the prescribed region is substantially rectangular, the first electrode is formed on the first substrate along one outer edge of the prescribed region, and the second electrode is formed on the second substrate along a line substantially traversing the substantial center of the prescribed region and intersecting one outer edge.

In the above-described liquid crystal display device, it is possible that the prescribed region is substantially rectangular, the first electrode is formed on the first substrate along a first line traversing the prescribed region and extended substantially in parallel with one outer edge, and the second electrode is formed on the second substrate along a second line traversing the prescribed region and extended substantially perpendicular to the first line.

In the above-described liquid crystal display device, it is possible that on one side of the parting line dividing the first and the second regions, the first substrate is treated for orientation at a first pre-tilt angle while the second substrate is treated for orientation at a second pre-tilt angle larger than the first pre-tilt angle, and on the other side of the parting line dividing the first and the second regions, the first substrate is treated for orientation at a third pre-tilt angle while the second substrate is treated for orientation at a fourth pre-tilt angle smaller than the third pre-tilt angle. When a voltage is applied between the first and the second electrodes, an orientation of the liquid crystal in the first region is different between the two regions divided by the parting line, and an orientation of the liquid crystal in the second region is different between the two regions divided by the parting line.

In the above-described liquid crystal display device, it is possible that the first and the fourth pre-tilt angles are substantially the same, and the second and the third pre-tilt angles are substantially the same.

In the above-described liquid crystal display device, it is possible that the prescribed region is substantially rectangular, the prescribed region is quartered by a boundary line between the first and the second regions and the parting line dividing the first and the second region. When a voltage is applied between the first and the second electrodes, an orientation of liquid crystal in the respective divided regions is radial with respect to the intersection of the boundary line and the parting line.

In the above-described liquid crystal display device, it is possible that the orientation of the liquid crystal is homogeneous, and the orientation of the liquid crystal is substantially parallel with or normal to the direction of the first electrode and/or the second electrode.

In the above-described liquid crystal display device, it is possible that without a voltage applied between the first and the second electrodes, an orientation of the liquid crystal is substantially vertical to the first substrate and/or the second substrate.

In the above-described liquid crystal display device, it is possible that the prescribed region includes an opposed region where the first and the second electrodes are opposed to each other with the liquid crystal therebetween, and a non-opposed region where the first and the second electrodes are not opposed to each other, and where the opposed region is smaller than the non-opposed region.

In the above-described liquid crystal display device, it is possible that when a refractive index anisotropy of the liquid crystal is represented by $\Delta n$, and a thickness of the liquid crystal is represented by d, $\Delta n \times d$ is substantially below 0.5 and above 0.25.

In the above-described liquid crystal display device, it is possible that the prescribed region is a picture element region.

In the above-described liquid crystal display device, it is possible that the first electrode and/or the second electrode is formed of a black matrix layer sealing transmitted light.

In the above-described liquid crystal display device, it is possible that a filter layer is formed on the black matrix layer on the first electrode and/or the second substrate, and the first electrode and/or the second electrode is the black matrix layer exposed in an opening in the filter layer.

A wide view angle equal to or larger than that obtained by in-plane switching (IPS) can be obtained. The first electrode and the second electrode are formed on the different substrates from each other, whereby the liquid crystal display device can have a large view angle and high precision without developing a short-circuit between the adjacent electrodes. The liquid crystal display device has equal view angle characteristics with respect to incident light in all directions, whereby the liquid crystal display device can have a large view angle which is free from horizontal and vertical direction dependence.

BRIEF DESCRIPTION OF THE DRAWINGS

FIGS. 2A and 2B are views explaining the operation of the liquid crystal display device according to the first embodiment.

FIGS. 18A and 18B are views explaining the operation of the liquid crystal display device according to the seventh embodiment of the present invention.

FIG. 31 is a plan view and a sectional view of the liquid crystal display device according to the eleventh embodiment of the present invention.

FIG. 35 is a plan view and a sectional view of the liquid crystal display device according to a twelfth embodiment of the present invention.

FIGS. 42A and 42B are views explaining the operation of the TN-type liquid crystal display of the normally white mode.

DETAILED DESCRIPTION OF THE INVENTION

EMBODIMENTS

A First Embodiment

Figure 1:
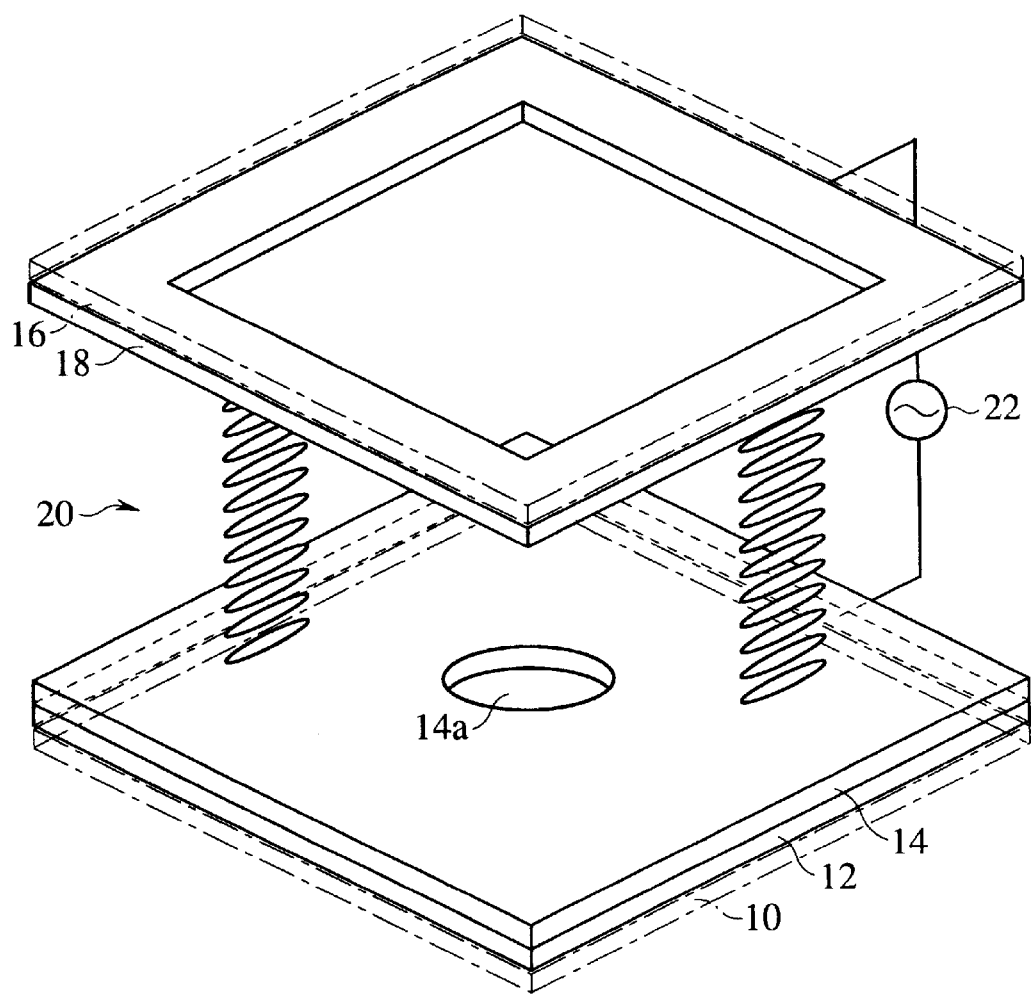
FIG. 1 is a perspective view of the liquid crystal display device according to a first embodiment of the present invention.
Figure 3A:
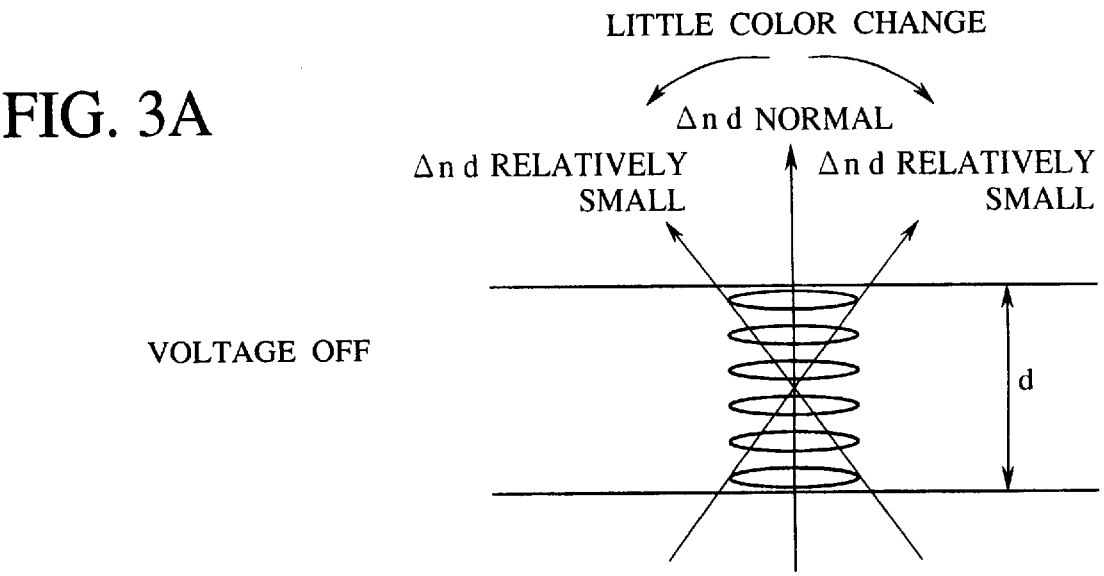
FIGS. 3A to 3C are views explaining the view angle of the liquid crystal display device according to the first embodiment of the present invention.
Figure 3B:
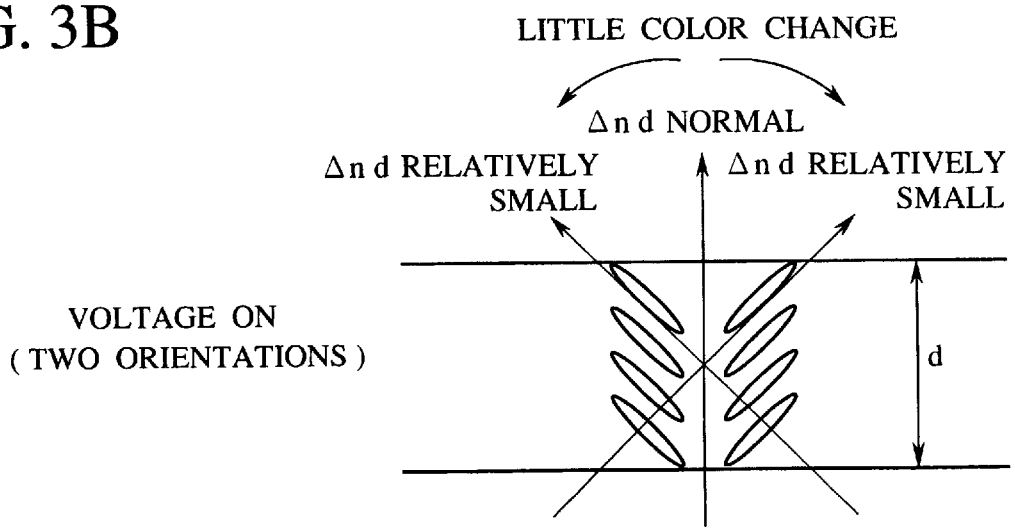
Figure 3C:
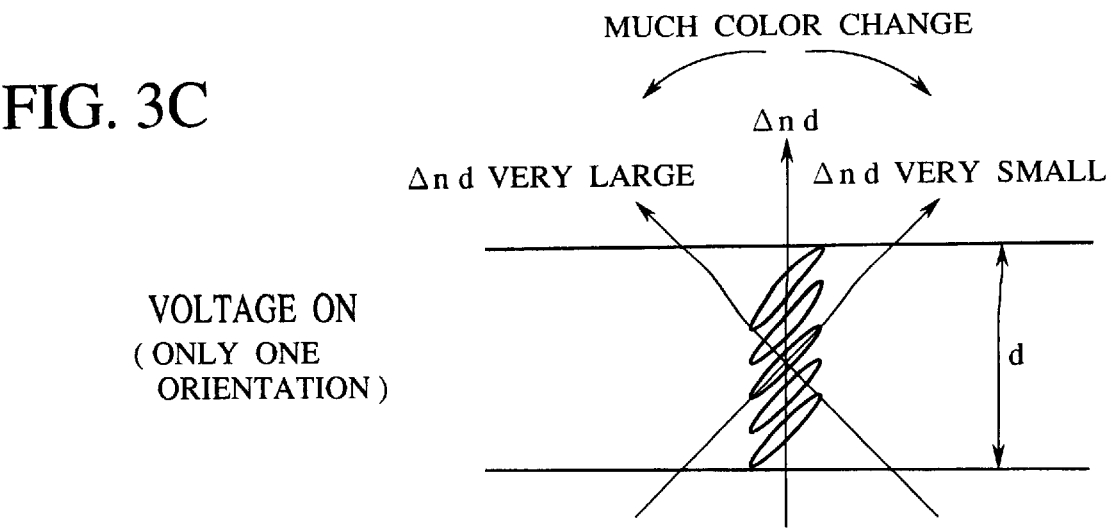
Figure 4:
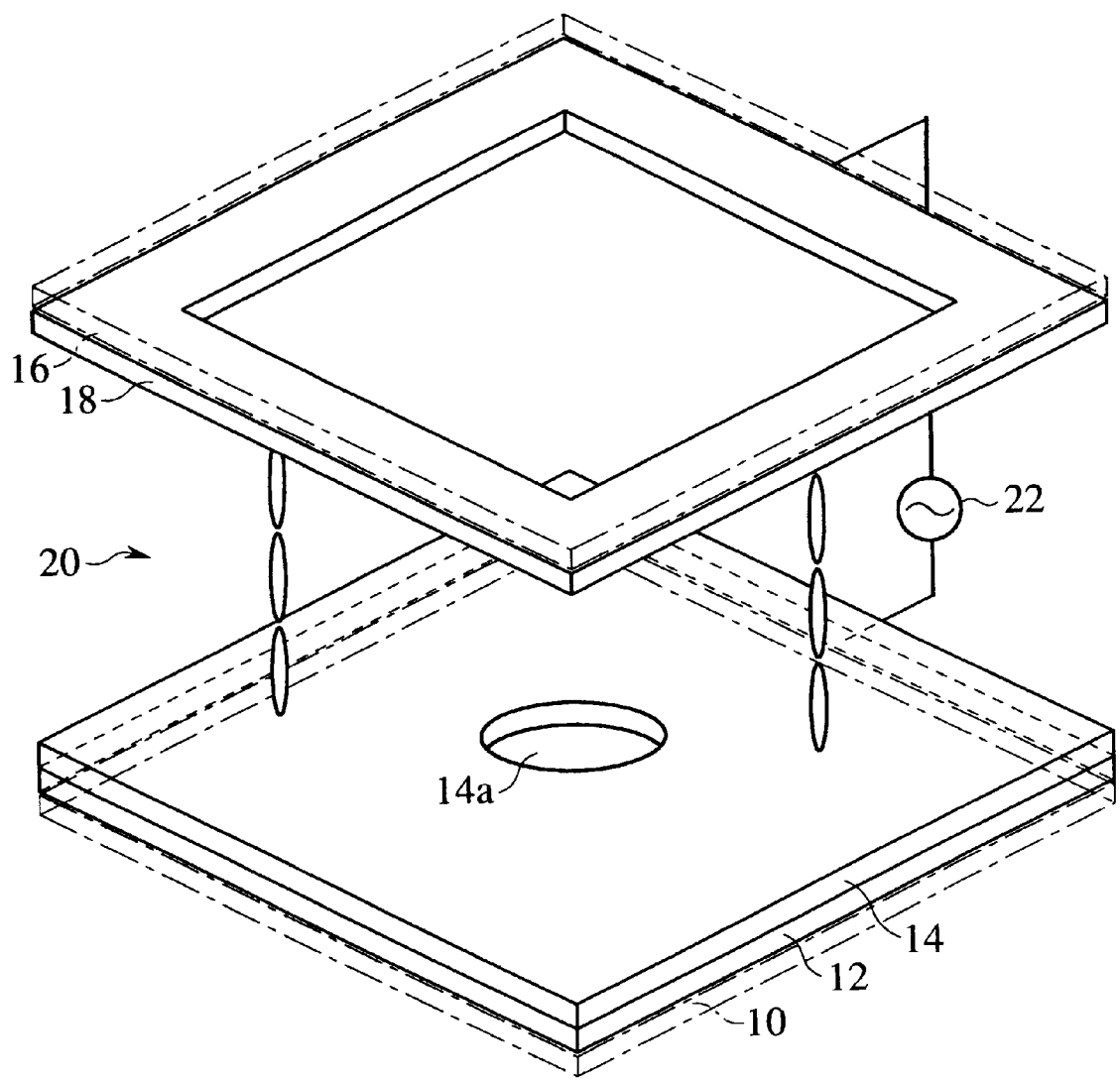
FIG. 4 is a perspective view of a modification of the liquid crystal display device according to the first embodiment of the present invention.

The liquid crystal display device according to a first embodiment of the present invention will be explained with reference to FIGS. 1 to 4. FIG. 1 is a perspective view of the liquid crystal display device according to the present embodiment. FIGS. 2A–2B are views explaining the operation of the liquid crystal device according to the present embodiment. FIGS. 3A–3C is views explaining the field view angle of the liquid crystal display device according to the present embodiment. FIG. 4 is a perspective view of a modification of the liquid crystal device according to the present embodiment.

FIG. 1 shows a panel structure of a picture element region for one picture element of the liquid crystal display device. As shown in the lower part of FIG. 1, a first electrode layer 12 of ITO layer is formed on the entire surface of a TFT substrate 10 of glass with a TFT device (not shown) formed on. An insulation layer 14 is formed on the first electrode layer 12. A circular opening 14a is formed in the insulation film 14 at the center of the picture element region, and the first electrode layer 12 is exposed in the opening 14a. Thus, a first electrode is formed on the TFT substrate 10 at the center of the picture element region.

As shown in the upper part of FIG. 1, a second electrode layer 18 of ITO layer in the shape of a square ring is formed along the outer edge of the picture element electrode on an opposed substrate 16 opposed to the TFT substrate 10. Thus, a second electrode is formed along the outer edge of the picture element region of the opposed substrate 16.

A TN-type liquid crystal layer 20 is disposed between the TFT substrate 10 and the opposed substrate 16. An orientation of the liquid crystal layer 20 is homogeneous molecular alignment, which is substantially parallel with the surface of the TFT substrate 10 or the opposed substrate 16. A twist angle is 0°.

A prescribed voltage is applied between the first electrode layer 12 and the second electrode layer 18 by a drive electric power source 22.

Although not shown, a polarizing plate whose polarizing direction is substantially the same as or is substantially normal to the orientation direction of the liquid crystal layer 20 is disposed below the TFT substrate 10, and a polarizing plate whose polarizing direction is substantially normal or parallel with the orientation direction of the liquid crystal layer 20 is disposed above the opposed substrate 18.

The operation of the liquid crystal display device having this structure will be explained with reference to FIGS. 2A and 2B.

In a state that no voltage is applied between the first electrode 12 and the second electrode 18, as shown in FIG. 2A, all liquid crystal molecules of the liquid crystal layer 20 are oriented parallel with the TFT substrate 10 or the opposed substrate 16. In this state, incident light is not influenced by double refraction of the liquid crystal layer 20, and a polarization axis does not rotate in the liquid crystal layer 20. Accordingly incident light from below the TFT substrate 10 is made linear polarized light by the polarizing plate, passes the TFT substrate 10 and the liquid crystal layer 20, and then the opposed substrate 16 without the polarized direction being changed. The light which has passed the opposed substrate 16 is blocked by the polarizing plate, whose polarizing direction is normal.

When a voltage is applied between the first electrode layer 12 and the second electrode layer 18, as shown in FIG. 2B, an electric field of radial lines of electric force from the first electrode layer 12 to the second electrode layer 18 is generated, and the liquid crystal molecules are oriented radially along the lines of electric force. The liquid crystal molecules are oriented equally in all the directions of 360°. In this state, the incident light is influenced by double refraction, and the polarization axis is rotated corresponding to an orientation direction of the liquid crystal molecules. Accordingly the incident light from below the TFT substrate is made linear polarized light by the polarizing plate, passes the TFT substrate, has the polarization axis rotated in the liquid crystal layer 20, and passes the opposed substrate 16 and the upper polarizing plate.

In a state that a voltage is applied, the liquid crystal molecules are oriented radially in all directions with respect to the center of the picture element region, and incident light in all directions is admitted, and a wide field angle can be obtained.

When the liquid crystal molecules in the liquid crystal layer 20 are oriented in various directions, the field angle is wider, and color changes depending on the direction of the incident light are small. This will be explained with reference to FIGS. 3A–3C.

As shown in FIG. 3A, in the present embodiment, in a case that the liquid crystal molecules are oriented horizontal in the state that no voltage is applied, in comparison with a normal $\Delta nd$ of vertical incident light, a $\Delta nd$ of slant incident light is smaller but with a slight change. Accordingly, color changes of transmitted light of the vertical incident light and of the slant incident light are small.

As shown in FIG. 3B, in the present embodiment, in a case that the liquid crystal molecules are oriented radial in the state that a voltage is applied, in comparison with a normal $\Delta nd$ of vertical incident light, a $\Delta nd$ of slant incident light is smaller but with a slight change. Accordingly color changes of transmitted light of the vertical incident light and of the slant incident light are small.

In contrast to this, as shown in FIG. 3C, when the liquid crystal molecules are oriented to be slanted in one direction, in comparison with a $\Delta nd$ of vertical incident light, a $\Delta nd$ of incident light which is slanted in parallel with the orientation direction of the liquid crystal molecules is extremely small, and a $\Delta nd$ of slant incident light which is vertical to the orientation direction of the liquid crystal molecules is extremely large. Accordingly the $\Delta nd$ largely changes depending on a direction of incident light.

A modification of the liquid crystal display device according to the present embodiment is shown in FIG. 4. In the liquid crystal display device shown in FIG. 1 the liquid crystal layer 20 has homogeneous molecular alignment which is substantially parallel with the surface of the TFT substrate 10 or the opposed substrate 16, but in the liquid crystal display device of FIG. 4, the liquid crystal layer 20 has homeotropic molecular alignment which is substantially vertical to the surface of the TFT substrate 10 or the opposed substrate 16.

In the state that no voltage is applied, the liquid crystal molecules are oriented vertical, which is different from the orientation direction (FIG. 2A) of the liquid crystal display device of FIG. 1, but the polarization axis of the transmitted light does not rotate.

In the state that a voltage is applied, the liquid crystal molecules which have been vertically oriented are oriented radially along radial lines of electric force from the first electrode layer 12 to the second electrode layer 18 and has the orientation equivalent to that of FIG. 2B. Accordingly, as in the liquid crystal display device of FIG. 2B, incident light from below is transmitted upward.

When the liquid crystal molecules are vertically oriented as shown in FIG. 4, the molecules tend to have the orientation shown in FIG. 2B. Accordingly, the liquid crystal can be driven at a low drive voltage, and the drive of the liquid crystal can be controlled at high speed.

In the present embodiment, the positions of the TFT substrate and the opposed substrate may be reversed. That is, the insulation film and the electrode layer shown lower in FIG. 1 are disposed on the opposed substrate, and the electrode layer shown upper in FIG. 1 is disposed on the TFT substrate.

As described above, according to the present embodiment, a voltage is applied by the drive electrodes formed on the TFT substrate and on the opposed substrate, whereby a view angle equal to or wider than a wide view angle obtained by in-plane switching (IPS). Since the drive electrodes are formed on the different substrates, the liquid crystal display device can have a wide view angle and high precision without a short-circuit resulting between the adjacent electrodes. Furthermore, according to the present embodiment, equal view angle characteristics can be obtained for incident light in all the directions, whereby the liquid crystal device can have a wide view angle without vertical and horizontal direction dependency.

A view angle range of the contrast 10 was measured by the liquid crystal display device according to the present embodiment. The view angle was vertically and horizontally 80°. A front contrast was above 80. In comparison with a view angle of the ordinary TN liquid crystal display device of horizontally ±40 degrees, upward 20 degrees and downward 60 degrees at most, and a view angle of the liquid crystal display device using the orientation division of horizontally ±70 degrees and vertically ±60, very good view angle characteristics were obtained.

A Second Embodiment

Figure 5:
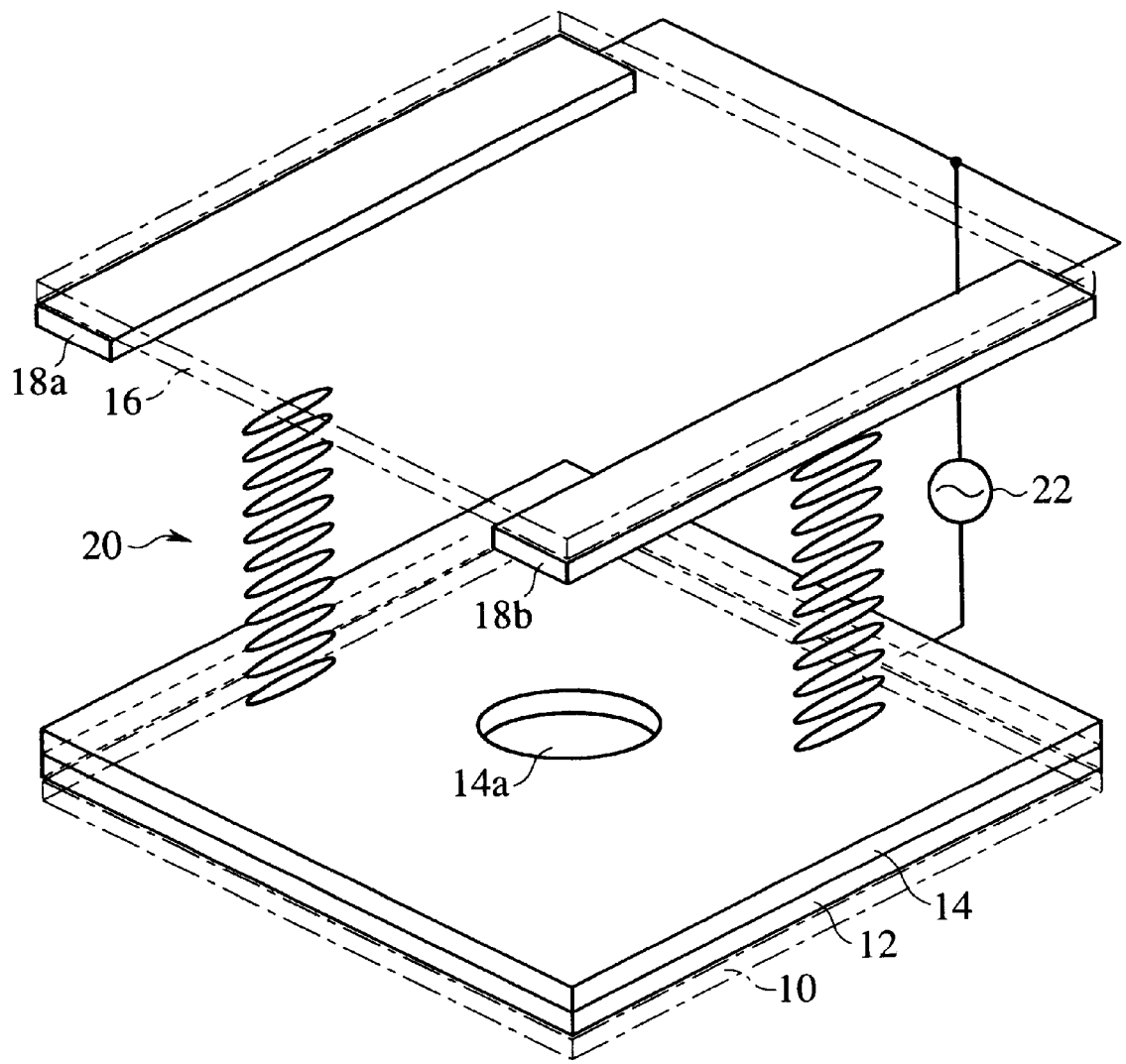
FIG. 5 is a perspective view of the liquid crystal display device according to a second embodiment of the present invention.
Figure 6:
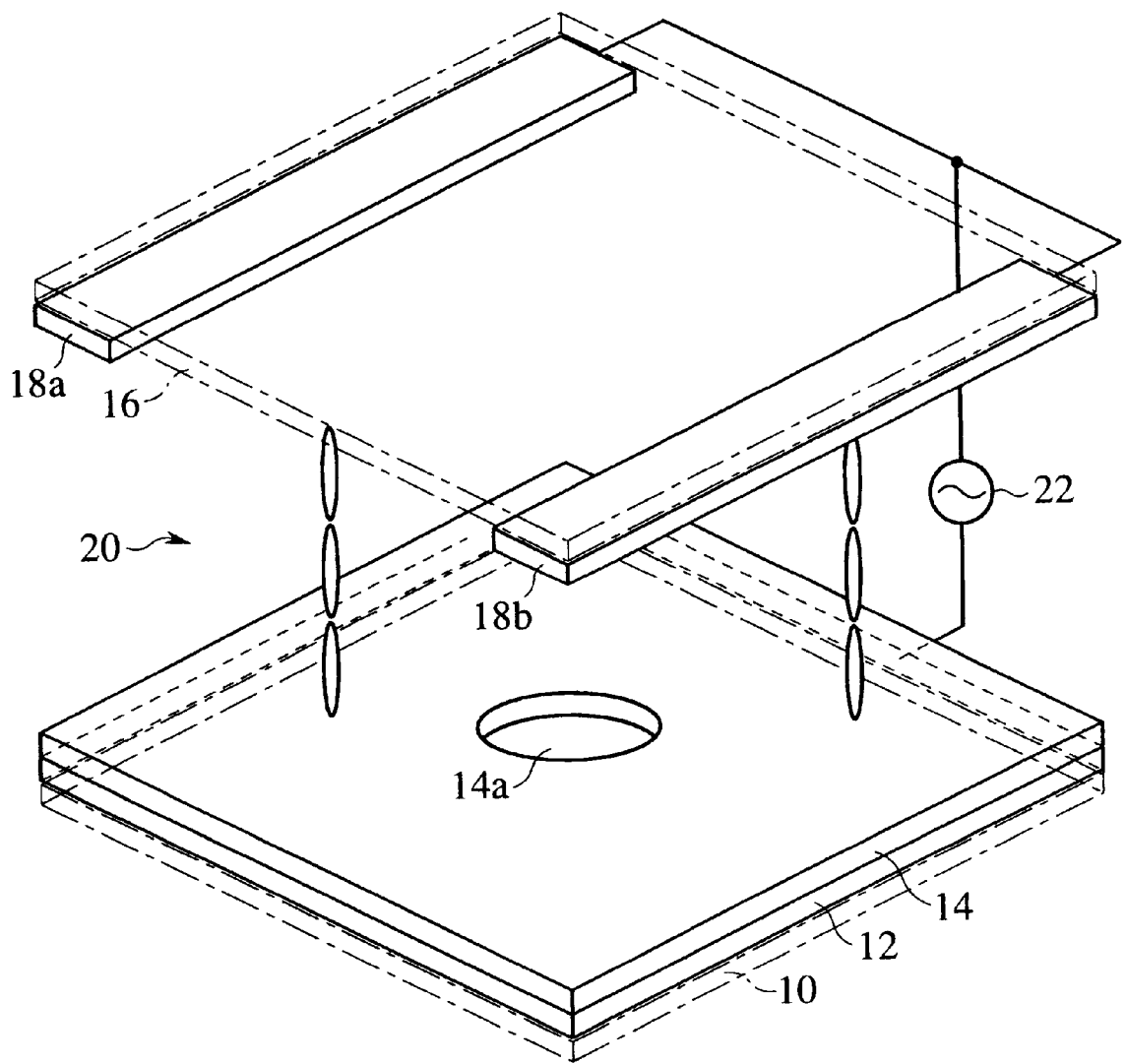
FIG. 6 is a perspective view of a modification of the liquid crystal display device according to the second embodiment of the present invention.

The liquid crystal display device according to a second embodiment of the present invention will be explained with reference to FIGS. 5 and 6. FIG. 5 is a perspective view of the liquid crystal display device according to the present embodiment, and FIG. 6 is a perspective view of a modification of the liquid crystal display device according to the present embodiment. The same members of the present embodiment as those of the first embodiment shown in FIGS. 1 to 4 are represented by the same reference numerals.

As shown in FIG. 5, the present embodiment is different from the first embodiment in the shape of a second electrode layer 18 formed on an opposed electrode 16. The second electrode layer 18 in the first embodiment is a square ring formed along the outer edge of the picture element region on the opposed substrate 16, but in the present embodiment the second electrode layer 18 is in the form of second electrode layers 18a, 18b formed on one pair of the outer edges of the picture element region opposed to each other. The rest of the constitution of the second embodiment is the same as that of the first embodiment shown in FIG. 1.

A drive voltage is applied between a first electrode 12 formed on a TFT substrate 10 and the second electrodes 18a, 18b by a drive electric power source 22.

The operation of the liquid crystal display device having such structure will be explained.

When no voltage is applied between the first electrode layer 12 and the second electrode layers 18a, 18b, the liquid crystal molecules of the liquid crystal layer 20 are oriented the same as in the first embodiment. Incident light from below the TFT substrate 10 is blocked by an upper polarizing plate.

When a voltage is applied between the first electrode 12 and the second electrodes 18a, 18b, the liquid crystal molecules have the same orientation in the horizontal direction which traverses the second electrode layers 18a, 18b as in the first embodiment, but in the direction vertical to the horizontal direction traversing the second electrode layers 18a, 18b the liquid crystal molecules do not have the orientation in the first embodiment. Accordingly the division in the vertical direction is less uniform in comparison with that of the first embodiment.

FIG. 6 shows a modification of the liquid crystal display device according to the present embodiment. In the liquid crystal display device shown in FIG. 5, the liquid crystal layer 20 has homogeneous molecular alignment substantially parallel with the surface of the TFT substrate 10 or the opposed substrate 16, but in FIG. 6, the liquid crystal layer 20 has homeotropic molecular alignment substantially vertical to the surface of the TFT substrate or the opposed substrate 16.

As described above, according to the present embodiment, a voltage is applied by the drive electrodes formed between the TFT substrate and the opposed substrate, whereby a view angle which is equal to or wider than that obtained by the in-plain switching (IPS) can be obtained. Since the drive electrodes are formed on the different substrates, the liquid crystal display device can have a wider view angle and high precision without a short-circuit resulting between the adjacent electrodes. According to the present embodiment, the second electrode layer is disposed only on one pair of opposed outer edges of a picture element region, which facilitates the fabrication of the liquid crystal display device.

A view angle range of a contrast 10 measured by the liquid crystal display device according to the present embodiment was as wide as horizontally 75° and vertically 70°.

A Third Embodiment

Figure 7:
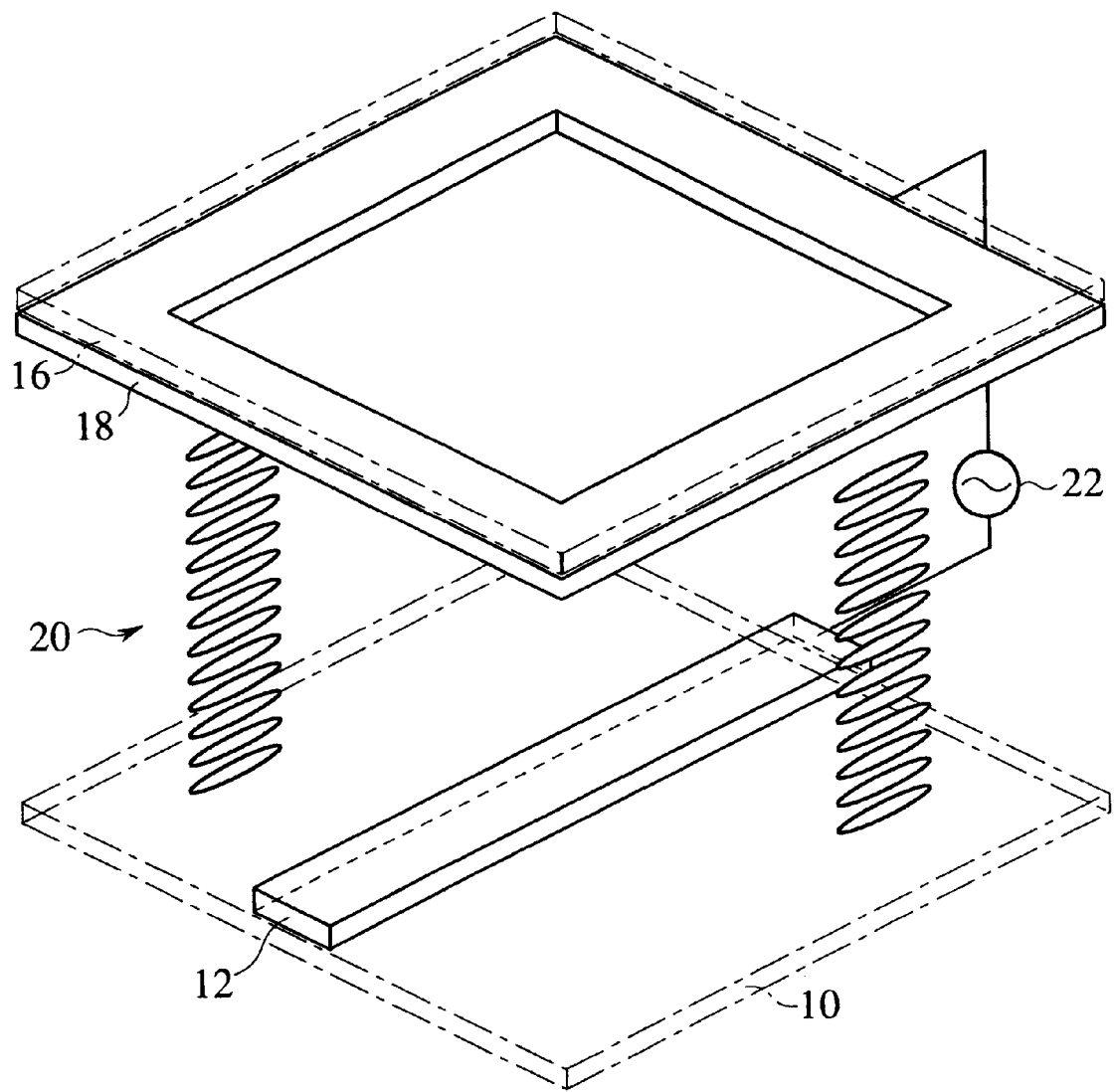
FIG. 7 is a perspective view of the liquid crystal display device according to a third embodiment of the present invention.
Figure 8:
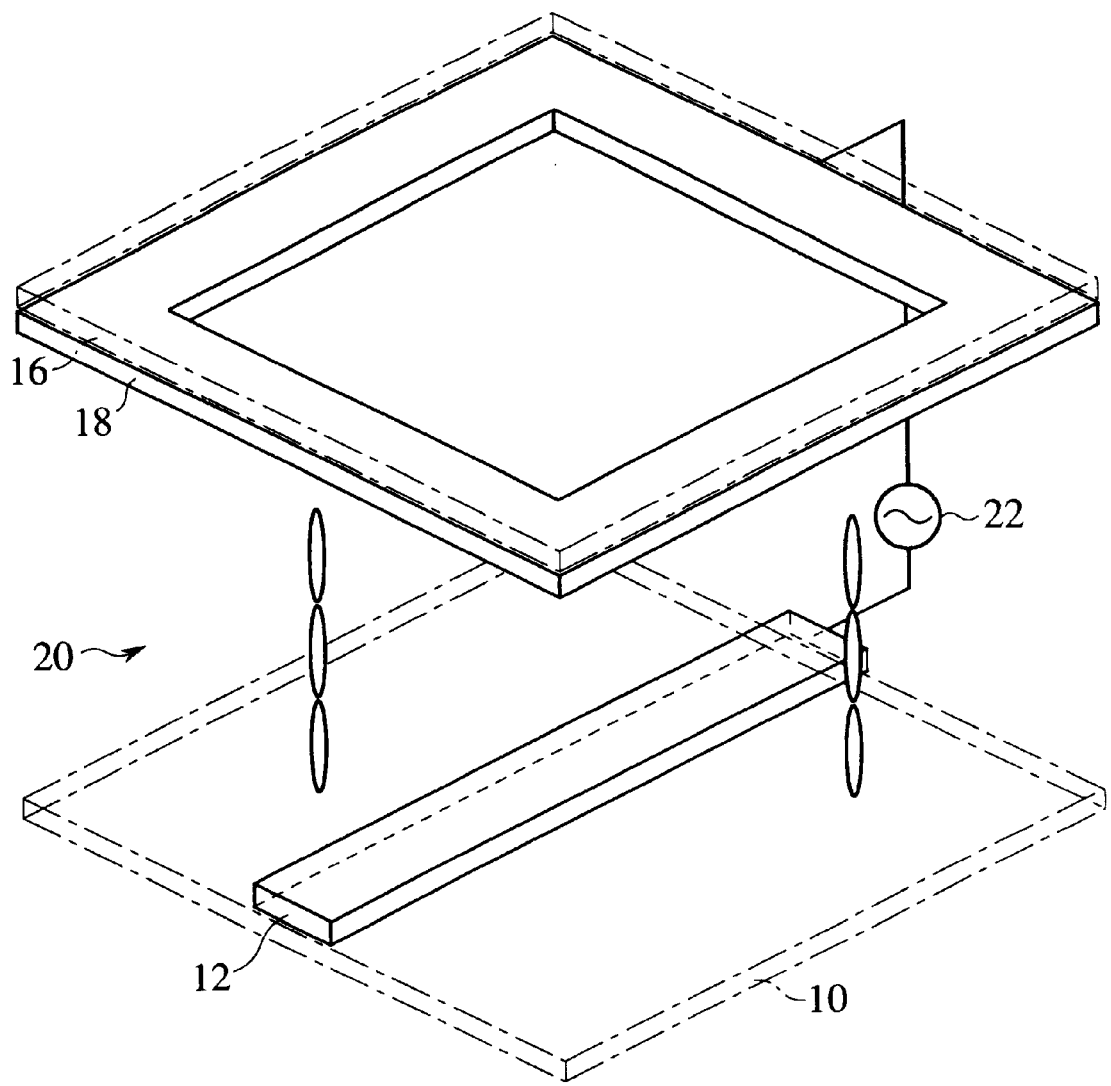
FIG. 8 is a perspective view of a modification of the liquid crystal display device according to the third embodiment of the present invention.

The liquid crystal display device according to a third embodiment of the present invention will be explained with reference to FIGS. 7 and 8. FIG. 7 is a perspective view of the liquid crystal display device according to the present embodiment. FIG. 8 is a perspective view of a modification of the liquid crystal display device of the present embodiment. The same members of the present embodiment as those of the embodiments shown in FIGS. 1 to 6 are represented by the same reference numerals.

As shown in FIG. 7, the present embodiment is different from the first embodiment in the constitution of a first electrode layer 12 formed on a TFT substrate 10. In the first embodiment, the first electrode layer 12 is formed below an insulation film 14 on the TFT substrate and is exposed in an opening in the insulation film 14, but in the present embodiment the first electrode layer 12 alone is formed longitudinally at the center of a picture element region without an insulation layer formed thereon. The rest of the structure of the present embodiment is the same as that of the first embodiment of FIG. 1.

A drive voltage is applied by a drive electric power source 22 between the first electrode layer 12 formed on the TFT substrate 10 and the second electrode layer 18.

The operation of the liquid crystal display device having this structure will be explained.

When no voltage is applied between the first electrode layer 12 and the second electrode layer 18, liquid crystal molecules of the liquid crystal layer 20 have the same orientation as in the first embodiment. Incident light from below the TFT substrate 10 is blocked by the upper polarizing plate.

When a voltage is applied between the first electrode layer 12 and the second electrode layer 18, the liquid crystal molecules have the same orientation as in the first embodiment in the horizontal direction traversing the first electrode layer 12 in a picture element region but do not have the orientation as in the first embodiment in the vertical direction normal to the horizontal direction traversing the first electrode layer 12. Accordingly the vertical division is less uniform in comparison with that of the first embodiment.

A modification of the liquid crystal display device of the present embodiment is shown in FIG. 8. In the liquid crystal display device of FIG. 7 the liquid crystal layer 20 has homogeneous molecular alignment which is substantially parallel with the surface of the TFT substrate 10 or the opposed substrate 16, but in FIG. 8 the liquid crystal layer 20 has homeotropic molecular alignment which is substantially vertical to the surface of the TFT substrate 10 or the opposed substrate 16.

As described above, according to the present embodiment, a voltage is applied by the drive electrodes formed on the TFT substrate and the opposed substrate, whereby a view angle equal to or wider than that obtained by the use of in-plane switching (IPS). The drive electrodes are formed on the different substrates, which allows the liquid crystal display device to have a wide view angle and high precision without a short-circuit resulting between the adjacent electrodes. Furthermore, according to the present embodiment, no insulation layer is necessary, which facilitates the fabrication of the liquid crystal device.

A view angle range of a contrast 10 measured by the liquid crystal display device according to the present embodiment was as wide as horizontally as 70° and vertically 65°.

A Fourth Embodiment

Figure 9:
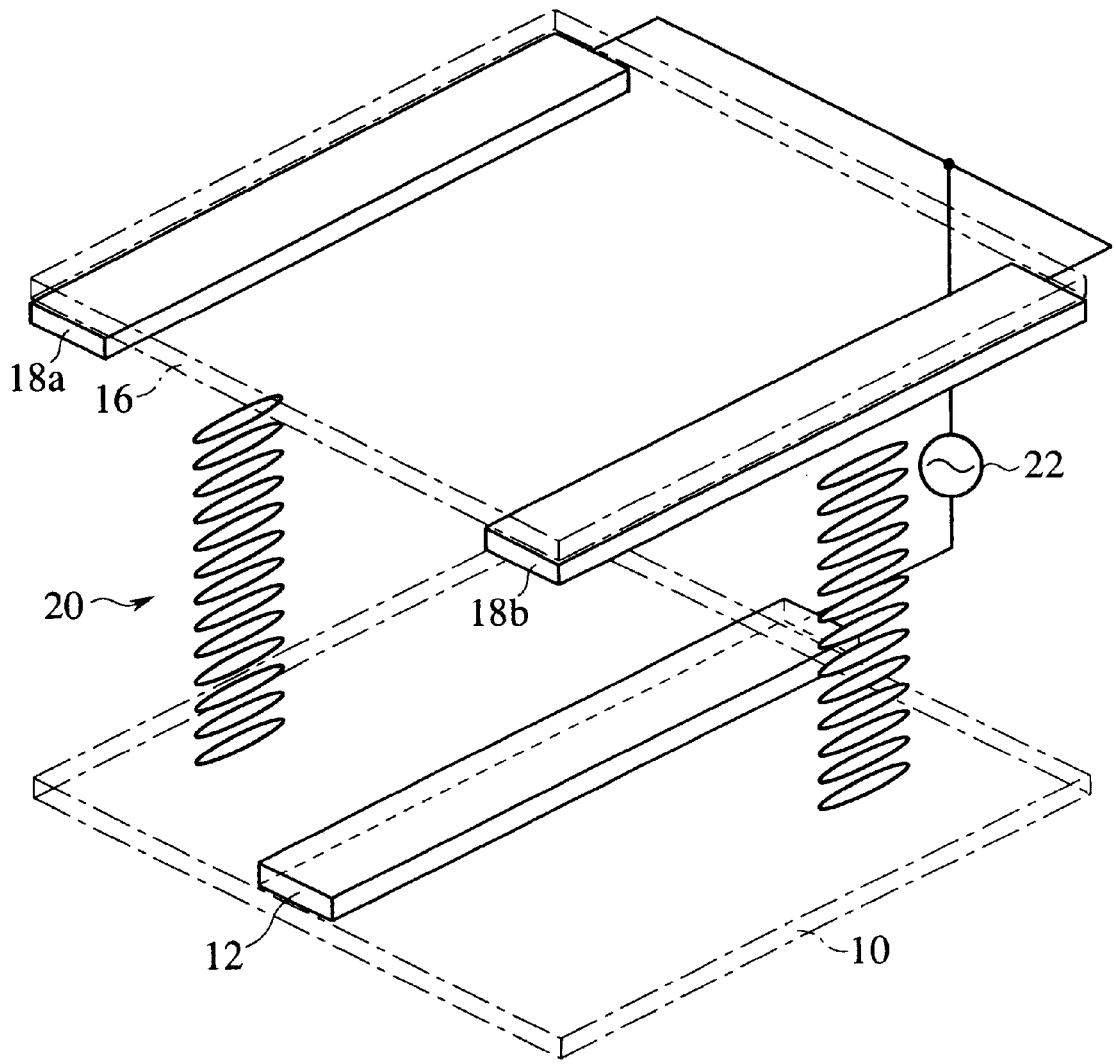
FIG. 9 is a perspective view of the liquid crystal display device according to the fourth embodiment of the present invention, which shows the basic structure thereof.
Figure 10:
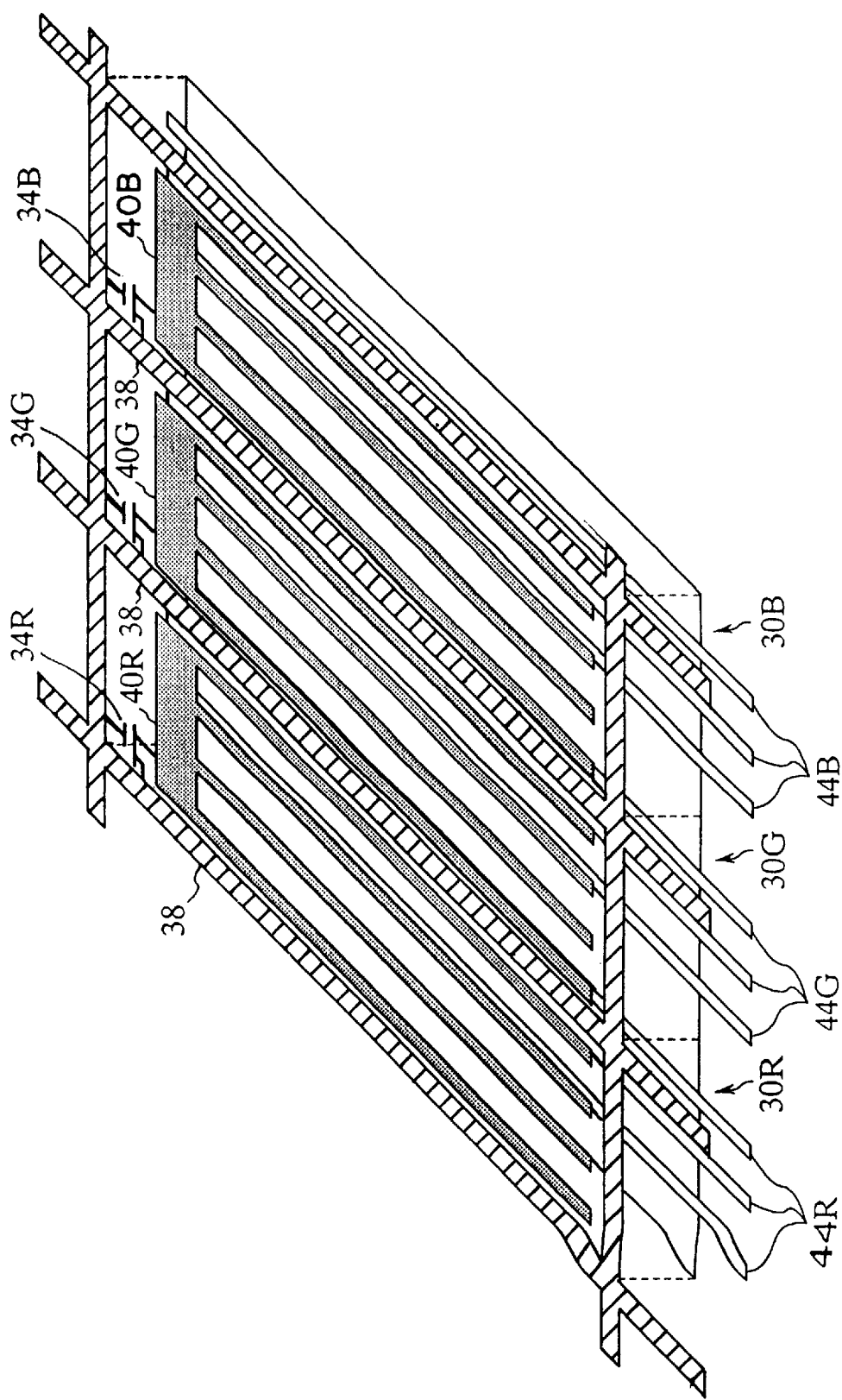
FIG. 10 is a perspective view of the color liquid crystal display device according to the fourth embodiment of the present invention.
Figure 11:
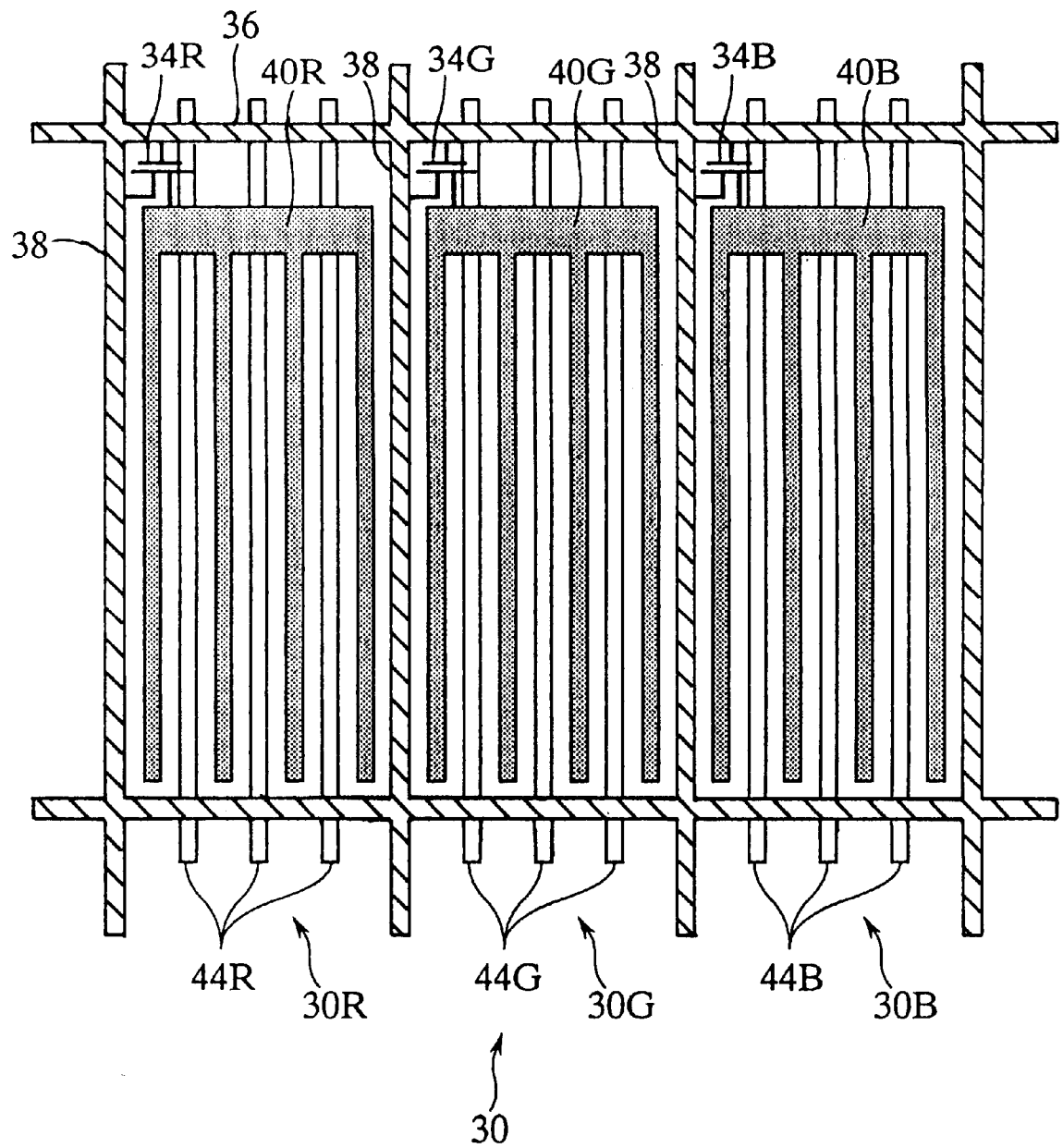
FIG. 11 is a plan view of the color liquid crystal display device according to the fourth embodiment of the present invention.
Figure 12:
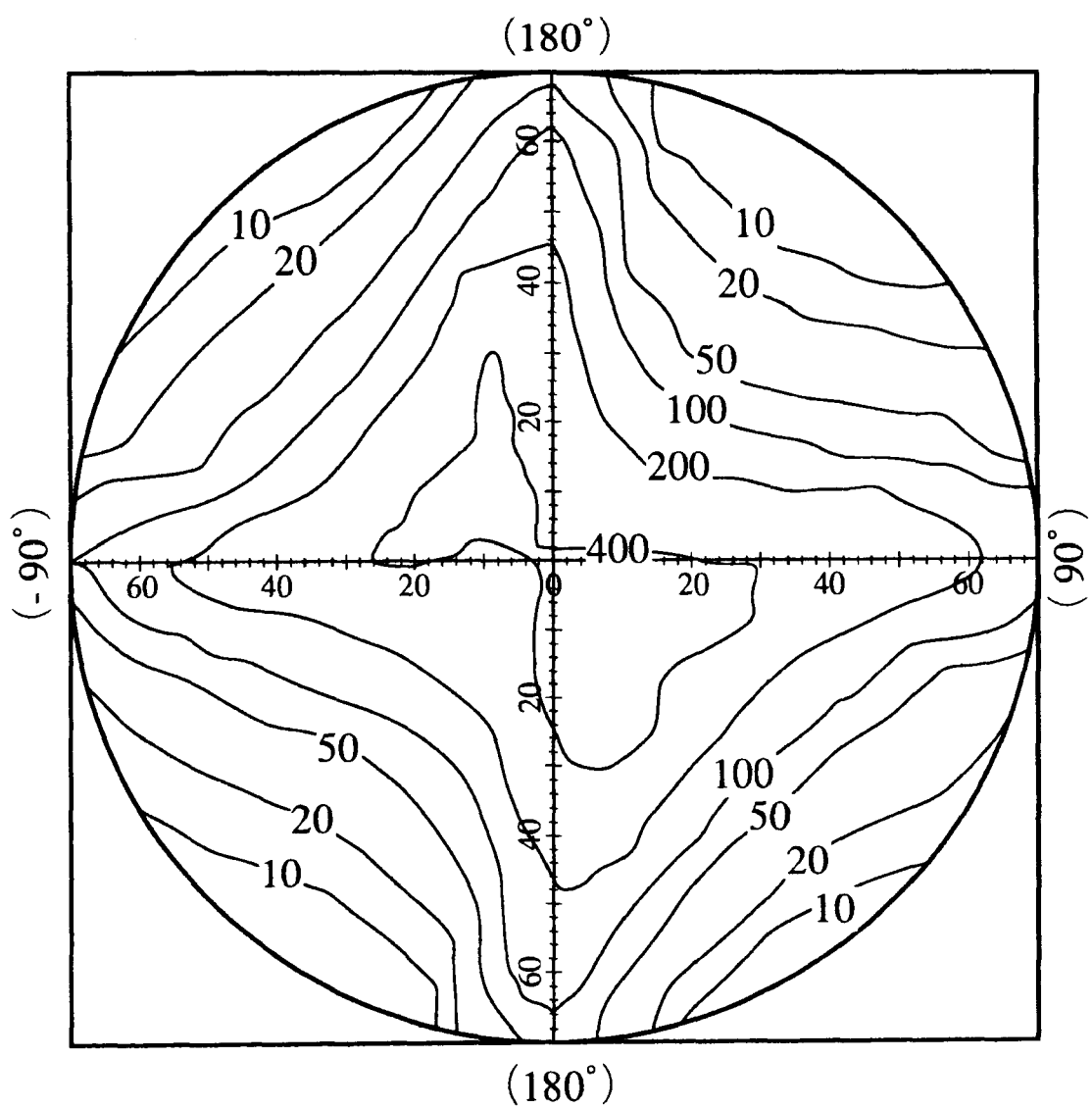
FIG. 12 is a graph of view angle characteristics of the liquid crystal display device according to the fourth embodiment of the present invention.
Figure 13:
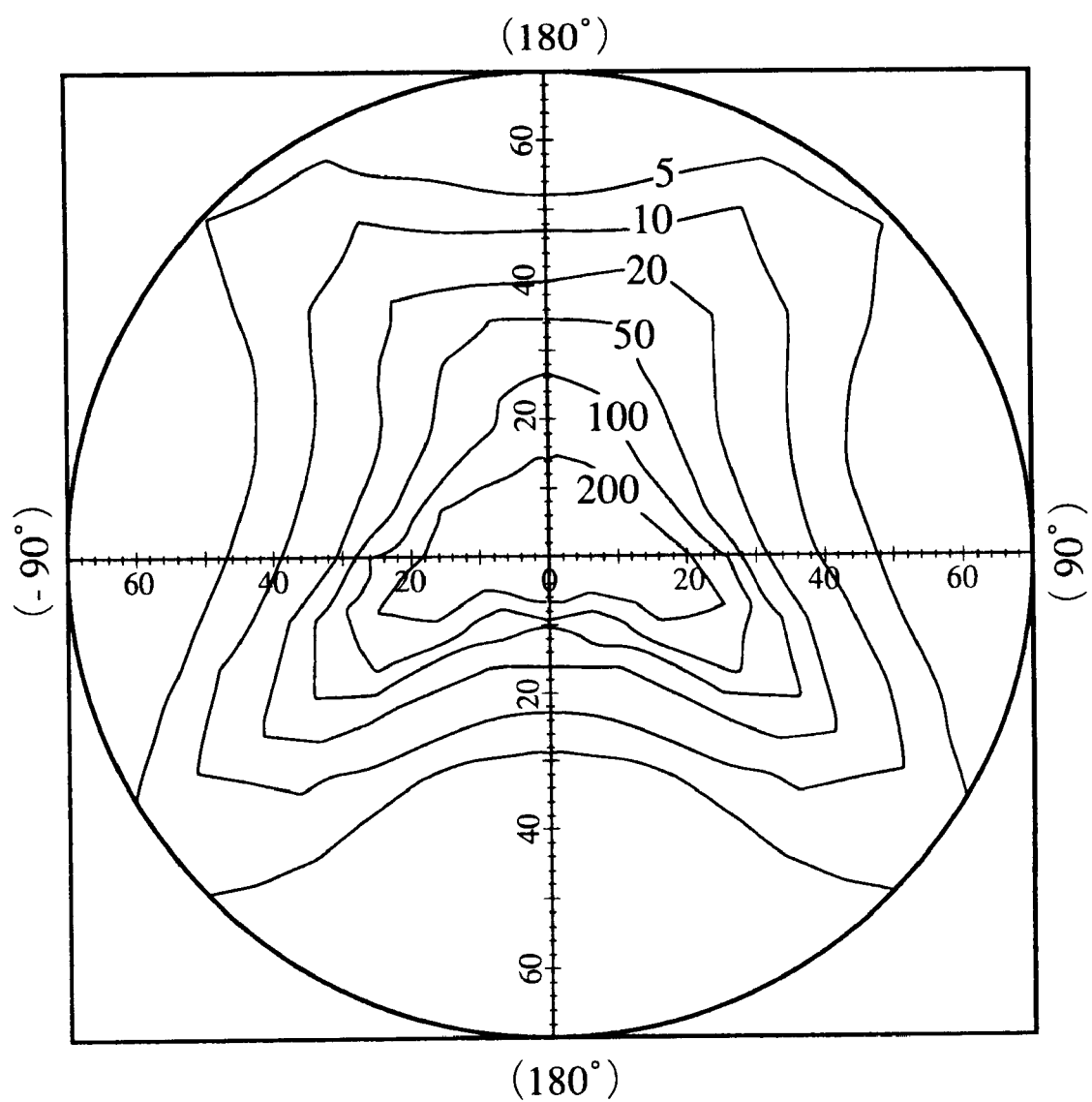
FIG. 13 is a graph of view angle characteristics of a conventional TN-type color liquid crystal display device according to a fifth embodiment of the present invention.

The liquid crystal display device according to a fourth embodiment of the present invention will be explained with reference to FIGS. 9 to 13. FIG. 9 is a perspective view of the liquid crystal display device according to the present embodiment, which shows a basic structure thereof. FIGS. 10 and 11 are a perspective view and a plan view of a color liquid crystal display device using the basic structure. FIG. 12 is a graph of view angle characteristics of the color liquid crystal display device according to the present embodiment. FIG. 13 is a graph of view angle characteristics of the conventional TN color liquid crystal display device. The same members of the present embodiment as those of the embodiment shown in FIGS. 1 to 4 are represented by the same reference numbers.

As shown in FIG. 9, the present embodiment is different from the first embodiment in the structure of a first electrode layer 12 formed on a TFT substrate and a shape of a second electrode layer 18 formed on an opposed substrate 16. In the first embodiment, the first electrode layer 12 is formed below the insulation layer 14 on the TFT substrate 16 and is exposed in the opening in the insulation layer 14. In the present embodiment, no insulation layer is formed, and the first electrode layer 12 alone is formed longitudinally at the center of a picture element region. In the first embodiment, the second electrode layer 18 has the square-ring shape along the outer edge of a picture element region on the opposed substrate 16. In the present embodiment, the second electrode layer 18 is in the form of second electrode layers 18a, 18b formed on only one pair of opposed outer edges. The rest of the constitution of the present embodiment is the same as in the first embodiment shown in FIG. 1.

A drive voltage is applied by a drive electric power source 22 between the first electrode layer 12 formed on the TFT substrate 10, and the second electrode layers 18a, 18b.

The operation of the liquid crystal display device having this structure will be explained.

When no voltage is applied between the first electrode layer 12 and the second electrode layers 18a, 18b, liquid crystal molecules of the liquid crystal layer 20 have the same orientation as in the first embodiment. Incident light from below the TFT substrate is blocked by an upper polarizing plate.

When a voltage is applied between the first electrode layer 12 and the second electrode layers 18a, 18b, the liquid crystal molecules have the same orientation in the horizontal direction traversing the second electrode layers 18a, 18b as in the first embodiment, but, in the vertical direction normal to the horizontal direction traversing the second electrode layers 18a, 18b, the liquid crystal molecules have an orientation different from that of those in the first embodiment. Accordingly the second embodiment has less uniform vertical division in comparison with the first embodiment.

Although not shown, the liquid crystal layer 20 of the liquid crystal display device according to the present embodiment may have homeotropic orientation which is substantially vertical to the surface of the TFT substrate 10 or the opposed substrate 16.

As described above, according to the present embodiment, a voltage is applied by the drive electrodes formed on the TFT substrate and the opposed substrate, whereby the liquid crystal display device can have a view angle which is equal to or wider than that obtained by in-plain switching (IPS). Since the drive electrodes are formed on different substrates, the liquid crystal display device can have a wide view angle and high precision without a short-circuit resulting between the adjacent electrodes. According to the present embodiment, the second electrode is provided on only a pair of opposed edges of a picture element region, and no insulation layer is necessary, which facilitates the fabrication the liquid crystal display device.

A view angle range of a contrast 10 measured by the liquid crystal display device according to the present embodiment was horizontally above 70° and vertically above 70°.

Next, a color liquid crystal display device having the basic structure of FIG. 9 will be explained with reference to FIGS. 10 and 11. This color liquid crystal display device has the basic structure used in the present embodiment, but the positions of the TFT substrate and the opposed substrate are reversed.

The color liquid crystal display device has one picture element region 3 divided in three regions of a red picture element region 30R, a green picture element region 30G and a blue picture element region 30B.

On the TFT substrate positioned upper in FIG. 10, a TFT device 34R, a TFT device 34G and a TFT device 34B are disposed respectively in the picture element regions 30R, 30G, 30B. The gates of the TFT devices 34R, 34G, 34B are commonly connected to a gate bus line 36.

In the sources of the TFT devices 34R, 34G, 34B, electrode layers 40R, 40G, 40B of a structure corresponding to the second electrode layers 18a, 18b are formed. The electrode layers 40R, 40G, 40B are formed of ITO and has a digital electrode structure having four strips.

On the opposed substrate 42 shown lower in FIG. 10, electrode layers 44R, 44G, 44B of a structure corresponding to the first electrode layer 12 in FIG. 9 are formed. Each electrode layer 44R, 44G, 44B has three electrode strips. As shown in FIG. 11, the strips of each electrode layer 44R, 44G, 44B are positioned between the electrode strips of its associated digital electrode layer 40R, 40G, 40B.

A liquid crystal 46 is sealed between the TFT substrate 32 and the opposed substrate 42. The liquid crystal 46 is provided by a positive-type liquid crystal by Merk Company (Product No.: ZLI-4792).

The electrode strips of the digital electrode layers 40R, 40G, 40B have an about 7 $\mu$m-thickness, and a gap between the electrode strips of the digital electrode layers 440R, 40G, 40B and the electrode strips of the electrode layers 44R, 44G, 44B is about 8 $\mu$m.

View angle characteristics of the color liquid crystal device according to the present embodiment are shown in the graph of FIG. 12. View angle characteristics of the conventional TN color liquid crystal display device are shown as comparison in FIG. 13. As apparent in comparison of FIG. 12 with FIG. 13, the color liquid crystal device according to the present embodiment has improved view angle characteristics than the conventional TN color liquid crystal display device. It is found that especially the horizontal and the vertical view angles are much improved.

A Fifth Embodiment

Figure 14:
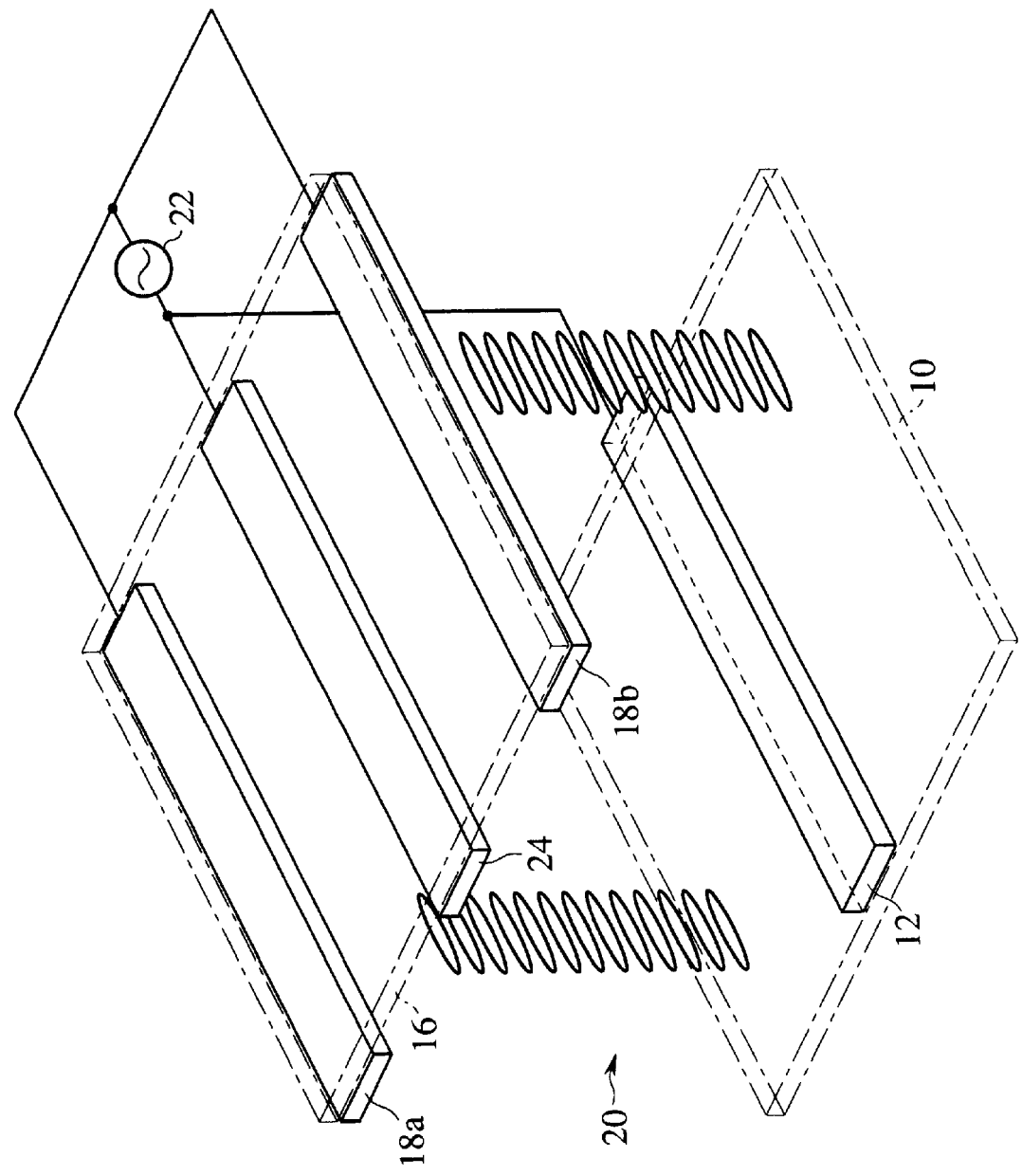
FIG. 14 is a perspective view of the liquid crystal display device according to the fifth embodiment of the present invention.

The liquid crystal display device according to a fifth embodiment of the present invention will be explained with reference to FIGS. 14 and 15. FIG. 14 is a perspective view of the liquid crystal display device according to the present embodiment. FIGS. 15A and 15B are views explaining the operation of the liquid crystal display device according to the present embodiment. The same members of the present embodiment as those of the fourth embodiment shown in FIGS. 9 to 13 are represented by the same reference numerals.

The liquid crystal display device according to the present embodiment includes, in addition to the structure of the fourth embodiment, a third electrode layer 24 between second electrode layers 18a, 18b on an opposed substrate 16 shown upper in FIG. 14. The third electrode layer 24 is connected to a first electrode layer 12 on a TFT substrate 10. A drive voltage of a drive electric power source 22 is applied between the first electrode layer 12 and the third electrode layer 24, and the second electrode layers 18a, 18b. The other structure of the present embodiment is the same as that of the fourth embodiment shown in FIGS. 9 to 13.

The operation of the liquid crystal display device having this structure will be explained.

Figure 15A:
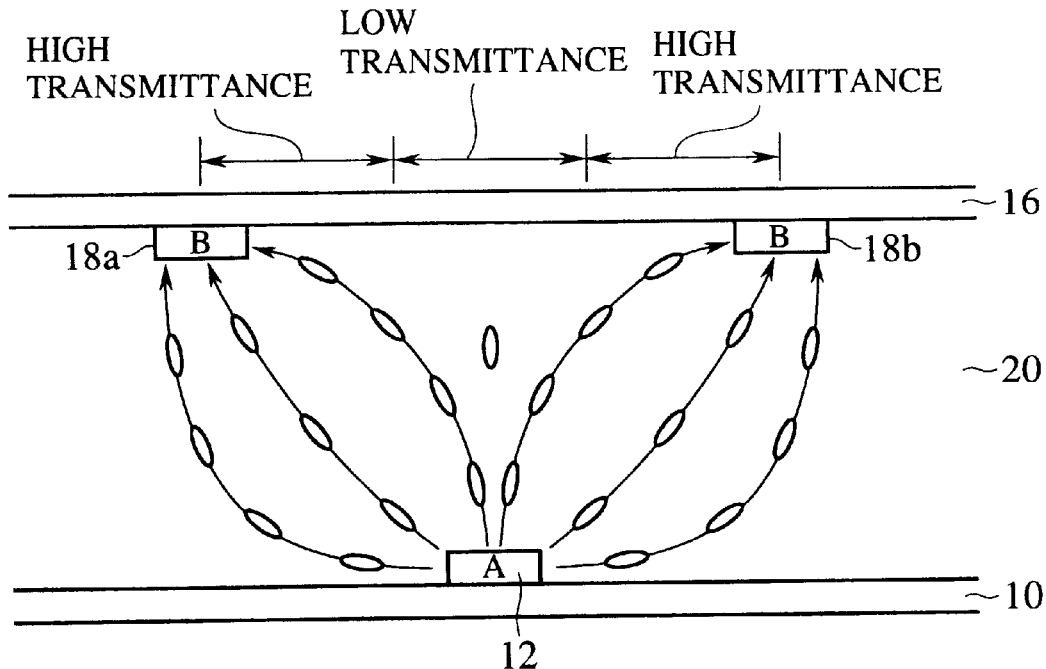
FIGS. 15A and 15B are views explaining the operation of the liquid crystal display device according to the fifth embodiment of the present invention.
Figure 15B:
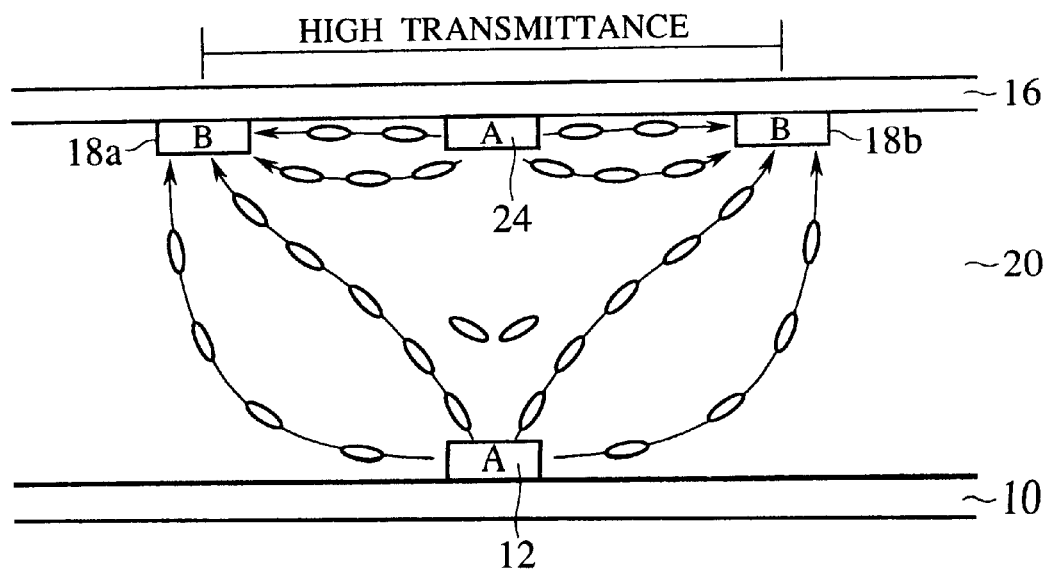

In the liquid crystal display device according to the fourth embodiment, when a voltage is applied between the first electrode layer 12 and the second electrode layer 18, liquid crystal molecules of the liquid crystal layer 20 are oriented as shown in FIG. 15A with the liquid crystal molecules in the central region between the second electrode layers 18a, 18b oriented vertical. A transmittance is decreased in the central part.

The third electrode layer 24 of the present embodiment is for preventing liquid crystal molecules from being oriented vertical at the central part, decreasing a transmittance. The third electrode layer 24 at the center of the opposed substrate 16 has the same potential as the first electrode layer 12, whereby, as shown in FIG. 15B, an electric field is generated from the third electrode layer 24 to the second electrode layers 18a, 18b, and the liquid crystal molecules are oriented along the electric field. Consequently, the liquid crystal molecules are not oriented vertical, and the central region, where a transmittance is decreased, vanishes.

As described above, according to the present embodiment, the liquid crystal display device can have improved panel transmittance. The liquid crystal display device according to the present embodiment has an about 15% panel transmittance increase in its bright state.

A Sixth Embodiment

Figure 16:
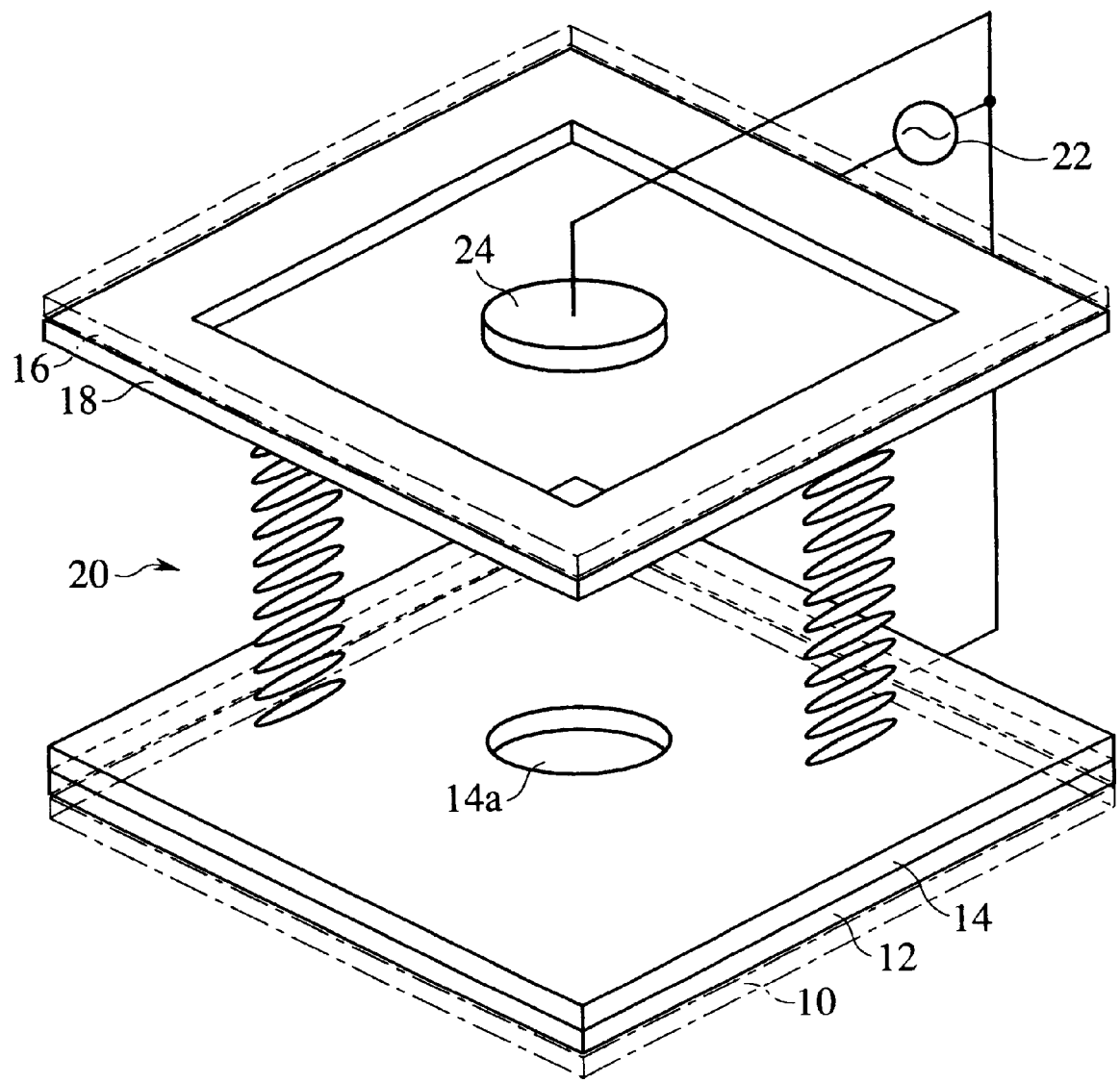
FIG. 16 is a perspective view of the liquid crystal display device according to sixth embodiment of the present invention.

The liquid crystal display device according to a sixth embodiment of the present invention will be explained with reference to FIG. 16. FIG. 16 is a perspective view of the liquid crystal display device according to the present embodiment. The same members of the present embodiment as those of the first embodiment shown in FIGS. 1 to 4 are represented by the same reference numbers.

The present embodiment includes, in addition to the structure of the first embodiment, a third electrode layer 24 enclosed by a second electrode layer 18 on an opposed substrate 16 shown upper in FIG. 16. The third electrode layer 24 is connected to a first electrode layer 12 on a TFT substrate 10. A drive voltage of a drive electric power source 22 is applied between the first electrode layer 12 and the third electrode layer 24, and the second electrode layer 18. The other structure of the present embodiment is the same as that of the first embodiment shown in FIGS. 1 to 4.

The operation of the liquid crystal display device having this structure will be explained.

In the liquid crystal display device according to the first embodiment, when a voltage is applied between the first electrode layer 12 and the second electrode layer 18, liquid crystal molecules of the liquid crystal layer 20 are oriented as shown in FIG. 15A with the liquid crystal molecules in the regions in second link-shaped electrode layers 18a, 18b oriented vertical. A transmittance is decreased in this part.

In the present embodiment, the third electrode layer 24 is disposed at the center of the opposed substrate 16, whereby an electric field from the third electrode layer 24 to the second electrode layer 18a, 18b is formed, and the liquid crystal molecules are oriented along the electric field. Accordingly, the liquid crystal molecules are not oriented vertical, and the region where a transmittance is decreased is absent.

Thus, according to the present embodiment, the liquid crystal display device can have improved panel transmittance.

A Seventh Embodiment

Figure 17:
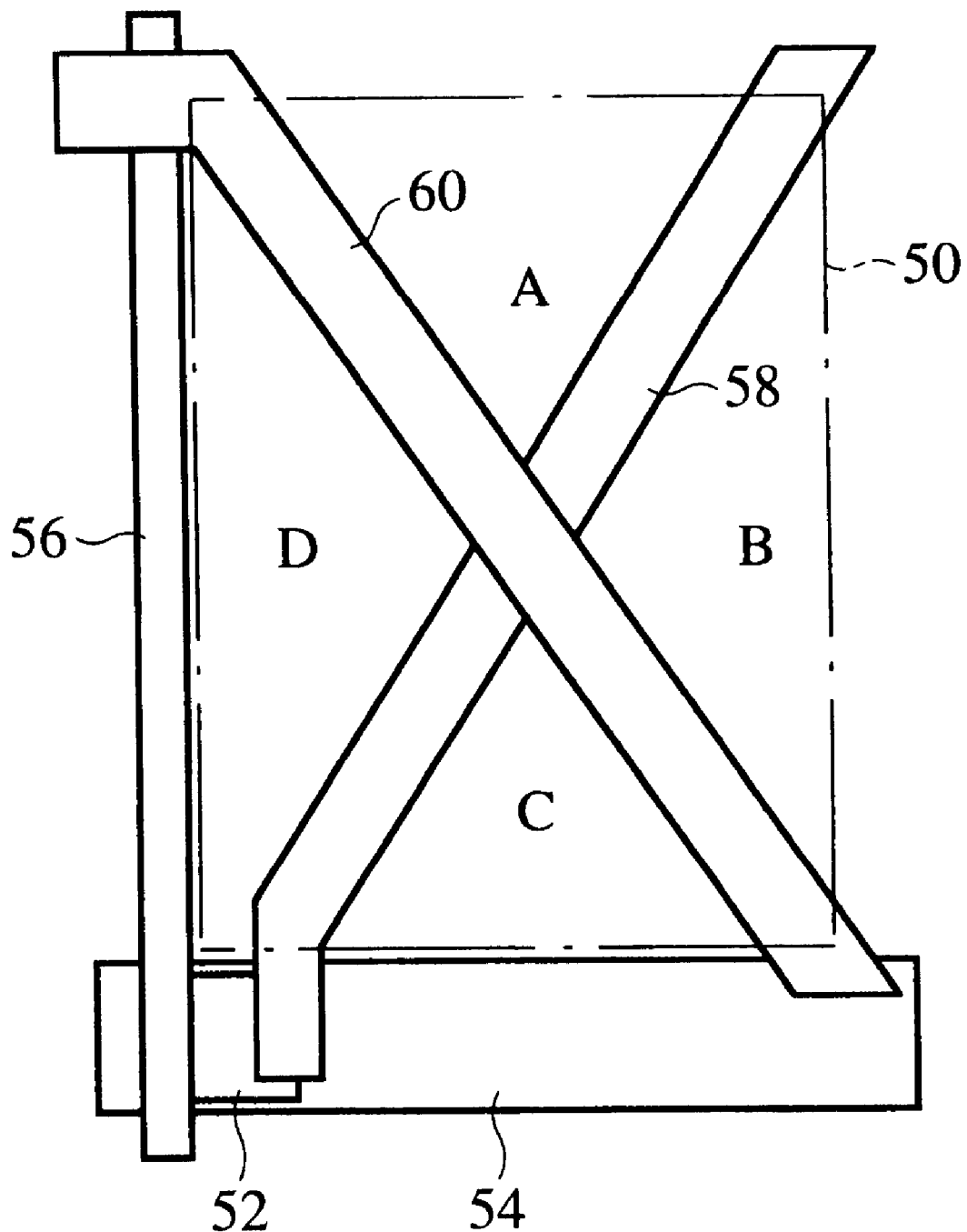
FIG. 17 is a perspective view of the liquid crystal display device according to a seventh embodiment of the present invention.
Figure 19:
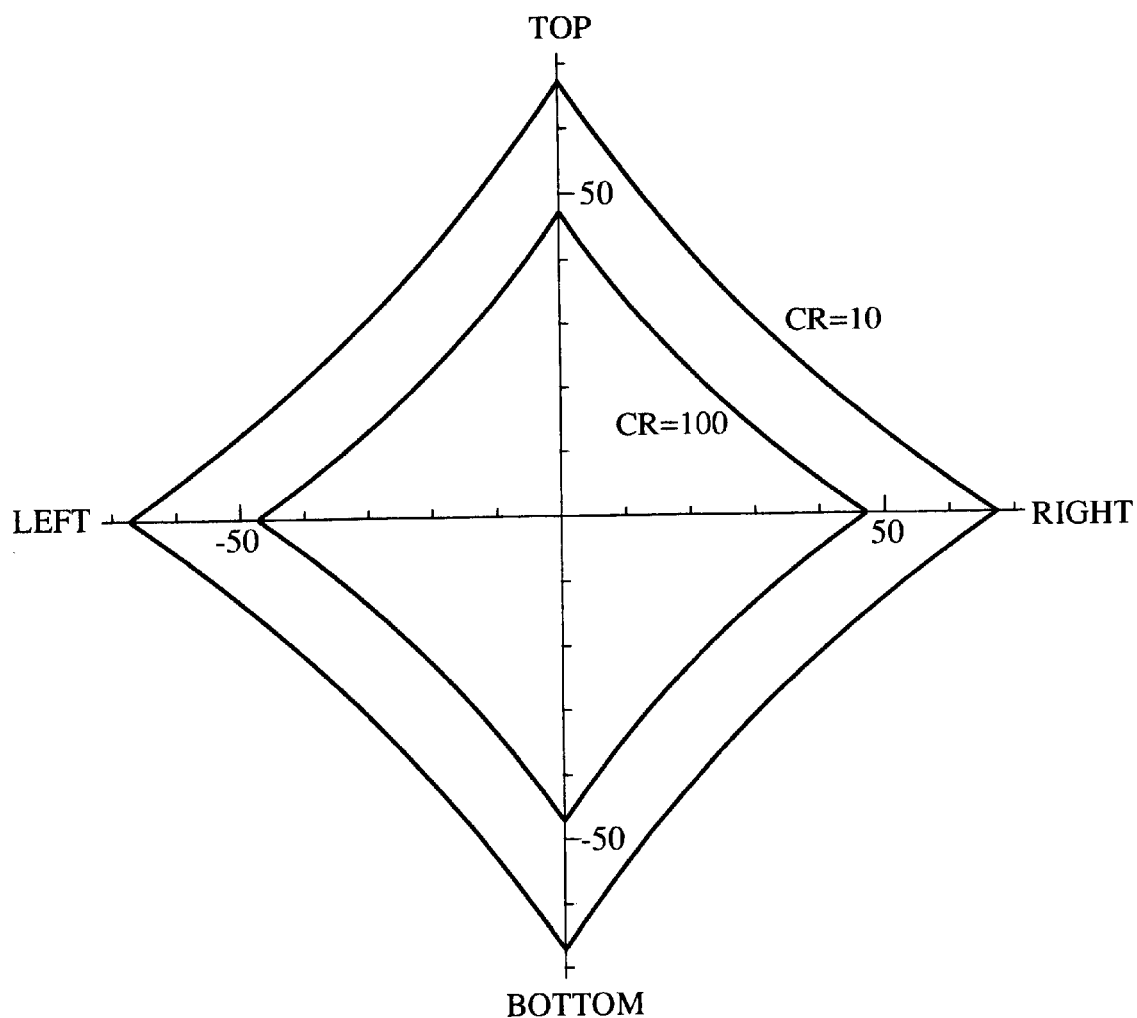
FIG. 19 is a graph of view angle characteristics of the liquid crystal display device according to the seventh embodiment of the present invention.

The liquid crystal display device according to a seventh embodiment of the present invention will be explained with reference to FIGS. 17 to 21. FIG. 17 is a plan view of the liquid crystal display device according to the present embodiment. FIGS. 18A and 18B are views explaining the operation of the liquid crystal display device according to the present embodiment. FIG. 19 is graph of view angle characteristics of the liquid crystal display device according to the present embodiment. FIG. 20 is a graph of relationships between liquid crystal layer thicknesses and drive voltages. FIG. 21 is a plan view of a modification of the liquid crystal display device shown in FIG. 17.

FIG. 17 shows a picture element region 50 of one picture element of the liquid crystal display device. A TFT device 52 is disposed on a TFT substrate (not shown) of, an about 1.1 mm-thickness glass. The gates of the TFT devices are commonly connected by a gate bus line 54, and the drains of the TFT devices are commonly connected by a drain bus line 56.

A picture element electrode layer 58 corresponding to the first electrode layer is formed in the source of the TFT device 52. The picture element electrode layer 58 is formed of ITO or a metal film and is formed along a diagonal which slantly traverses the picture element region 50.

An opposed electrode layer 60 corresponding to the second electrode layer is formed on an opposed substrate (not shown) opposed to the TFT substrate. The opposed electrode layer 60 slantly traverses the picture element region 50 and is formed along a diagonal intersecting the picture element electrode layer 58. The picture element electrode layer 58 and the opposed electrode layer 60 intersect each other in horizontal section substantially at the center of the picture element region 50.

A magnetic liquid crystal layer 62 is sealed between the TFT substrate and the opposed substrate. The liquid crystal is provided by a liquid crystal by Chisso Company having low Δn (=0.067), a low threshold value.

The TFT substrate and the opposed substrate are subjected to orientation-treatment for orienting the liquid crystal layer 62. As shown in FIG. 18A, an orientation of the liquid crystal layer 62 is a homogeneous orientation substantially parallel with the TFT substrate 64 or the opposed substrate 56. A twist angle is 0 degree. An orientation film has a relatively low pre-tilt angle (Product No.: AL1054 by Nippon Gosei Gomu Company).

A required voltage is applied between the picture element electrode layer 58 and the opposed electrode 60 by a drive electric power source (not shown).

Although not shown, below the TFT substrate 64 there is provided a polarizing plate having substantially the same orientation as the liquid crystal layer 62. Above the opposed substrate 66 there is provided a polarizing plate which is substantially normal to the orientation of the liquid crystal layer 62.

The operation of the liquid crystal display device having this structure will be explained with reference to FIGS. 18A and 18B.

In a state in which no voltage is applied between the picture element layer 58 and the opposed electrode 60, as shown in FIG. 18A, all liquid crystal molecules of the liquid crystal layer 62 are oriented in parallel with the TFT substrate 64 or the opposed substrate 66. In this state, incident light is not influenced by double refraction of the liquid crystal layer 30, and accordingly a polarization axis does not rotate in the liquid crystal layer 62. Accordingly incident light from below the TFT substrate 64 is made into linear polarized light by the polarizing plate, passes the liquid crystal layer 62 through the TFT substrate 64, and passes the opposed substrate 66 without the polarization direction unchanged. The light which has passed the opposed substrate 66 is blocked by the polarizing plate having a normal polarization direction.

When a voltage is applied between the picture element electrode layer 58 and the opposed electrode layer 60, electric fields having directions different from each other are applied to four regions A, B, C, D divided by the picture element electrode layers 58 and the opposed electrode layer 60. An intensity of the electric fields increases toward the intersection between the picture element electrode layer 58 and the opposed electrode layer 60. Accordingly, the liquid crystal layer 62 starts to change its orientation at the intersection between the picture element electrode layer 58 and the opposed electrode layer, and the change of the orientation gradually spreads in the respective entire regions.

Consequently, as shown in FIG. 18B, the liquid crystal layer 62 is oriented symmetrical with respect to the intersection between the picture element electrode layer 58 and the opposed electrode layer 60, and is oriented increasingly intensely toward the intersection. Electric fields which are not perfectly but substantially transverse are applied to the four triangular regions A, B, C, D, and as shown in FIG. 18B, the liquid crystal molecules in the respective regions A, B, C, D are oriented substantially slant.

In this state, incident light is influenced by double refraction of the liquid crystal layer 62, and a polarization axis rotates corresponding to an orientation of the liquid crystal molecules. Accordingly, incident light from below the TFT substrate 64 is made into linear polarized light by the polarizing plate, passes the TFT substrate and has the polarization axis rotated in the liquid crystal layer 62, and passes the upper polarizing plate through the opposed substrate 66.

In the state where a voltage is applied, the liquid crystal molecules are oriented conical to the intersection between the picture element electrode layer 58 and the opposed electrode layer 60, and in all the picture elements, the liquid crystal layer transmits incident light in all directions, whereby a large view angle can be obtained.

FIG. 19 shows view angle characteristics of the liquid crystal display device according to the present embodiment. It is found that the present embodiment has achieved large view angle characteristics. Especially view angles in the horizontal direction and the vertical direction are good.

When colors of the colored liquid crystal display device are considered, refractive index anisotropy of the liquid crystal is represented by Δn and a thickness is represented by d, Δn×d is preferably substantially below 0.5 and above 0.25. This point will be explained with reference to the graph of FIG. 20B.

When a liquid crystal layer thickness (a gap thickness) d becomes smaller at a position where the picture element electrode and the opposed electrode are offset from each other, a drive voltage to be applied to the liquid crystal layer increases as a thickness of the liquid crystal layer (a gap thickness) d is decreased. On the other hand, it is known that as a liquid crystal layer is increased, coloring in the slant directions is distinct. As a thickness d is increased, the coloring is more distinct, and sufficient characteristics cannot be obtained.

Figure 20A:
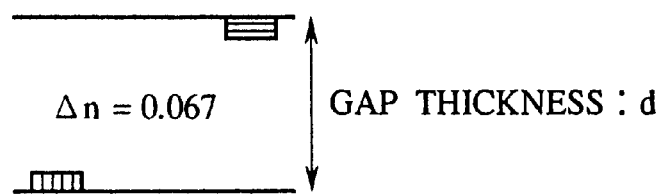
FIG. 20A is a closeup of the liquid crystal display defining a thickness.
Figure 20B:
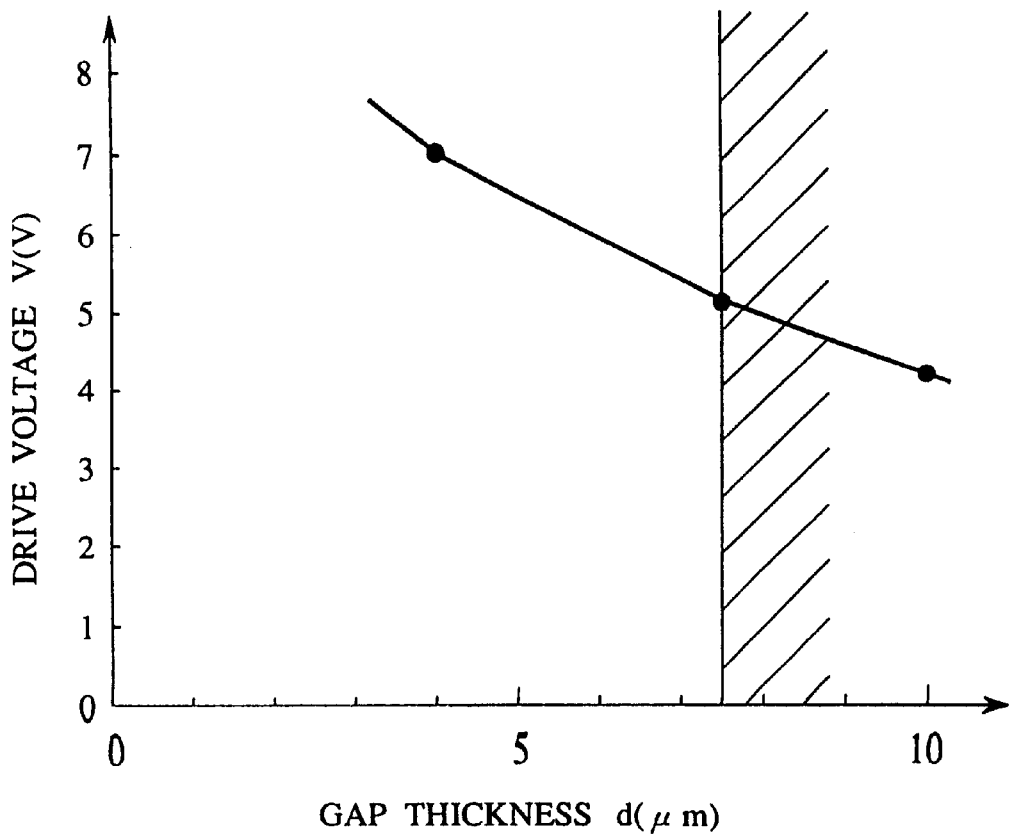
FIG. 20B is a graph of relationships between a thickness of a liquid crystal layer of the liquid crystal display device, and a drive voltage.
Figure 21:
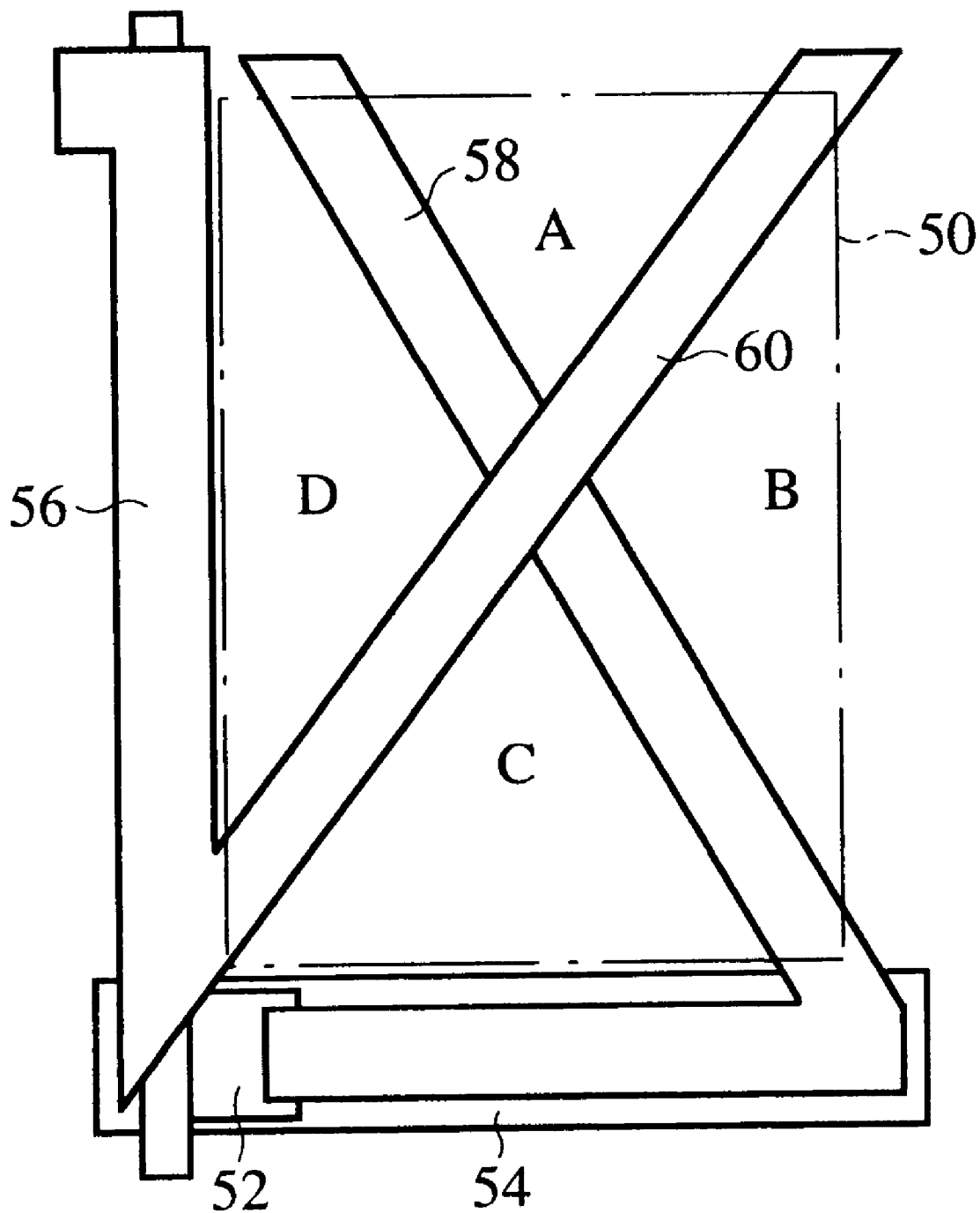
FIG. 21 is a perspective view of a modification of the liquid crystal display device according to the seventh embodiment of the present invention.

FIG. 20B is a graph showing relationships between a thickness shown in FIG. 20A (gap thickness) d of the liquid crystal layer when the liquid crystal has an $\Delta n=0.067$ refractive index anisotropy. The regions where the coloring is distinct in the slant directions are hatched.

As apparent in FIG. 20, the problem of the coloring can be solved when $\Delta n$ is 0.067, and a gap thickness is 7.5 $\mu$m, i.e., $\Delta n \times d$ is substantially 0.5. This will be detailed.

Generally, as the $\Delta d$ decreases, a higher response speed can be obtained and the coloring is more distinct. From this viewpoint, it is preferable that the $\Delta nd$ is as small as possible. However, with a too small $\Delta$, $\alpha$ is low, and it is not preferable that the $\Delta d$ is too small. Improvement of the response speed can depend on improvement of liquid crystal materials, but the $\Delta nd$ uniquely determining the coloring has an allowable maximum value.

According to experiments made by the inventors of the present application, it was found that when the coloring was evaluated based on the coloring as viewed slantly at 45°, 0.5 was a threshold value of the $\Delta nd$. That is, when the $\Delta$ was 0.2, 0.3 and 0.4, the liquid crystal panel had no coloring. When the $\Delta nd$ was 0.5, a little coloring generated, and when the $\Delta nd$ was 0.6, the coloring was distinct.

On the other hand, from the viewpoint of brightness, in a case that all the liquid crystal molecules are oriented at 45° to the axes of the polarizing plates, because $\Delta nd=\frac{1}{2}\lambda$ is necessary to output the liner polarized light, turned by 90°, the actual liquid crystal panel must have a liquid crystal thickness larger than the value. This is because liquid crystal molecules near the surface of the oriented film are not substantially deformed when a voltage is applied without influence on or contribution to the polarization.

A modification of the liquid crystal display device according to the present embodiment is shown in FIG. 21. In the liquid crystal display device shown in FIG. 21, different from the liquid crystal display device of FIG. 17, the picture element layer 58 connected to the TFT device 52 is formed along the diagonal slantly traversing the picture element region 50 from the lower right corner to the upper left corner, and the opposed electrode layer 60 is formed along the diagonal slantly traversing the picture element region 50 from the lower left corner to the upper right corner.

The picture element region 50 is divided into four triangular regions A, B, C, D by the picture element electrode 58 and the opposed electrode layer 60 as in the liquid crystal display device of FIG. 17. The operation of the modification at the time that a voltage is applied thereto is the same as the liquid crystal display device of FIG. 17.

As described above, according to the present embodiment, a voltage is applied by the use of the picture element electrode and the opposed electrode formed on the TFT substrate and the opposed substrate, whereby a large view angle equal to or larger than that obtained by in-plane switching (IPS). Since the picture element electrode and the opposed electrode are formed on different substrates, the liquid crystal display device can have a large view angle and high precision without considering short-circuit between the adjacent electrodes. Furthermore, according to the present embodiment, view angle characteristics with respect to incident light in all the directions are the same, whereby the liquid crystal display device can have a large view angle substantially without dependence on the vertical and horizontal directions.

An Eighth Embodiment

Figure 22:
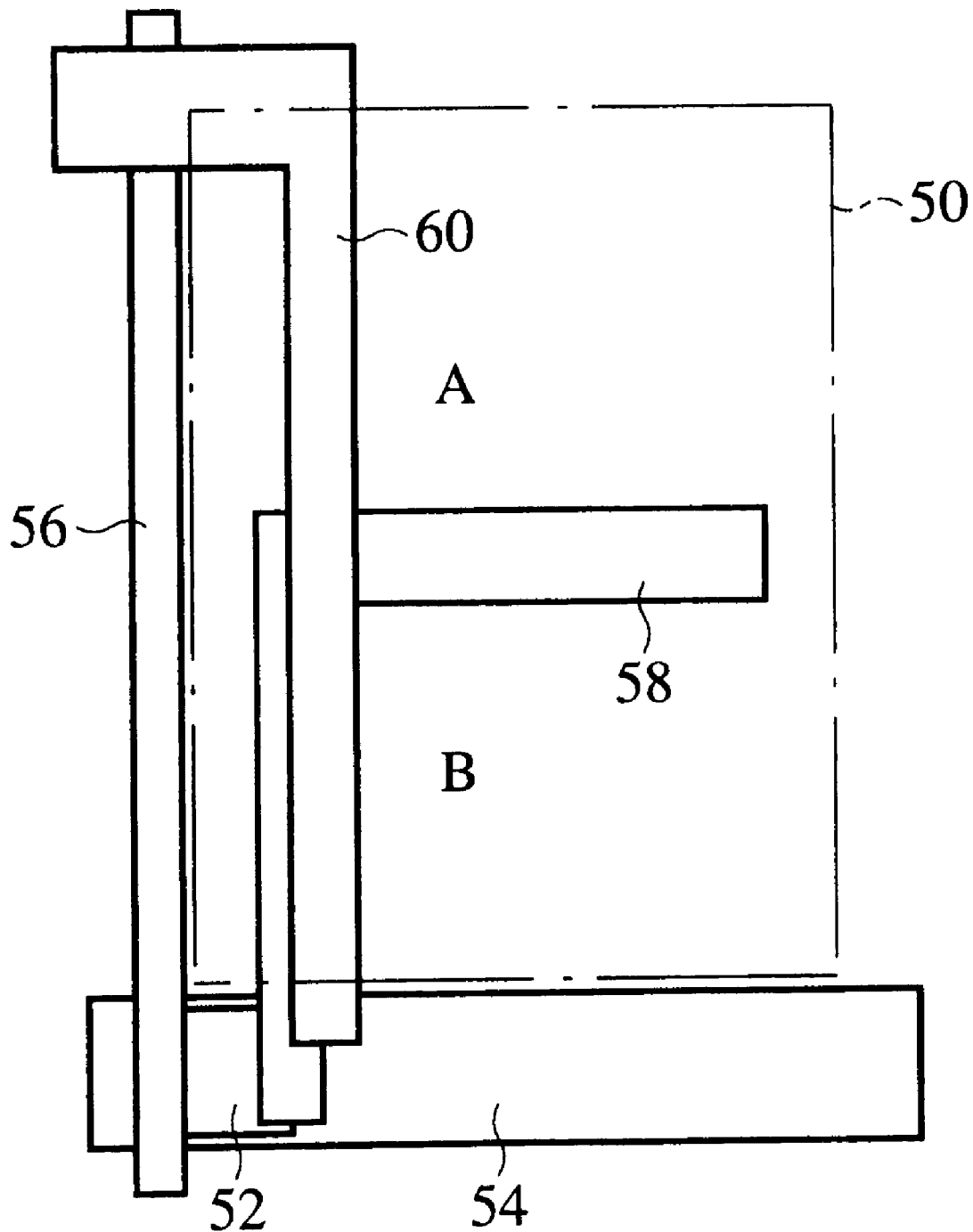
FIG. 22 is a plan view of the liquid crystal display device according to an eighth embodiment of the present invention.
Figure 23A:
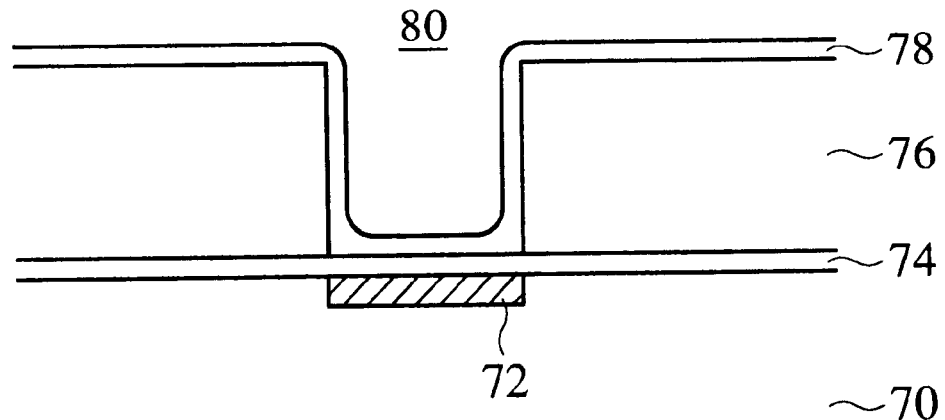
FIGS. 23A and 23B are sectional views of a major part of the liquid crystal display device according to the eighth embodiment of the present invention.

The liquid crystal display device according to an eighth embodiment of the present invention will be explained with reference to FIGS. 22 to 24. FIG. 22 is a plan view of the liquid crystal display device. FIG. 23 is sectional view of a major part of the liquid crystal display device according to the present embodiment. FIG. 24 is a plan view of one modification of the liquid crystal display device of FIG. 22. The same member of the modification as those of the seventh embodiment are represented by the same reference numbers.

As shown in FIG. 22, the present embodiment is different from the seventh embodiment in the shape of the picture element electrode layer 58 and the opposed electrode layer 60, and is the same as the seventh embodiment shown in FIGS. 17 to 21 in the other respects.

In the present embodiment, a picture element electrode layer 58 connected to the source of a TFT device 52 is extended along the outer edge of a picture element region 50 and bent right substantially at the center of the picture element region 50. An opposed electrode layer 60 is extended along the outer edge of the picture element region 50. The picture element region 50 is divided in two regions A, B by the picture element electrode layer 58 and the opposed electrode layer 60.

When a voltage is applied between the picture element electrode layer 58 and the opposed electrode layer 60, electric fields of different directions from each other are applied to the two rectangular regions A, B divided by the picture element electrode layer 58 and the opposed electrode layer 60. The electric fields have an intensity increasing toward the intersection between the picture element electrode layer 58 and the opposed electrode layer 60. Accordingly, a liquid crystal layer 62 starts to change its orientation at the intersection between the picture element electrode layer 58 and the opposed electrode layer 60, and the change gradually spreads all over the regions.

Consequently, the liquid crystal layer 62 is oriented symmetrically with respect to the intersection between the picture element electrode layer 58 and the opposed electrode layer 60 and is oriented more intensely toward the intersection. The electric fields applied to the two rectangular regions A, B are imperfectly but substantially transverse (slant to the picture element region 50), and liquid crystal molecules are substantially oriented slantly in the respective regions A, B.

According to the present embodiment, both the picture element electrode layer 58 and the opposed electrode layer 60 are parallel with the picture element region 50, and with a gate bus line and a drain bus line, which facilitates patterning.

Then, with reference to FIG. 23, the electrode layer of a black matrix layer will be explained.

Usually the liquid crystal display device includes a light sealing film called a black matrix layer. The black matrix layer is made of a metal, such as Cr or others. In the present embodiment, an electrode layer for applying a voltage to the liquid crystal layer is formed of a metal black matrix layer.

In the color liquid crystal display device, a black matrix layer 72, an ITO layer 74, a color film layer 76 and an orientation film 78 are formed on a glass substrate 70. As shown in FIG. 23A, in the present embodiment, the black matrix layer 72 is patterned as the electrode layer, and the color filter layer 76 is opened in the pattern of the electrode layer. Thus, the black matrix layer 72 is exposed, whereby a voltage can be applied to a liquid layer 80.

Figure 23B:
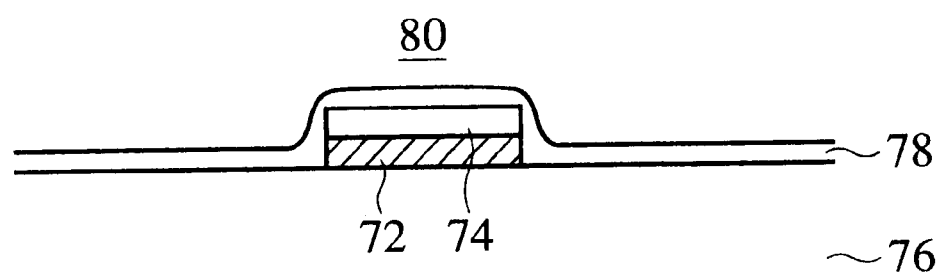
Figure 24:
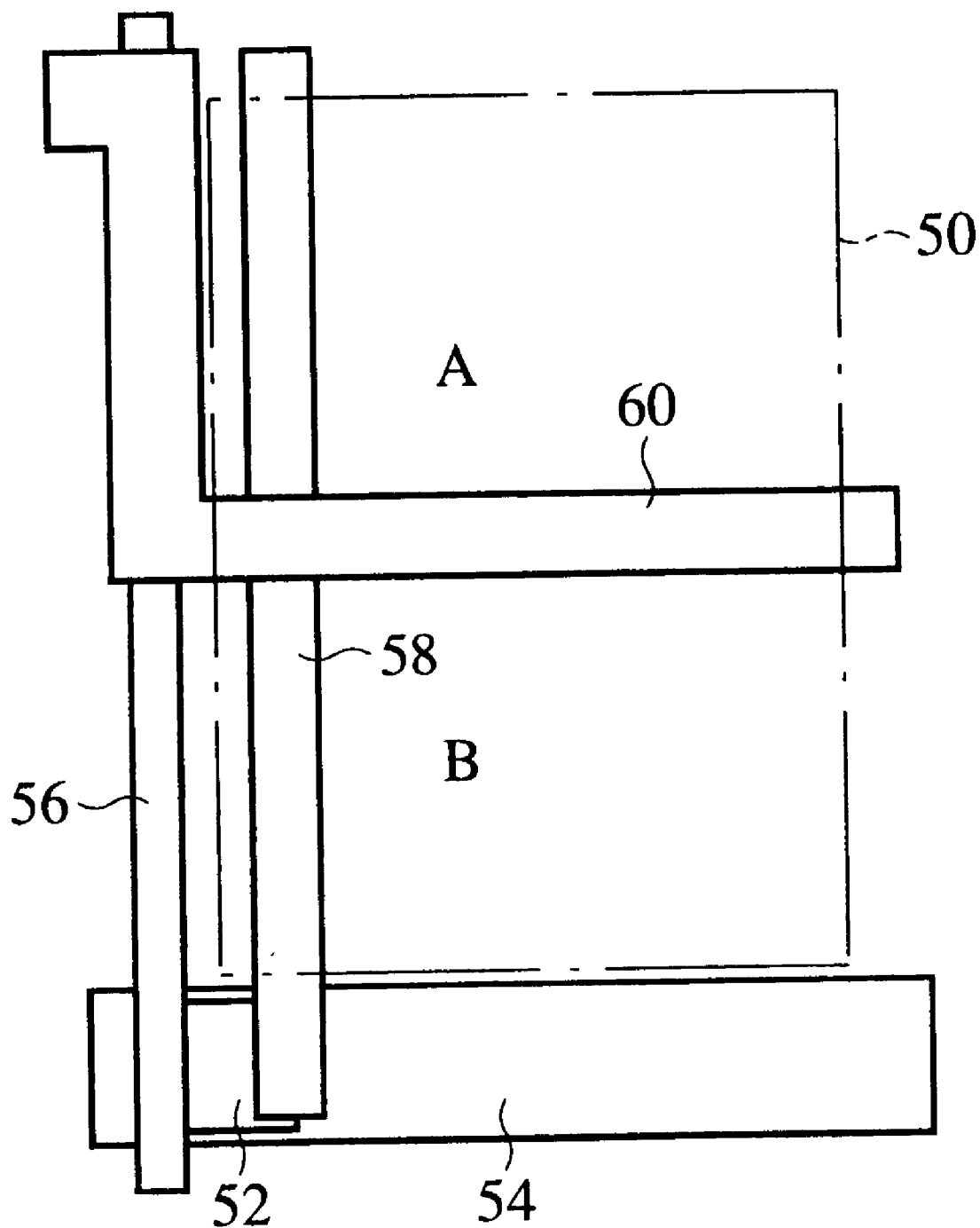
FIG. 24 is a plan view of the liquid crystal display device according to the eighth embodiment of the present invention.

As shown in FIG. 23B, the black matrix layer patterned in the shape of the electrode layer, and the ITO layer 74 are formed on the color filter layer 76, whereby a voltage can be applied to the liquid crystal layer 80 by the black matrix layer 72.

A modification of the liquid crystal display device according to the present embodiment is shown in FIG. 24. The modification includes a picture element electrode layer 58 and an opposed electrode layer 60 patterned opposite to those of the liquid crystal display device shown in FIG. 22. The picture element electrode layer 58 connected to the source of a TFT device 52 is formed along the left outer edge of a picture element region 50, and the opposed electrode layer 60 is extended along the outer edge of the picture element region 50 from the top of the left outer edge thereof and bent at a right angle substantially at the center of the picture element region 50.

As described above, according to the present embodiment, by applying a voltage by the use of the picture element electrode and the opposed electrode formed on the TFT substrate and the opposed substrate, a wide view angle equal to or larger than that obtained by in-plane switching (IPS) can be obtained. The picture element electrode and the opposed electrode are formed on different substrates from each other, whereby the liquid crystal display device can have a large view angle and high precision without a short-circuit resulting between the adjacent electrodes. Furthermore, according to the present embodiment, the patterns of the electrode layers are parallel with the gate bus line and the drain bus line along the outer edge of the picture element region 50, which facilitates the fabrication. In addition, the electrode layers can be formed of a black matrix layer, which does not add fabrication steps.

The specific patterns of the electrodes are not limited to those of the present embodiment described above and can have various shapes considering wiring, relationships between adjacent picture elements, etc.

A Ninth Embodiment

Figure 25:
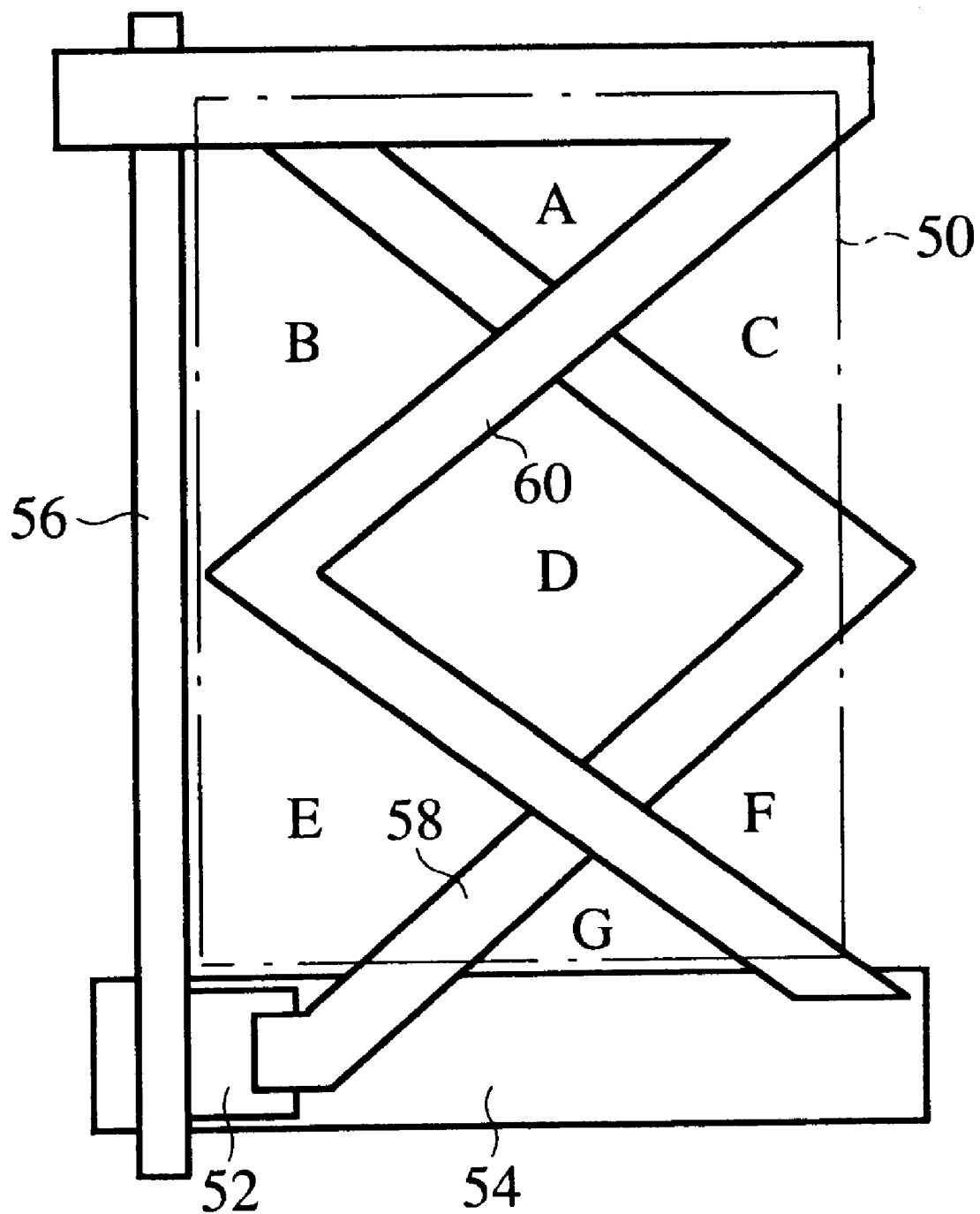
FIG. 25 is a plan view of the liquid crystal display device according to a ninth embodiment of the present invention.
Figure 26A:
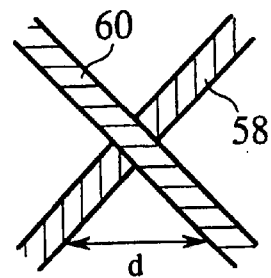
FIG. 26A is a closeup of the liquid crystal display defining a thickness for the ninth embodiment.

The liquid crystal display device according to a ninth embodiment of the present invention will be explained with reference to FIGS. 25 to 27. FIG. 25 is a plan view of the liquid crystal display device according to the present embodiment. FIG. 26 is a view explaining the operation of the liquid crystal device according to the present embodiment. FIG. 27 is a plan view of a modification of the liquid crystal display device according to the present embodiment. The same members of the ninth embodiment as the seventh embodiment shown in FIGS. 17 to 21 are represented by the same reference numbers.

The present embodiment is different from the seventh embodiment in shapes of a picture element electrode layer 58 and an opposed electrode layer 60. The rest of the structure of the present embodiment is the same as that of the seventh embodiment.

In the present embodiment, as shown in FIG. 25, a picture element electrode layer 58 connected to the source of a TFT device 52 traverses the picture element region 50 in a horizontal V-shape. An opposed electrode layer 60 also traverses the picture element region 50 in a horizontal V shape. The picture element electrode layer 58 and the opposed electrode layer 60 intersect each other at two points. The picture element region 50 is divided in seven regions A, B, C, D, E, F, G by the picture element electrode layer 58 and the opposed electrode layer 60.

When a voltage is applied between the picture element electrode layer 58 and the opposed electrode layer 60, electric fields having different direction from each other are applied to the seven regions A, B, C, D, E, F, G divided by the picture element electrode layer 58 and the opposed electrode layer 60. An intensity of the electric fields increases toward the intersections between the picture element electrode layer 58 and the opposed electrode layer 60. Accordingly a liquid crystal layer 62 starts to change its orientation at the intersections between the picture element electrode layer 58 and the opposed electrode layer 60 and changes its orientation gradually in all of the region.

Consequently, the liquid crystal layer 52 is oriented symmetrically with respect to the two intersections between the picture element electrode layer 58 and the opposed electrode layer 60 and is oriented more intensely toward the intersections. Electric fields which are not perfectly but substantially horizontal are applied to the seven regions A, B, C, D, E, F, G, and liquid crystal molecules are horizontally oriented.

The liquid crystal display device according to the present embodiment has a risk that because the picture element electrode layer 58 and the opposed electrode layer 60 are more spaced from each other as they are more apart from the intersections, electric fields of a sufficient intensity could not be applied to the liquid crystal layer, and the liquid crystal molecules could not be horizontally oriented.

Figure 26B:
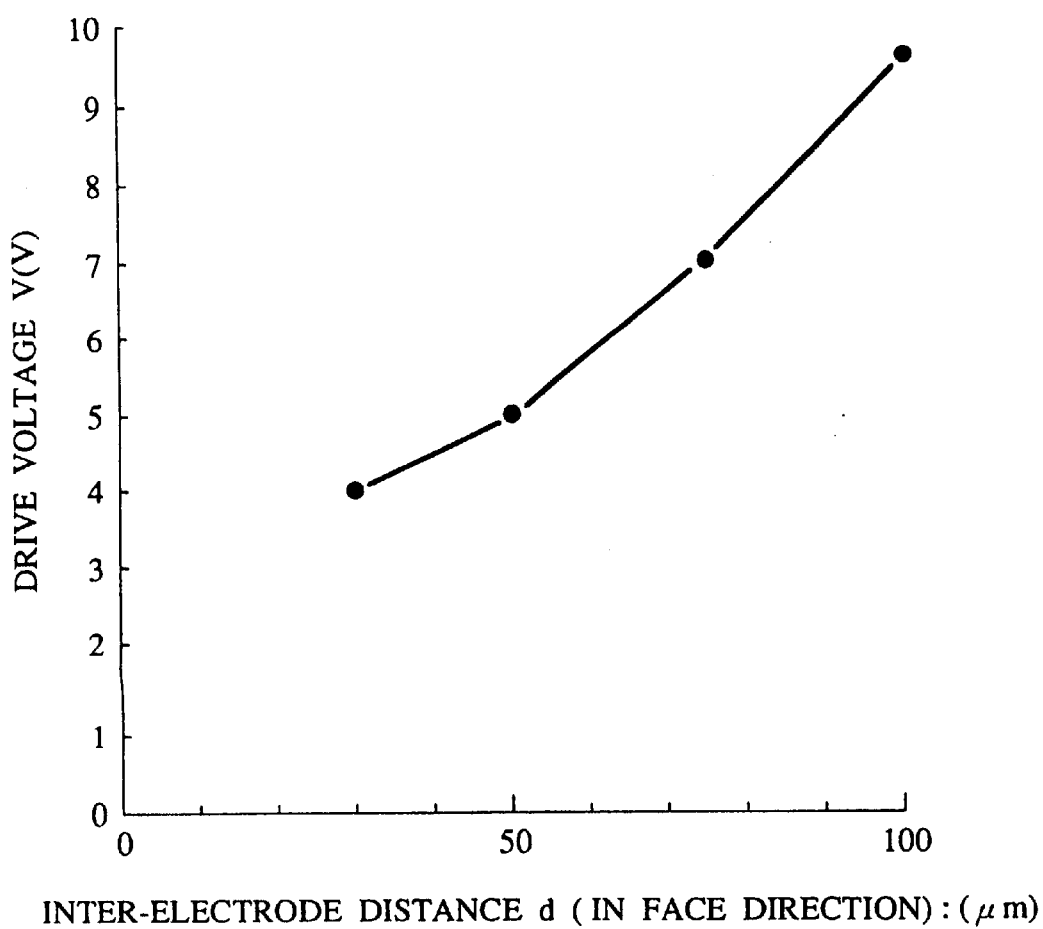
FIG. 26B is a graph explaining the operation of the liquid crystal display device according to the ninth embodiment of the present invention.
Figure 27:
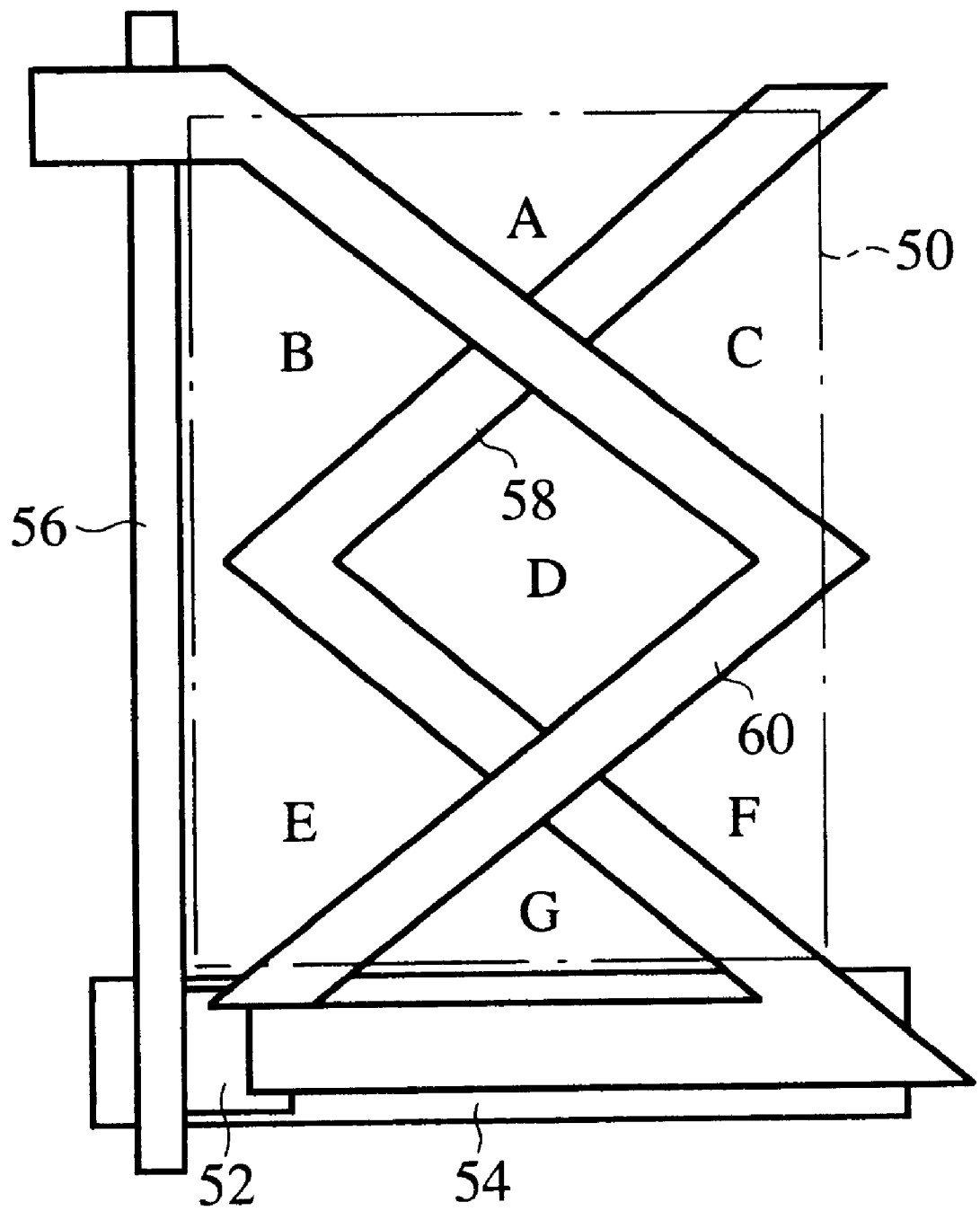
FIG. 27 is a plan view of a modification of the liquid crystal display device according to the ninth embodiment of the present invention.

The graph shown in FIG. 26B shows relationships between maximum distances d (defined in FIG. 26A) between the picture element electrode layer 58 and the opposed electrode layer 60, and drive voltages V required to orient the liquid crystal. Larger maximum distances d require higher drive voltages V. A length of the outer edge of the usual picture element region 50 is about 50 $\mu$m, and accordingly a maximum distance d is about 50 $\mu$m. The graph of FIG. 26B shows that the liquid crystal can be driven at a drive voltage of below about 5 V.

FIG. 27 shows a modification of the liquid crystal display device according to the present embodiment. In the modification patterns of a picture element electrode layer 58 and an opposed electrode layer 60 are opposite to those of the picture element electrode 58 and the opposed electrode layer 60. A picture element electrode layer 58 connected to the source of a TFT device 52 is extended along the lower outer edge, forming a horizontal V-shape. An opposed electrode layer 60 has a V-shape opposed to the picture element electrode 50.

As described above, according to the present embodiment, by applying a voltage by the use of the picture element electrode and the opposed electrode formed on the TFT substrate and the opposed substrate, a wide view angle equal to or larger than that obtained by in-plane switching (IPS) can be obtained. The picture element electrode and the opposed electrode are formed on different substrates from each other, whereby the liquid crystal display device can have a large view angle and high precision without a short-circuit resulting between the adjacent electrodes. According to the present embodiment, the liquid crystal layer of one picture element region is divided in the seven regions, which enables a large uniform view angle for a direction.

Specific patterns of the electrodes are not limited to the patterns of the present embodiment described above and can have various shapes considering wiring, relationships of adjacent picture elements, etc.

A Tenth Embodiment

Figure 28:
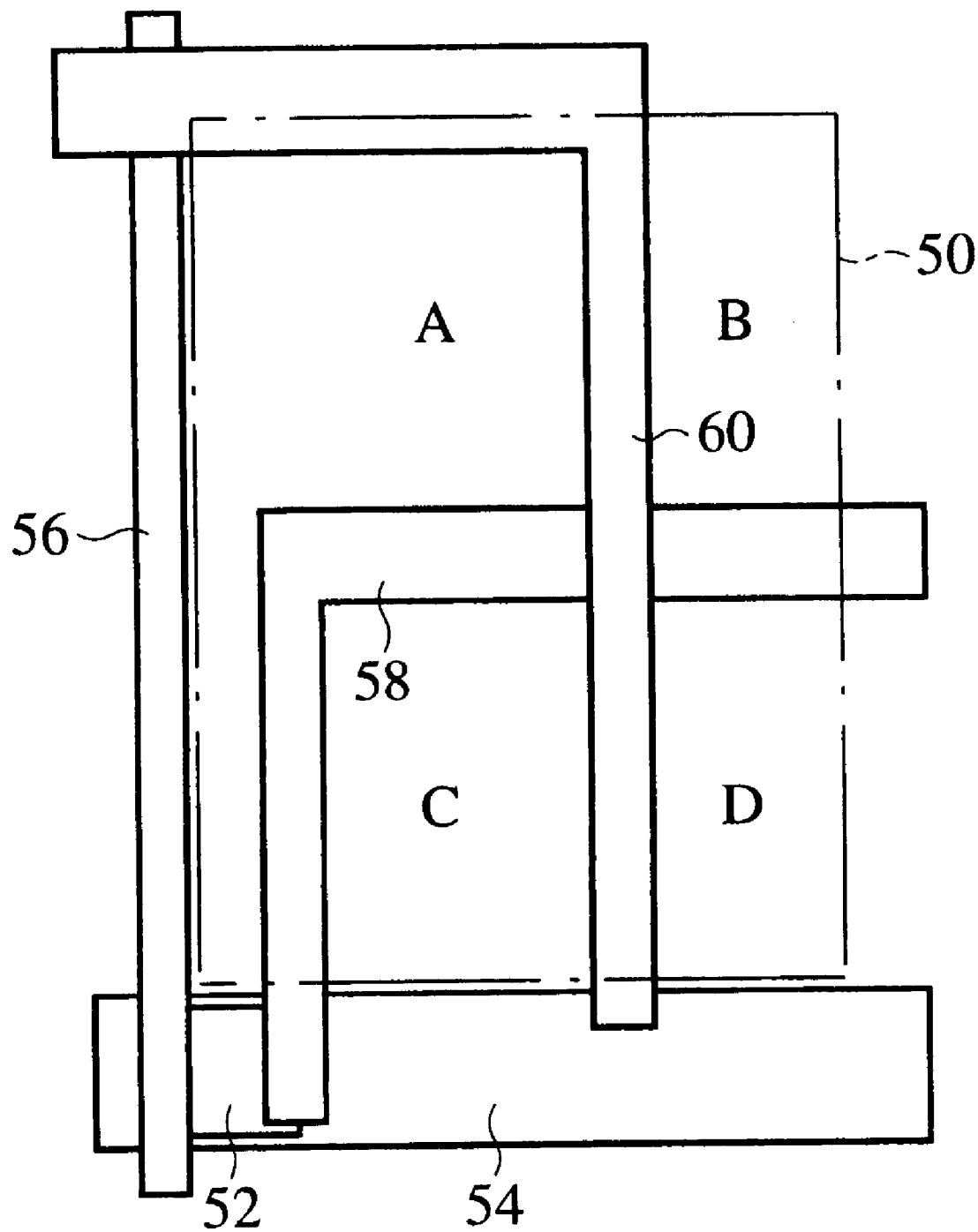
FIG. 28 is a plan view of the liquid crystal display device according to a tenth embodiment of the present invention.
Figure 29:
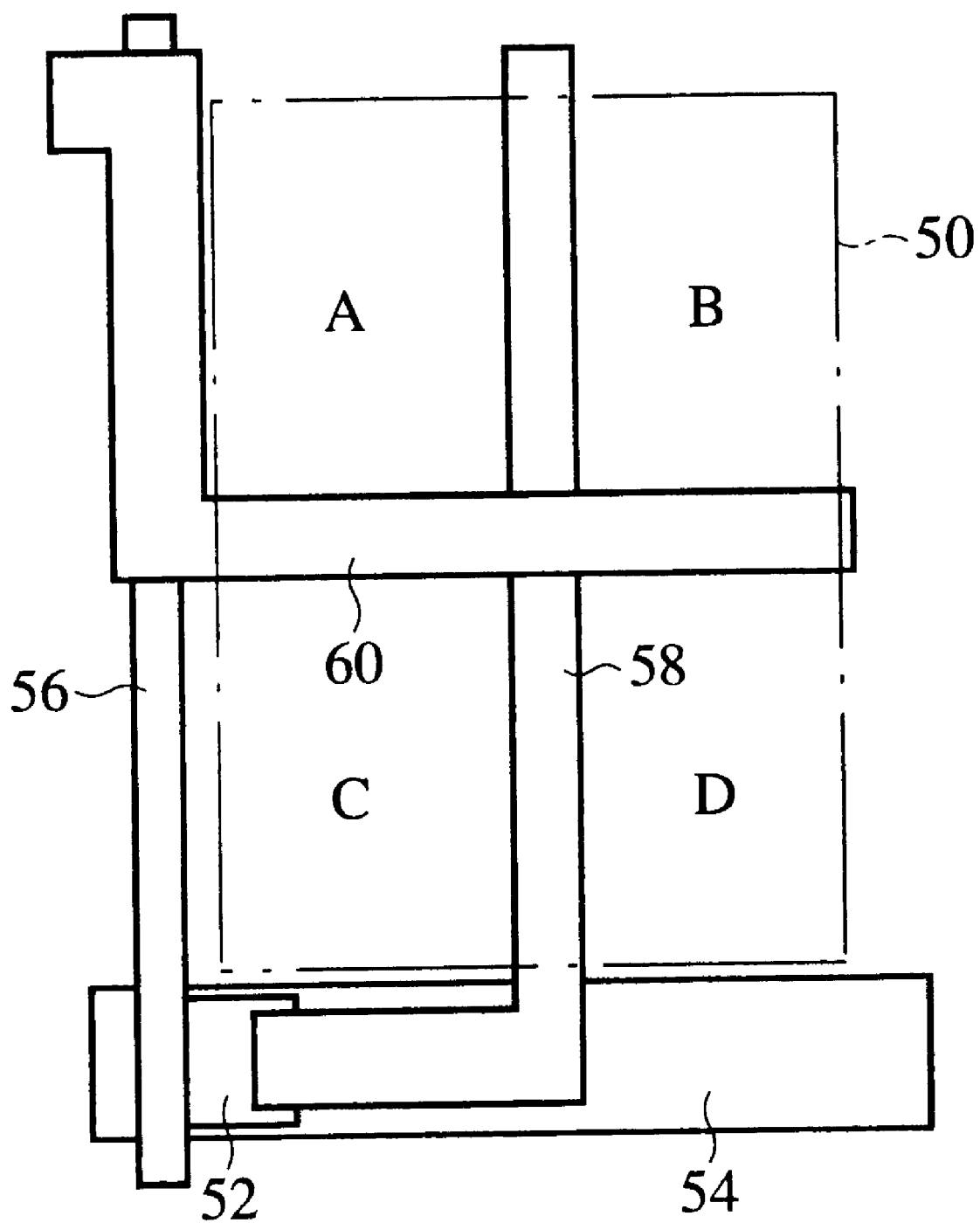
FIG. 29 is a plan view of a modification of the liquid crystal display device according to the tenth embodiment of the present invention.

The liquid crystal display device according to a tenth embodiment of the present invention will be explained with reference to FIGS. 28 and 29. FIG. 28 is a plan view of the liquid crystal display device according to the present embodiment. FIG. 29 is a plan view of a modification of the liquid crystal display device of FIG. 28. The same members of the present embodiment as the seventh embodiment are represented by the same reference numbers as those of the seventh embodiment.

The present embodiment is different from the seventh embodiment in the shapes of a picture element electrode layer 58 and an opposed electrode layer 60. The rest of the structure of the present embodiment is the same as the seventh embodiment shown in FIGS. 17 to 21.

In the present embodiment, as shown in FIG. 28, a picture element electrode layer 58 connected to the source of a TFT device 52 is extended along the left outer edge of a picture element region 50 and is bent at a right angle substantially at the center of the picture element region 50, forming an L-shape which traverses the picture element region 50. The opposed electrode layer 60 is extended along the upper outer edge of the picture element region 50 and is bent at a right angle substantially at the center of the picture element region 50 forming an L-shape longitudinally traversing the picture element region 50. The picture element electrode layer 58 and the opposed electrode layer 60 intersect each other substantially at the center of the picture element region 50. The picture element region 50 is divided in 4 rectangular regions A, B, C, D by the picture element electrode layer 58 and the opposed electrode layer 60.

When a voltage is applied between the picture element electrode layer 58 and the opposed electrode layer 60, electric fields having different directions from each other are applied to the four regions A, B, C, D divided by the picture element electrode layer 58 and the opposed electrode layer 60. An intensity of the electric fields increases toward the intersections between the picture element electrode layer 58 and the opposed electrode layer 60. Accordingly a liquid crystal layer 62 starts to change its orientation at the intersections between the picture element electrode layer 58 and the opposed electrode layer 60 and changes its orientation gradually in all of the region.

Consequently, the liquid crystal layer 52 is oriented symmetrically with respect to the two intersections between the picture element electrode layer 58 and the opposed electrode layer 60 and is oriented more intensely toward the intersections. Electric fields which are not perfectly but substantially horizontal are applied to the four regions A, B, C, D, and liquid crystal molecules are horizontally oriented.

A modification of the liquid crystal display device according to the present embodiment is shown in FIG. 29. The modification has patterns of a picture element electrode layer 58 and an opposed electrode layer 60 which are reverse to those of the liquid crystal display device of FIG. 28. The picture element electrode 58 is extended along the lower outer edge of a picture element region 50 and is bent at a right angle substantially at the center of the picture element region 50, forming an L-shape longitudinally traversing the picture element region 50. The opposed electrode layer 60 is extended along the left outer edge of the picture element region 50 and is bent at a right angle substantially at the center of the picture element region 50, forming an L-shape traversing the picture element region 50. The picture element electrode layer 50 and the opposed electrode layer 60 intersect each other substantially at the center of the picture element region 50. The picture element region 50 is divided in four rectangular regions A, B, C, D by the picture element electrode layer 58 and the opposed electrode layer 60.

As described above, according to the present embodiment, by applying a voltage by the use of the picture element electrode and the opposed electrode formed on the TFT substrate and the opposed substrate, a wide view angle equal to or larger than that obtained by in-plane switching (IPS) can be obtained. The picture element electrode and the opposed electrode are formed on the different substrates from each other, whereby the liquid crystal display device can have a large view angle and high precision without a short-circuit resulting between the adjacent electrodes. According to the present embodiment, the patterns of the electrode layers are connected to a gate bus line and a drain bus line along the outer edge of the picture element region in parallelism therewith, which permits the fabrication without lowering the aperture ratio.

An Eleventh Embodiment

The liquid crystal display device according to an eleventh embodiment of the present invention will be explained with reference to FIGS. 30 to 33. FIG. 30 is a plan view of a TFT substrate and an opposed substrate of the liquid crystal display device according to the present embodiment. FIG. 31 is a plan view and a sectional view of the liquid crystal displayed device according to the present embodiment. FIG. 32 is an explanatory view explaining the operation of the liquid crystal display device according to the present embodiment. FIG. 33 is a graph of view angle characteristic of the liquid crystal display device according to the present embodiment.

The present embodiment includes the liquid crystal display device according to the above-described third embodiment as the basic structure, and, in addition thereto, features characteristics of the present embodiment, but may include the liquid crystal display device according to any of the above-described embodiments as the basic structure and additionally the characteristic features of the present embodiment. FIGS. 30 and 31 show a panel structure of a picture element region 10 for one picture element of the liquid crystal display device according to the present embodiment. A picture element electrode layer and an opposed electrode layer have the same structure as those of the third embodiment.

Figure 30B:
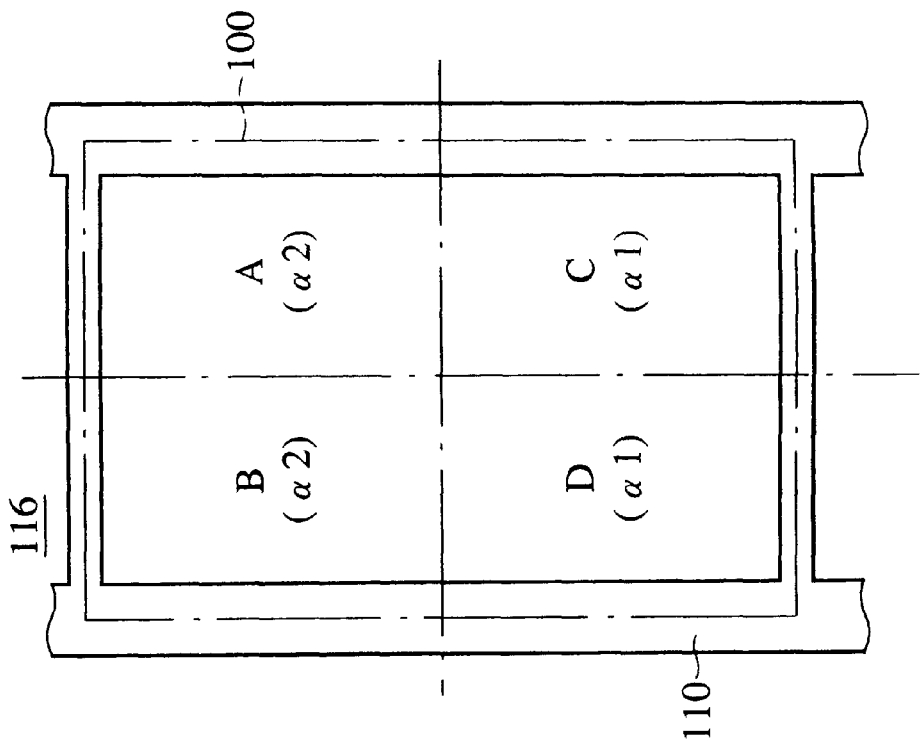
FIGS. 30A and 30B are plan views of a TFT substrate and an opposed substrate of the liquid crystal display device according to an eleventh embodiment of the present invention.
Figure 30A:
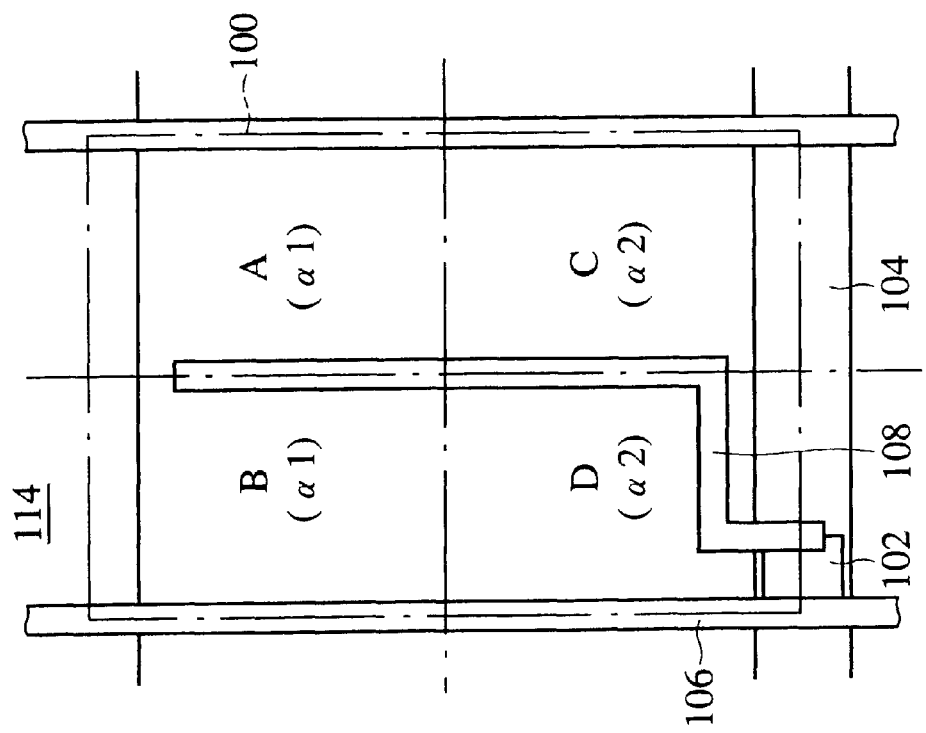

As shown in FIG. 30A, a TFT device 102 is formed on a TFT substrate 114. The gate of the TFT device 102 is commonly connected by a gate bus line 104, and the drain of the TFT device 102 is commonly connected by a drain bus line 106.

The source of the TFT device 102 includes a picture element electrode layer 108 corresponding to the first electrode layer. The picture element electrode layer 108 is formed of ITO along a line traversing the picture element region 100 longitudinally at the center thereof.

As shown in FIG. 30B, an opposed electrode layer 110 corresponding to the second electrode layer is formed on an opposed substrate opposing the TFT substrate. The opposed electrode layer 110 is formed in a rectangular ring along the outer edge of the picture element region 50.

A liquid crystal layer 112 is sealed between the TFT substrate 114 and the opposed substrate 116.

The TFT substrate 114 and the opposed substrate 116 have the surfaces orientation-treated for orienting the liquid crystal layer 112, but the present embodiment is characterized in that a treatment for orientation at two tilt angles different from each other is provided in the picture element region 100.

The orientation treatment is made on the TFT substrate 114 from the bottom to the top. The picture element region 2, which is longitudinally bisected by the picture element electrode layer 108, is further divided by a widthwise parting line. The upper regions A, B of the picture element regions 100 are treated for orientation at a pre-tilt angle α1, and the lower regions C, D are treated for orientation at a smaller pre-tilt angle α2 (<α1).

As is the TFT substrate 114, the opposed substrate 116 is also subjected to the orientation-treatment from the bottom to the top. The picture element region 100 is bisected by a widthwise parting line. In the opposed substrate 116, opposite to the TFT substrate 114, the upper regions A, B are treated for orientation at the pre-tilt angle α2 (<α1), and the lower regions C, D are treated for orientation at the pre-tilt angle α1.

Thus, the four divided regions A, B, C, D of the picture element region 100 have different pre-tilt angles between the TFT substrate 114 and the opposed substrate 116. In the regions A, B, the pre-tilt angle of the TFT substrate 114 is larger than the opposed substrate 116, and in the regions C, D the pre-tilt angle of the opposed substrate 116 is larger than the TFT substrate 114.

Without a voltage applied between the picture element electrode layer 108 and the opposed electrode layer 110, liquid crystal molecules are substantially horizontally oriented in all the regions of the picture element region 100, and a dark state is obtained.

Figure 32A:
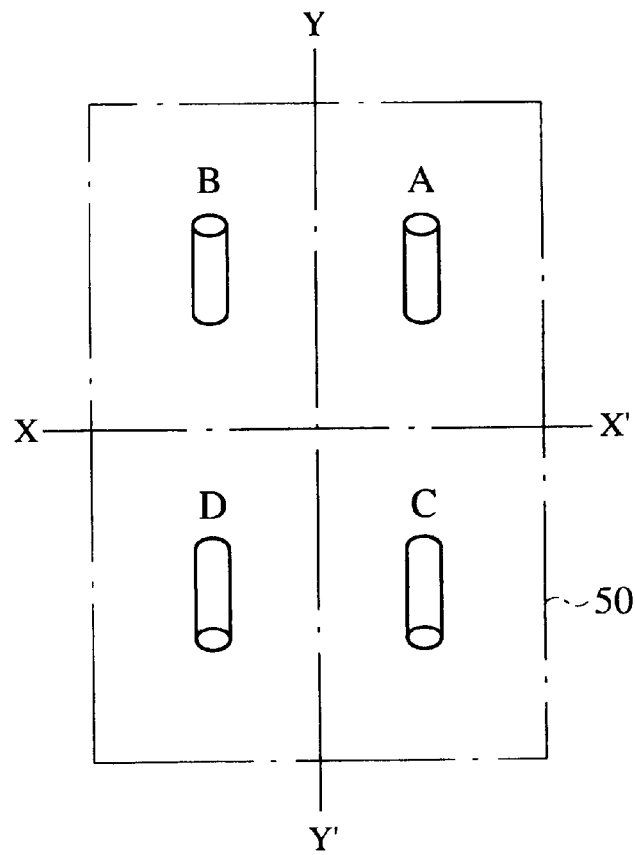
FIGS. 32A and 32B are views explaining the operation of the liquid crystal display device according to the eleventh embodiment of the present invention.
Figure 33:
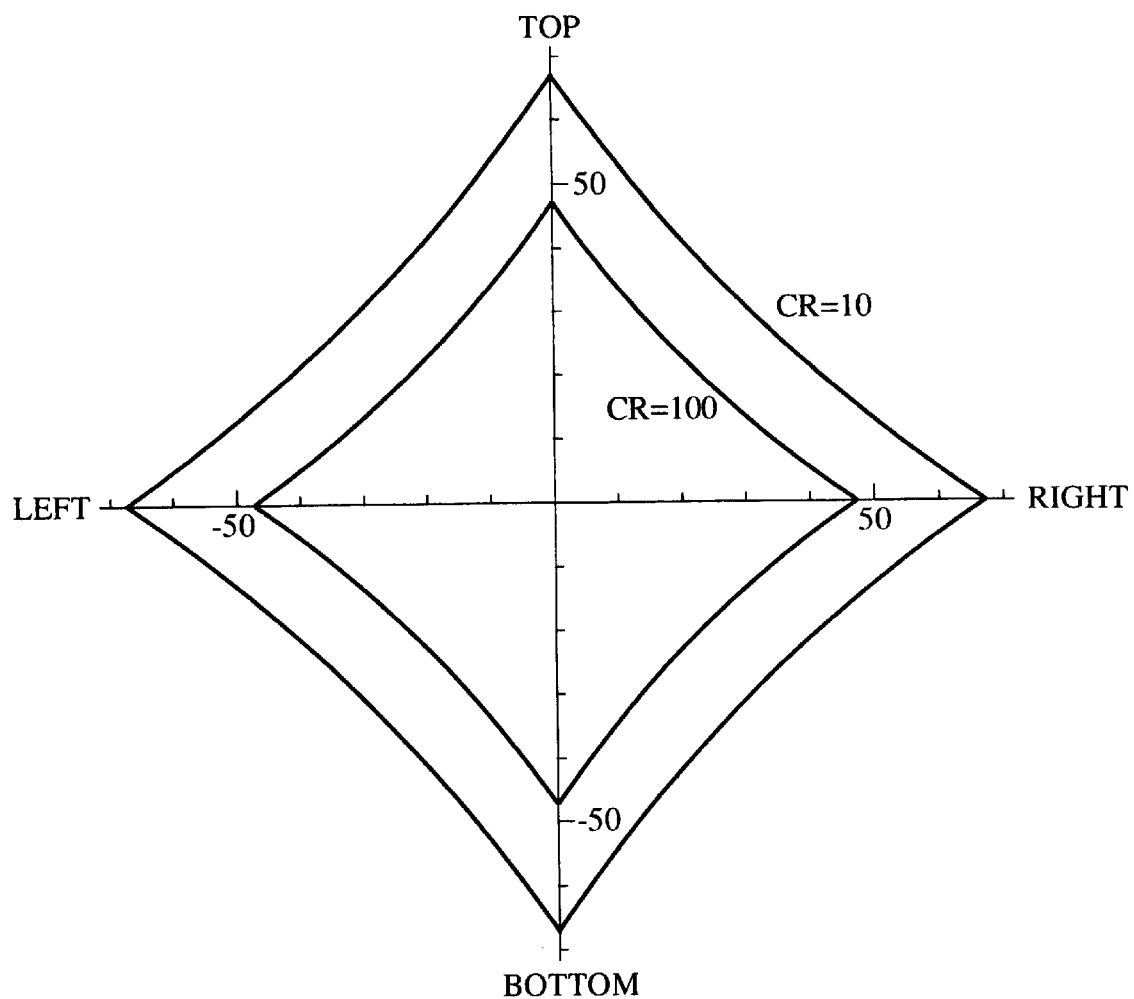
FIG. 33 is a graph of view angle characteristics of the liquid crystal display device according to the eleventh embodiment of the present invention.

However, because of the orientation, and a difference between the pre-tilt angles, as shown in FIG. 32A, in the four regions A, B, C, D the liquid crystal molecules are oriented a little raised in opposite directions with respect to the center of the picture element region 10.

That is, in the regions A, B, because the orientation-treatment is from the bottom to the top, and the pre-tilt angle is larger on the TFT substrate 114, the liquid crystal molecules are oriented with the top sides a little raised. In the regions C, D, because the orientation-treatment is from the bottom to the top, and the pre-tilt angle is smaller on the TFT substrate 114, the liquid crystal molecules are oriented with the bottom sides a little raised.

Figure 32B:
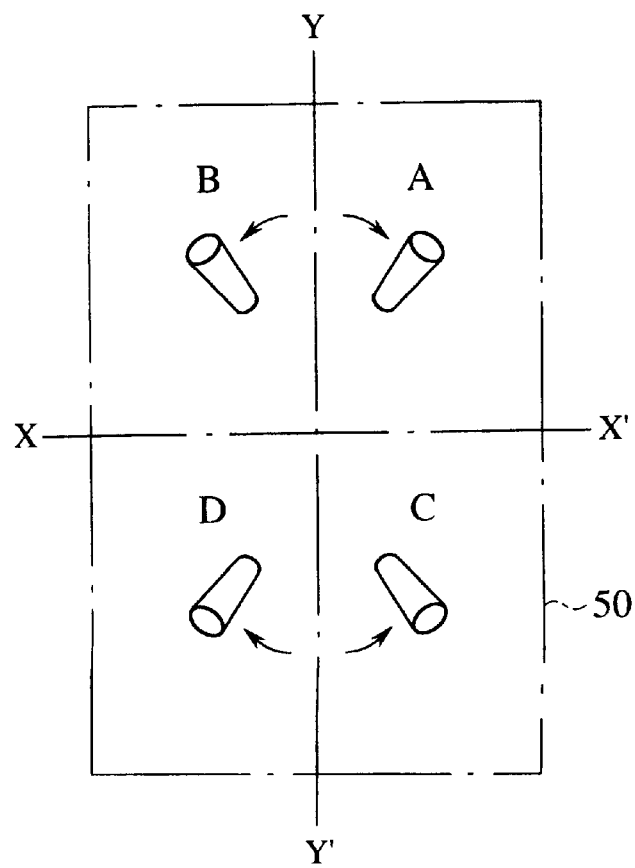

When a voltage is applied between the picture element electrode layer 108 and the opposed electrode layer 110, the liquid crystal molecules in the liquid crystal layer 112 are oriented substantially radially in the four regions A, B, C, D as shown in FIG. 32B because of the electric fields generated by the drive voltage and a difference between the pre-tilt. The change of the orientation caused by the application of the drive voltage is indicated by the arrows in FIGS. 31 and 32B.

As described above, according to the present embodiment, by applying a voltage by the use of the picture element electrode and the opposed electrode formed on the TFT substrate and the opposed substrate, a wide view angle equal to or larger than that obtained by in-plane switching (IPS) can be obtained. The picture element electrode and the opposed electrode are formed on different substrates from each other, whereby the liquid crystal display device can have a large view angle and high precision without a short-circuit resulting between the adjacent electrodes. According to the present embodiment, by more contriving the orientation-treatment and the pre-tilt angle, the picture element region can be divided into further various regions which have orientations different from each other when a drive voltage is applied, whereby large view angles which are uniform in all directions can be obtained.

The graph of FIG. 33 shows view angle characteristics of the liquid crystal display device according to the present embodiment. It is found that the present embodiment can achieve large view angle characteristics. View angles especially in the left-to-right direction and the top-to-bottom are very good. According to the present embodiment, the display is made by four kinds of domains, whereby visual changes of chromaticity are very small.

A Twelfth Embodiment

The liquid crystal display device according to a twelfth embodiment of the present invention will be explained with reference to FIGS. 34 and 35. FIG. 34 is a plan view of a TFT substrate and an opposed substrate of the liquid crystal display device according to the present embodiment. FIG. 35 is a plan view and a sectional view of the liquid crystal display device according to the present embodiment. The same members of the present embodiment as those of the eleventh embodiment of FIGS. 30 and 31 are represented by the same reference numbers not to repeat or to simplify their explanation.

In the present embodiment, a horizontal electric field is applied to a liquid crystal display layer 112 by a picture element electrode layer 108 on a TFT substrate and an opposed electrode layer 110 on an opposed substrate 116, and a region where the picture element electrode 108 and the opposed electrode layer 110 are opposed to each other, whereby # of displays due to accumulation of charges can be prevented.

Figure 34A:
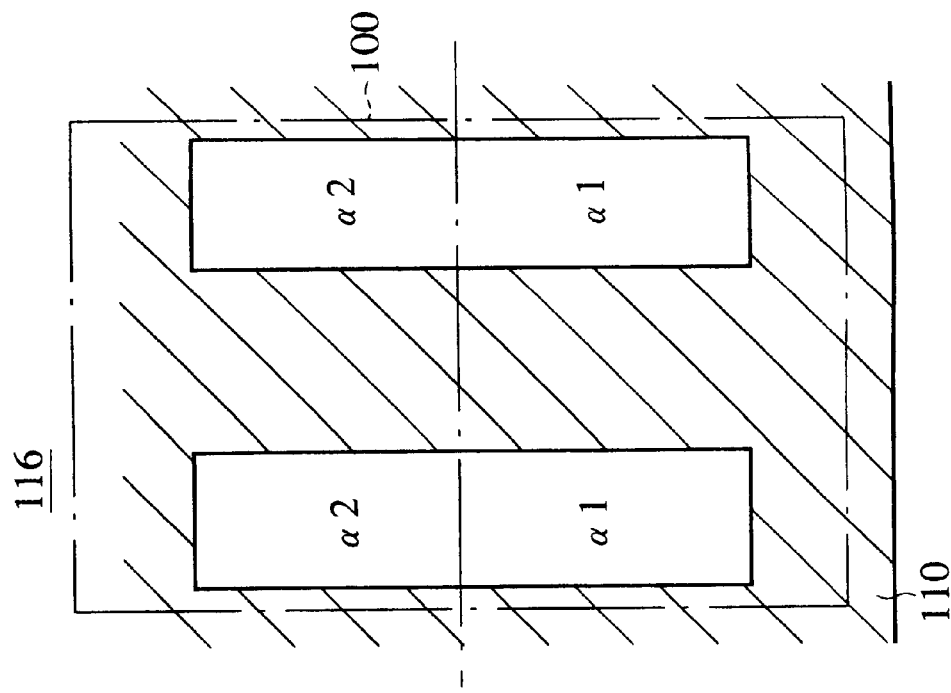
FIGS. 34A and 34B are plan views of a TFT substrate and an opposed substrate of the liquid crystal display device according to a twelfth embodiment of the present invention.

As shown in FIG. 34A, the picture element electrode layer 108 of the TFT substrate 114 has a digital shape having two strips, and each strip is thick. The TFT substrate 14 is treated for orientation from below the picture element region 100 to above the same. The picture element region 100 is longitudinally bisected by the picture element electrode layer 108 and is further bisected by a widthwise parting line. The upper regions of the picture element region 100 are treated for pre-tilt angle α1 orientation, and the lower regions of the picture element region 100 are treated for pre-tilt angle α2 (<α1) orientation.

Figure 34B:
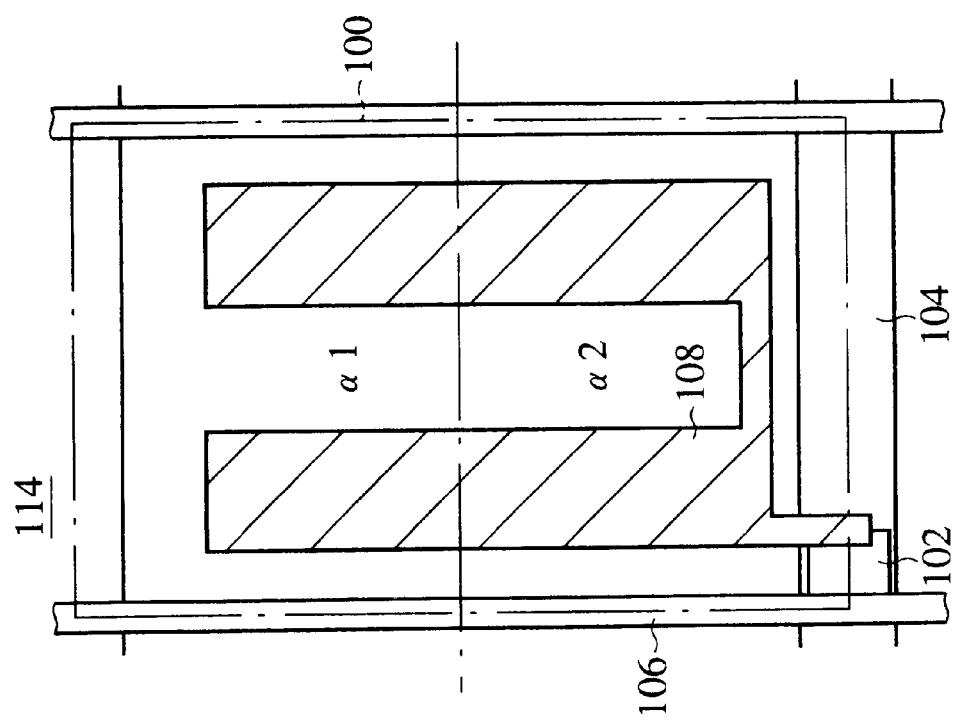

As shown in FIG. 34B, the opposed electrode layer 110 of the opposed substrate 116 has a shape having a thick electrode layer and two windows. As is the TFT substrate 114, the opposed substrate is also treated for orientation from below the picture element region 100 to above the same, and the picture element region 100 is bisected by a widthwise parting line. In the opposed substrate 116, opposite to the TFT substrate 114, the upper region is treated for pre-tilt angle α2 (<α1) orientation, and the lower region is treated for pre-tilt ε1 orientation.

The TFT substrate 114 and the opposed substrate 116 are opposed to each other with a liquid crystal layer intervening therebetween as shown in FIG. 35, and a non-opposed region where a horizontal electric field is applied to the liquid crystal layer 12 by the picture element electrode layer 108 and the opposed electrode layer 110 is formed while an opposed region where the picture element electrode layer 108 and the opposed electrode layer 110 are opposed to each other. Accordingly, a charge accumulated by a long time of operation is discharged in the opposed region, whereby # can be prevented.

To obtain good view angle characteristics it is preferable that the non-opposed region is larger than the opposed region.

As described above, according to the present embodiment, by applying a voltage by the use of the picture element electrode and the opposed electrode formed on the TFT substrate and the opposed substrate, a wide view angle equal to or larger than that obtained by in-plane switching (IPS) can be obtained. The picture element electrode and the opposed electrode are formed on different substrates from each other, whereby the liquid crystal display device can have a large view angle and high precision without a short-circuit resulting between the adjacent electrodes. According to the present embodiment, the opposed region is provided, whereby it can be effectively prevented that charges are accumulated to $ displays.

MODIFICATIONS

The present invention is not limited to the above-described embodiments and includes various modifications.

For example, in the above-described seventh to the tenth embodiments, the first electrode layer is formed on the TFT substrate, and the second electrode layer is formed on the opposed substrate, but both the first and the second electrode layers may be formed through an insulation film on the TFT substrate or the opposed substrate.

EXAMPLES

Voltage/transmittance characteristics, and gradation inversion characteristics in all directions were measured on the color liquid crystal display devices shown in FIGS. 10 and 11.

The digital electrode layers 40R, 40G, 40B each having four strips were formed on the TFT substrate 32. The electrode layers 44R, 44G, 44B each having three strips were formed on the opposed electrode layer 42. The strips of the respective electrode layers 44R, 44G, 44B were positioned between the strips of the digital electrode layers 40R, 40G, 40B.

The liquid crystal 46 sealed between the TFT substrate 32 and the opposed substrate 42 was provided by a positive-type liquid crystal by Merk Company (Product No.: ZLI-4792).

A width of the strips of the digital electrode layers 40R, 40G, 40G was about 7 $\mu$m, and a pith between the digital electrode layers 40R, 40G, 40B and the strips of the electrode layers 44R, 44G, 44B was about 8 $\mu$m. A gap between the TFT substrate 32 and the opposed substrate 42, i.e., a thickness of the liquid crystal layer 46 was 5 $\mu$m.

Figure 36A:
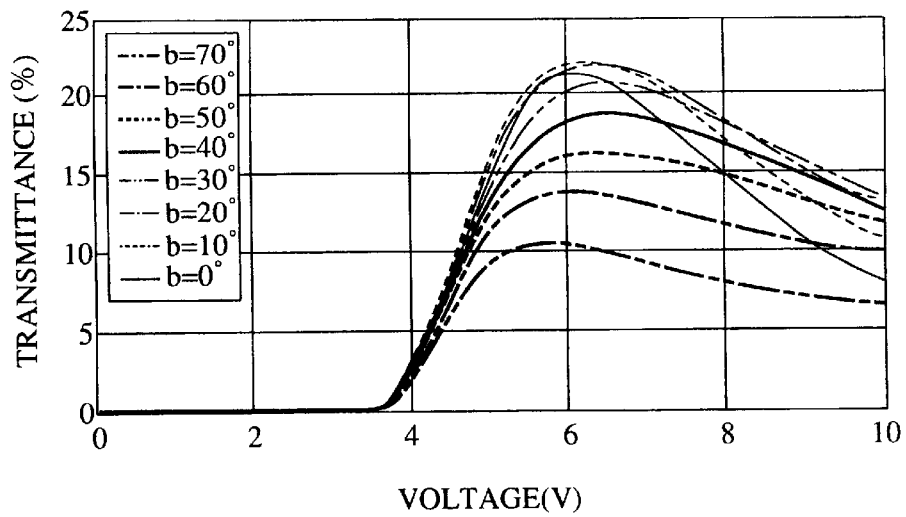
FIGS. 36A and 36B are graphs of voltage/transmittance characteristics, and gradation inversion characteristics of the liquid crystal display device according to the embodiments for +90° orientation.
Figure 36B:
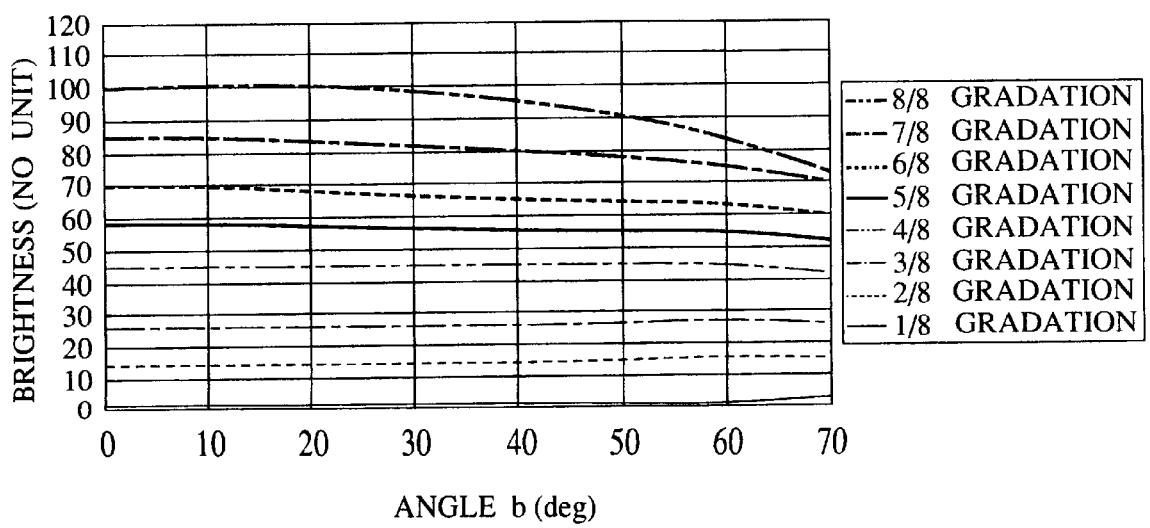
Figure 37A:
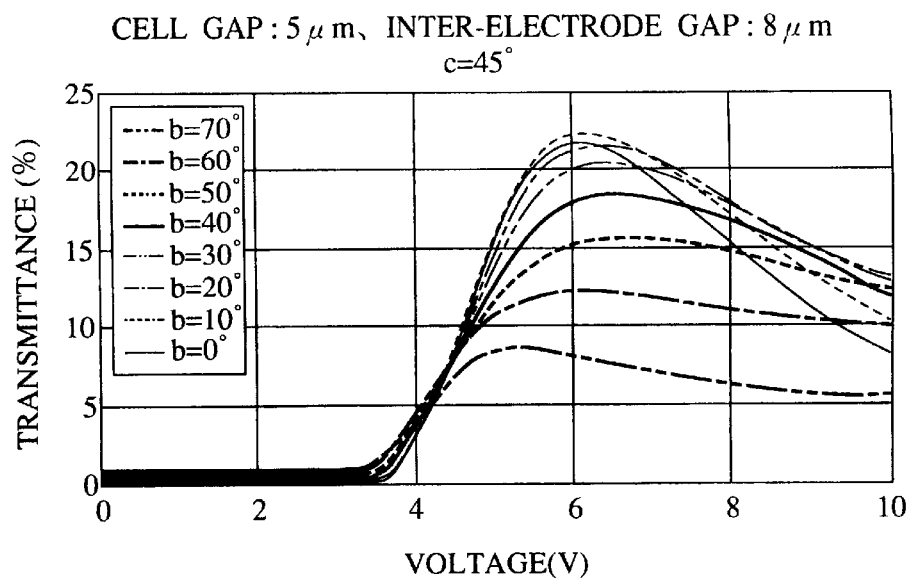
FIGS. 37A and 37B are graphs of voltage/transmittance characteristics, and gradation inversion characteristics of the liquid crystal display device according to the embodiments for +45° orientation.
Figure 37B:
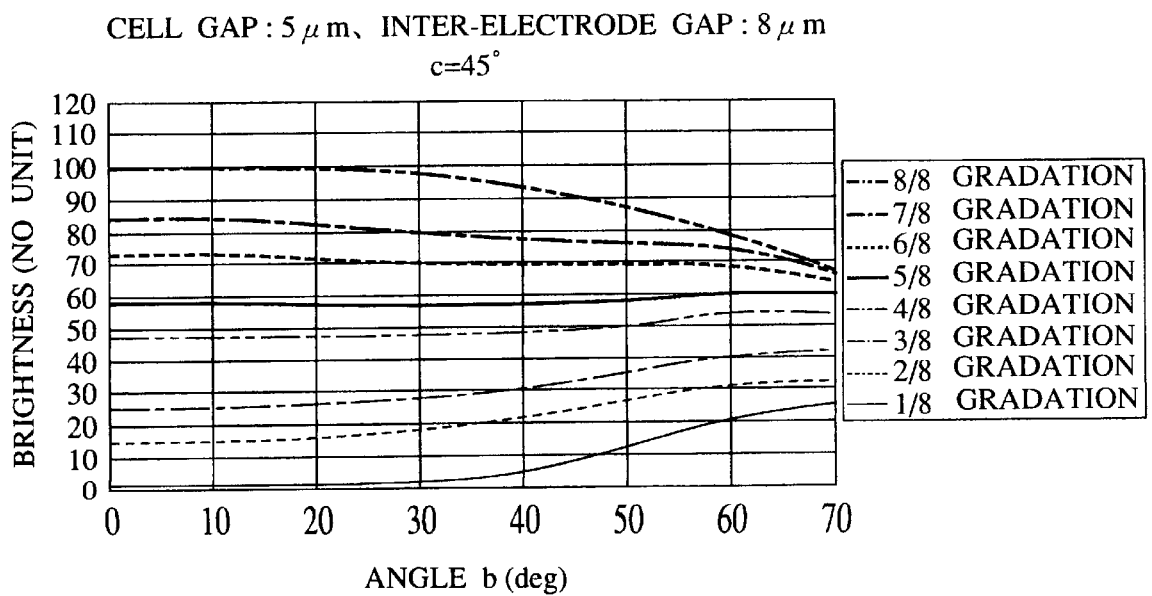
Figure 38A:
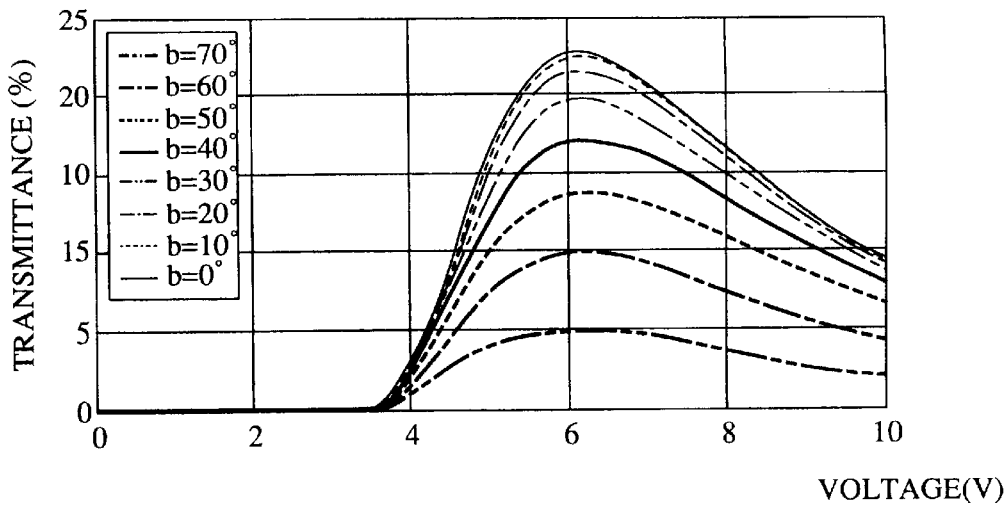
FIGS. 38A and 38B are graphs of voltage/transmittance characteristics, and gradation inversion characteristics of the liquid crystal display device according to the embodiments for 0° orientation.
Figure 38B:
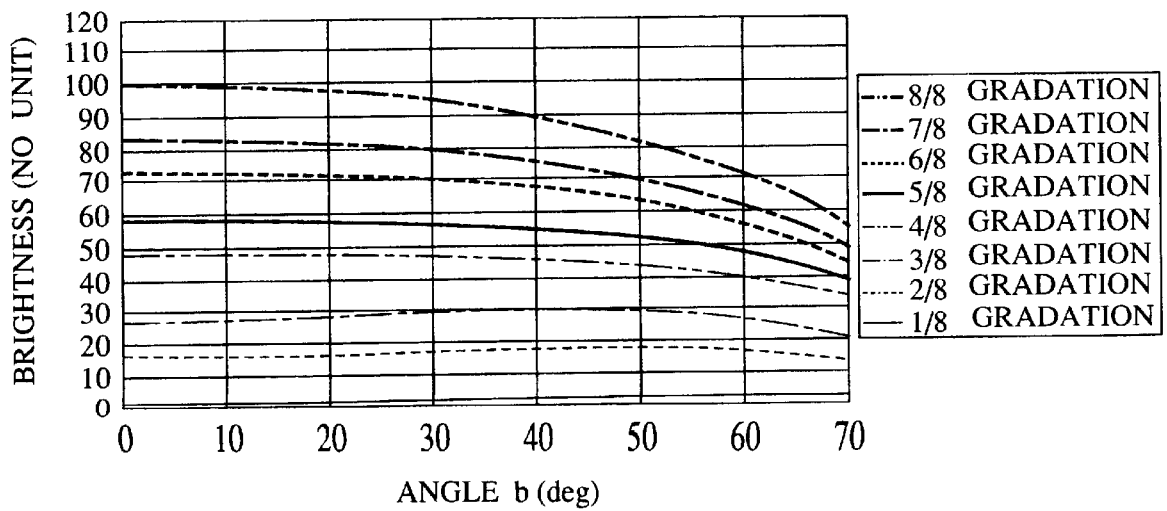
Figure 39A:
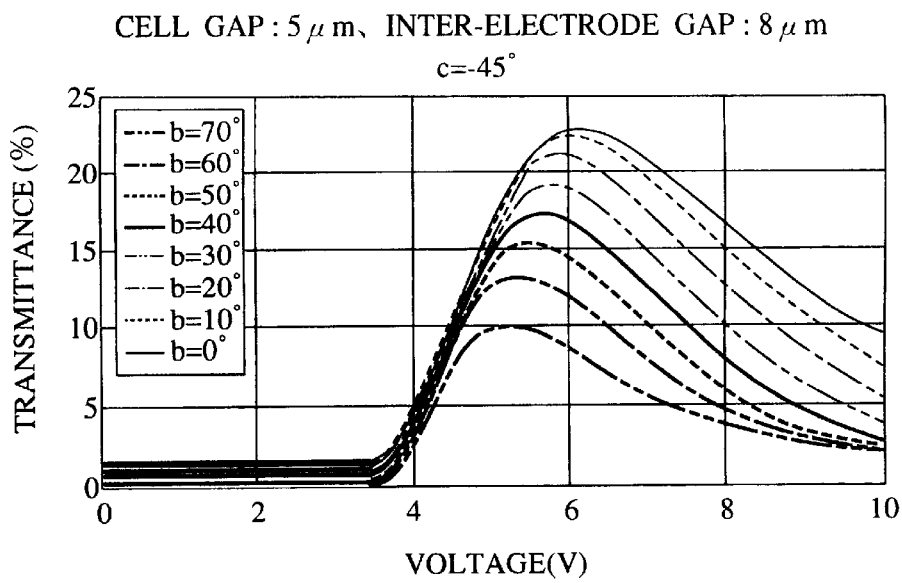
FIGS. 39A and 39B are graphs of voltage/transmittance characteristics, and gradation inversion characteristics of the liquid crystal display device according to the embodiments for −45° orientation.
Figure 39B:
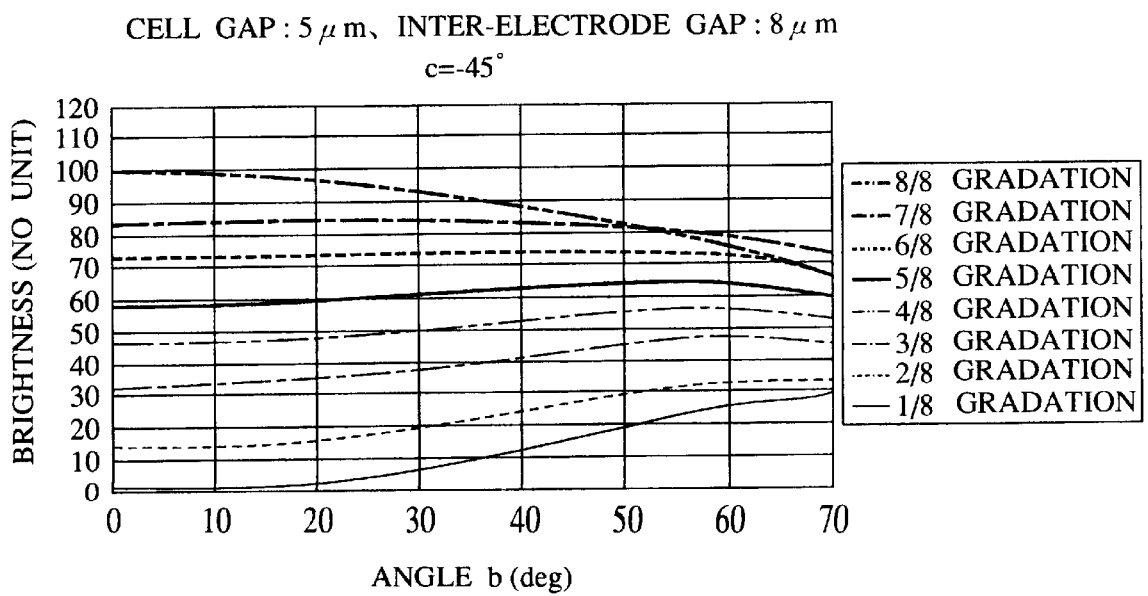
Figure 40A:
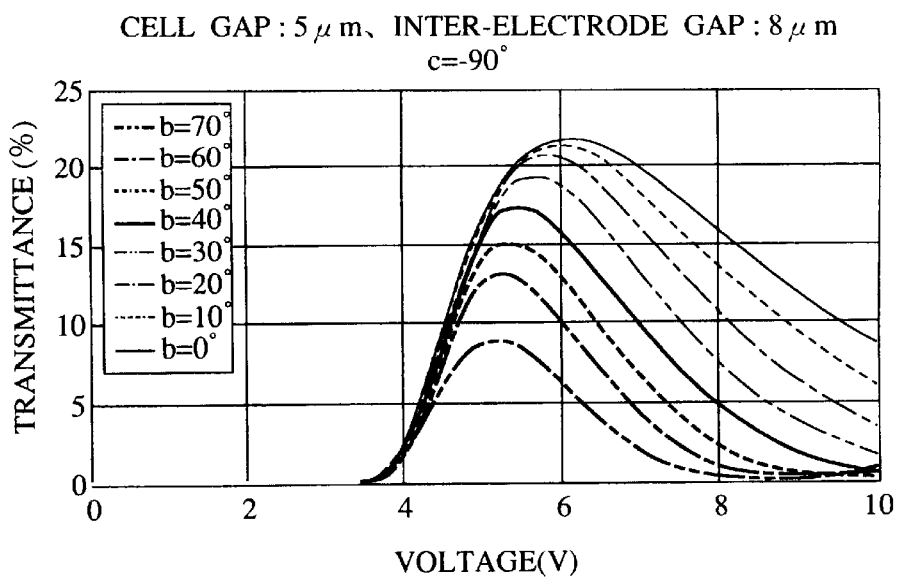
FIGS. 40A and 40B are graphs of voltage/transmittance characteristics, and gradation inversion characteristics of the liquid crystal display device according to the embodiments for −90° orientation.
Figure 40B:
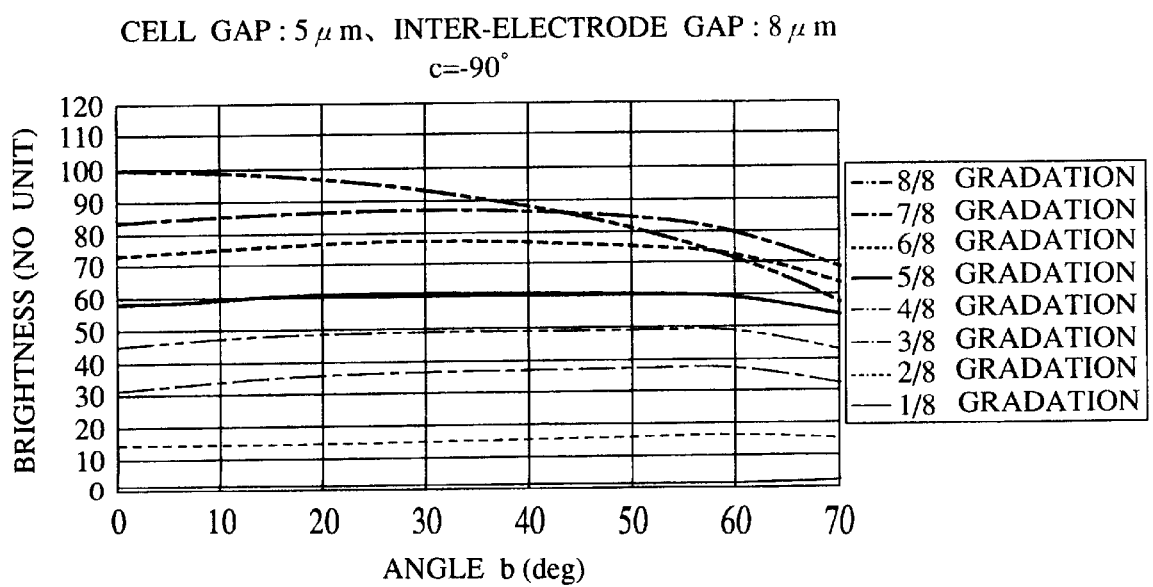

FIGS. 36 to 40 show results of the measurement. FIG. 36 shows voltage/transmittance characteristics, and gradation inversion characteristics for a bearing angle c=+90°. FIG. 37 shows voltage/transmittance characteristics, and gradation inversion characteristics for a bearing angle c=+450°. FIG. 38 shows voltage/transmittance characteristics, and gradation inversion characteristics for a bearing angle c=0°. FIG. 39 shows voltage/transmittance characteristics, and gradation inversion characteristics for a bearing angle c=−45°. FIG. 40 shows voltage/transmittance characteristics, and gradation inversion characteristics for a bearing angle c=−90°. FIGS. 36A to 40A, which are upper in FIGS. 36 to 40 show relationships between applied voltages and transmittances when a bearing angle b was changed from 0° to 70°, and FIGS. 36B to 40B, which are lower in FIGS. 36 to 40 show relationships between bearing angles and brightness obtained when an applied voltage was changed so that 8 gradations were obtained.

Figure 41:
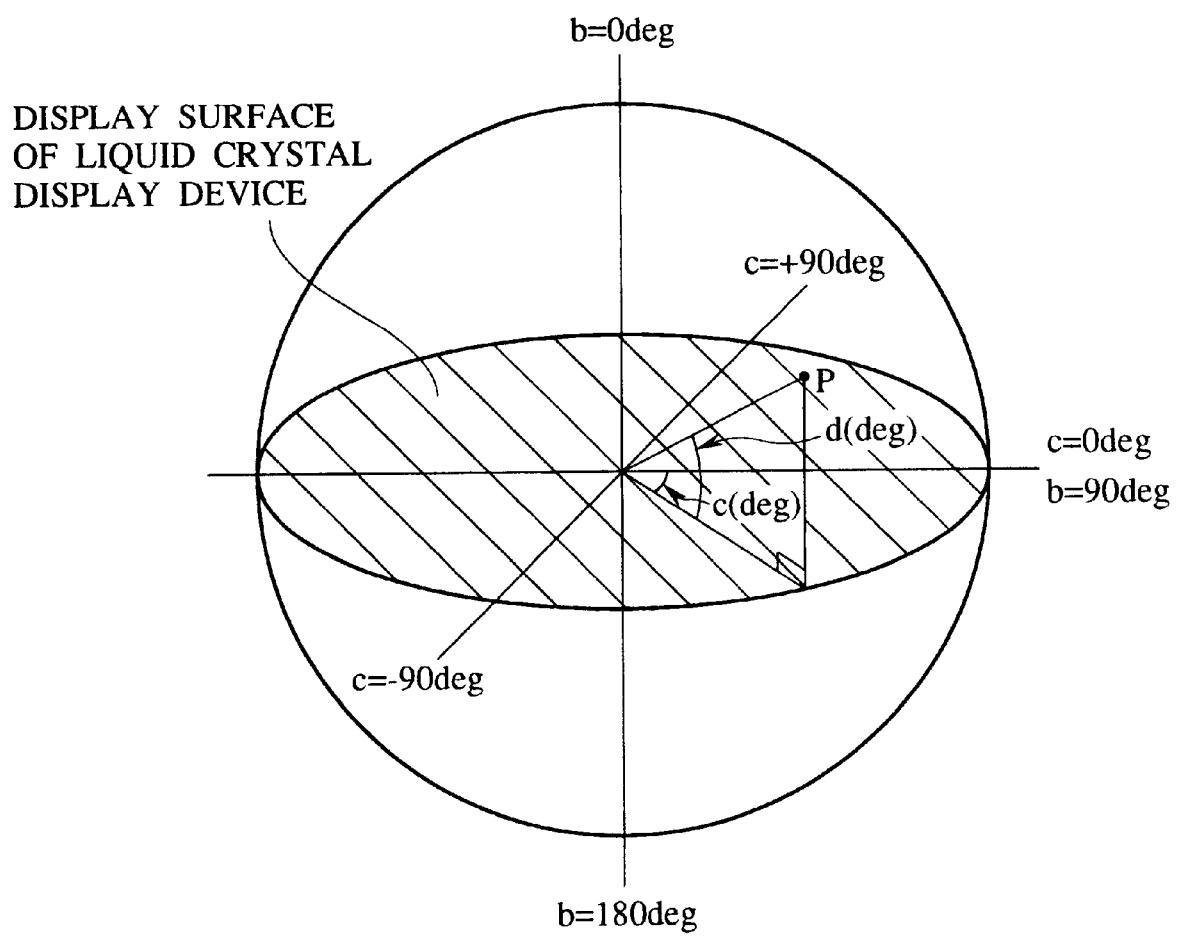
FIG. 41 is a view explaining orientations of the liquid crystal display device.
Figure 43A:
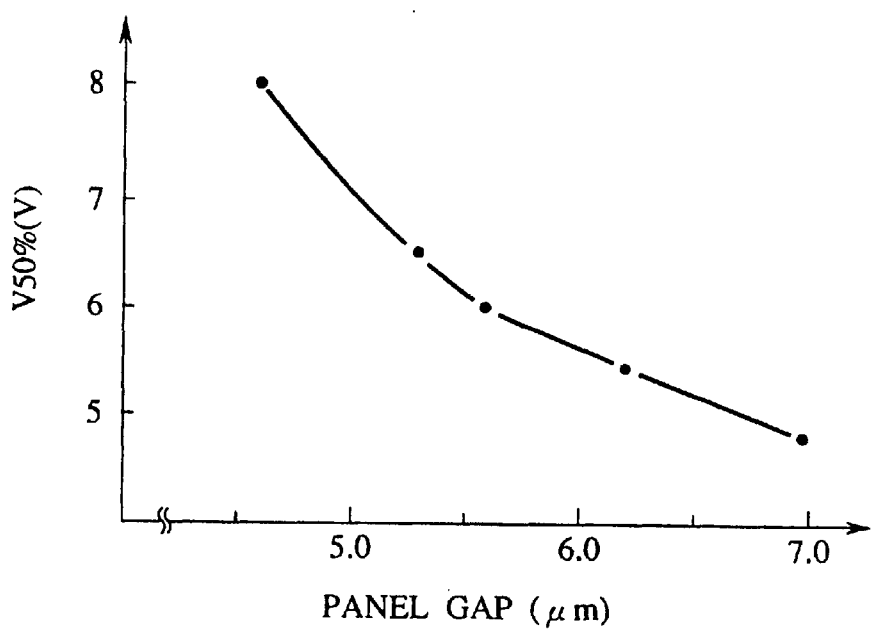
FIGS. 43A and 43B are graphs of relationships between a thickness of a liquid crystal layer of a liquid crystal display device using in-plane switching (IPS) and a gap between the electrodes, and a drive voltage.
Figure 43B:
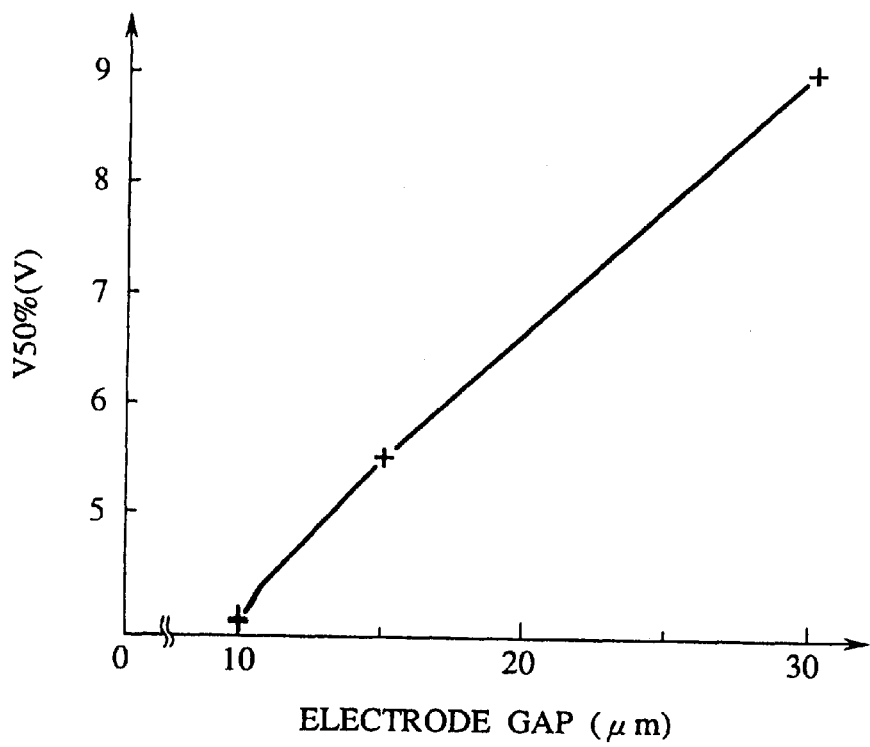

Bearing angles b and c represents directions in which the display screens of the liquid crystal display devices were watched. As shown in FIG. 41, an angle b indicates a angle to the display screen of the liquid crystal display device. When an angle b is 0°, a watching direction is vertically upper. An angle b is 90°, a watching direction is along the display screen. When an angle b is 180°, a watching direction is perpendicular to the back of the display screen.

An angle c represents an in-plane angle of the display screen of the liquid crystal display device. When an angle c is 0, a watching direction is from the right with respect to the display screen. When an angle c is +90°, a watching direction is from above with respect to the display screen. When an angle c is −90°, a watching direction is from below with respect to the display screen.

The measured results shown in FIGS. 36 to 40 show that view angles equal to or larger than those by in-plane switching (IPS) can be obtained, and the wide view angles are uniform in all directions.

What is claimed is:

1. A liquid crystal display device including a first substrate and a second substrate which are opposed to each other, and liquid crystal sealed between the first and the second substrates, wherein light transmission of the liquid crystal is controlled by electrically controlling double refraction of the liquid crystal, the liquid crystal display device comprising:

a first electrode formed on the first substrate and having an effective portion formed on a part of a picture element region such that another part of the picture element region lacks the effective portion of the first electrode; and a second electrode formed on the second substrate and having an effective portion formed on a part of the picture element region such that another part of the picture element region lacks the effective portion of the second electrode, the effective portion of the second electrode being offset with respect to the effective portion of the first electrode in the picture element region;

wherein when a voltage is applied between the first and the second electrodes, the picture element region is divided into at least two regions, a first region and a second region, whereby an electric field distribution in the liquid crystal of the first region and an electric field distribution in the liquid crystal of the second region are different from each other, and an orientation of the liquid crystal in the first region and an orientation of the liquid crystal in the second region are also different from each other.

2. A liquid crystal display device according to claim 1, wherein the first electrode is formed on the first substrate within the picture element region; and the second electrode is formed on the second substrate along an outer edge of the picture element region.

3. A liquid crystal display device according to claim 1, wherein the first electrode is formed on the first substrate within the picture element region; and the second electrode is formed on the second substrate along outer edges of the picture element region that are opposed to each other.

4. A liquid crystal display device according to claim 1, wherein the picture element region is substantially rectangular;

the first electrode is formed on the first substrate along a line traversing the picture element region; and the second electrode is formed on the second substrate along an outer edge of the picture element region.

5. A liquid crystal display device according to claim 1, wherein
the picture element region is substantially rectangular;
the first electrode is formed on the first substrate along a line traversing the picture element region; and
the second electrode is formed on the second substrate along outer edges of the picture element region that are opposed to each other.

6. A liquid crystal display device according to claim 1, wherein
the first electrode is formed on the first substrate along a first line; and
the second electrode is formed on the second substrate along a second line intersecting the first line.

7. A liquid crystal display device according to claim 6, wherein
the prescribed region is substantially rectangular;
the first electrode is formed on the first substrate along one outer edge of the prescribed region; and
the second electrode is formed on the second substrate along a line substantially traversing the approximate center of the prescribed region and intersecting one outer edge thereof.

8. A liquid crystal display device according to claim 6, wherein
orientation of the liquid crystal is homogeneous; and
the orientation of the liquid crystal is substantially parallel with or normal to a direction of the first electrode and/or the second electrode.

9. A liquid crystal display device according to claim 6, wherein
without a voltage applied between the first and the second electrodes, an orientation of the liquid crystal is substantially vertical to the first substrate and/or the second substrate.

10. A liquid crystal display device according to claim 6, wherein
the prescribed region includes an opposed region where the first and the second electrodes are opposed to each other with the liquid crystal therebetween, and a non-opposed region where the first and the second electrodes are not opposed to each other; and
the opposed region is smaller than the non-opposed region.

11. A liquid crystal display device according to claim 6, wherein
when a refractive index anisotropy of the liquid crystal is represented by Δn, and a thickness of the liquid crystal is represented by d, Δnxd is substantially below 0.5 and above 0.25.

12. A liquid crystal display device according to claim 6, wherein
the first electrode and/or the second electrode is formed of a black matrix layer sealing transmitted light.

13. A liquid crystal device according to claim 1, wherein
orientation of the liquid crystal is homogeneous; and
the orientation of the liquid crystal is substantially parallel with or normal to a direction of the first electrode and/or the second electrode.

14. A liquid crystal display device according to claim 1, wherein
without a voltage applied between the first and the second electrodes, an orientation of the liquid crystal is substantially vertical to the first substrate and/or the second substrate.

15. A liquid crystal display device according to claim 1, wherein
the prescribed region includes an opposed region where the first and the second electrodes are opposed to each other with the liquid crystal therebetween, and a non-opposed region where the first and the second electrodes are not opposed to each other; and
the opposed region is smaller than the non-opposed region.

16. A liquid crystal display device according to claim 1, wherein
when a refractive index anisotropy of the liquid crystal is represented by Δn, and a thickness of the liquid crystal is represented by d, Δnxd is substantially below 0.5 and above 0.25.

17. A liquid crystal display device according to claim 1, wherein
the first electrode and/or the second electrode is formed of a black matrix layer sealing transmitted light.

18. A liquid crystal display device according to claim 17, wherein
a filter layer is formed on the black matrix layer on the first electrode and/or the second substrate; and
the first electrode and/or the second electrode is the black matrix layer exposed in an opening in the filter layer.

19. A liquid crystal display device including a first substrate and a second substrate which are opposed to each other, and liquid crystal sealed between the first and the second substrates, the liquid crystal display device comprising:
a first electrode formed on the first substrate at a prescribed position in a prescribed region; and
a second electrode formed on the second substrate at a position which is offset with respect to the first electrode in the prescribed region;
wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;
wherein the first electrode is formed on the first substrate within the prescribed region;
the second electrode is formed on the second substrate along outer edges of the prescribed region that are opposed to each other;
a third electrode is formed on the second substrate between the second electrodes that are opposed to each other; and
the first electrode and the third electrode have substantially the same potential, and wherein a voltage is applied between the first and the third electrodes, and the second electrode.

20. A liquid crystal display device including a first substrate and a second substrate which are opposed to each other, and liquid crystal sealed between the first and the second substrates, the liquid crystal display device comprising:
a first electrode formed on the first substrate at a prescribed position in a prescribed region: and
a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the prescribed region is substantially rectangular;

the first electrode is formed on the first substrate along a line traversing the prescribed region;

the second electrode is formed on the second substrate along outer edges of the prescribed region that are opposed to each other;

a third electrode is formed on the second substrate between the second electrodes that are opposed to each other; and the first electrode and the third electrode have substantially the same potential, and wherein a voltage is applied between the first and the third electrodes, and the second electrode.

21. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the first electrode is formed on the first substrate within the prescribed region;

the second electrode is formed on the second substrate along an outer edge of the prescribed region; and a third electrode is formed on the second substrate at a position enclosed by the second electrode; and the first and the third electrodes have substantially the same potential, and wherein a voltage is applied between the first and the third electrodes, and the second electrode.

22. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the prescribed region is substantially rectangular;

the first electrode is formed on the first substrate along a line traversing the prescribed region;

the second electrode is formed on the second substrate along an outer edge of the prescribed region; and a third electrode is formed on the second substrate at a position enclosed by the second electrode; and the first and the third electrodes have substantially the same potential, and wherein a voltage is applied between the first and the third electrodes, and the second electrode.

23. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the prescribed region is substantially rectangular;

the first electrode is formed on the first substrate along a first line slantly traversing the prescribed region; and the second electrode is formed on the second substrate along a second line slantly traversing the prescribed region and intersecting the first line.

24. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the prescribed region is substantially rectangular;

the first electrode is formed on the first substrate along a first line traversing the prescribed region and extending substantially in parallelism with one outer edge; and the second electrode is formed on the second substrate along the second line traversing the prescribed region and extending substantially perpendicular to the first line.

25. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein on one side of a parting line dividing the first and the second regions, the first substrate is treated for orientation at a first pre-tilt angle while the second substrate is treated for orientation at a second pre-tilt angle larger than the first pre-tilt angle;

on the other side of the parting line dividing the first and the second regions, the first substrate is treated for orientation at a third pre-tilt angle while the second substrate is treated for orientation at a fourth pre-tilt angle smaller than the third pre-tilt angle;

when a voltage is applied between the first and the second electrodes, an orientation of the liquid crystal in the first region is different between the two regions divided by the parting line, and an orientation of the liquid crystal in the second region is different between the two regions divided by the parting line.

26. A liquid crystal display device according to claim 25, wherein the first and the fourth pre-tilt angles are substantially the same; and the second and the third pre-tilt angles are substantially the same.

27. A liquid crystal display device according to claim 26, wherein the prescribed region is substantially rectangular;

the prescribed region is quartered by a boundary line between the first and the second regions and the parting line dividing the first and the second regions; and when a voltage is applied between the first and the second electrodes, an orientation of liquid crystal in the respective divided regions is radial with respect to the intersection of the boundary line and the parting line.

28. A liquid crystal display device according to claim 25, wherein the prescribed region is substantially rectangular;

the prescribed region is quartered by a boundary line between the first and the second regions and the parting line dividing the first and the second regions; and when a voltage is applied between the first and the second electrodes, an orientation of liquid crystal in the respective divided regions is radial with respect to the intersection of the boundary line and the parting line.

29. A liquid crystal display device according to claim 25, wherein orientation of the liquid crystal is homogeneous; and the orientation of the liquid crystal is substantially parallel with or normal to a direction of the first electrode and/or the second electrode.

30. A liquid crystal display device according to claim 25, wherein without a voltage applied between the first and the second electrodes, an orientation of the liquid crystal is substantially vertical to the first substrate and/or the second substrate.

31. A liquid crystal display device according to claim 25, wherein the prescribed region includes an opposed region where the first and the second electrodes are opposed to each other with the liquid crystal therebetween, and a non-opposed region where the first and the second electrodes are not opposed to each other; and the opposed region is smaller than the non-opposed region.

32. A liquid crystal display device according to claim 25, wherein when a refractive index anisotropy of the liquid crystal is represented by $\Delta n$, and a thickness of the liquid crystal is represented by d, $\Delta n \times d$ is substantially below 0.5 and above 0.25.

33. A liquid crystal display device according to claim 25, wherein the prescribed region is a picture element region.

34. A liquid crystal display device according to claim 25, wherein the first electrode and/or the second electrode is formed of a black matrix layer sealing transmitted light.

35. A liquid crystal display device including a first substrate and a second substrate which are opposed to each other, and liquid crystal sealed between the first and the second substrates, the liquid crystal display device comprising:

a first electrode formed on the first substrate at a prescribed position in a prescribed region; and a second electrode formed on the second substrate at a position which is offset with respect to the first electrode in the prescribed region;

wherein when a voltage is applied between the first and the second electrodes, the prescribed region is divided into at least two regions, a first region and a second region, whereby an electric field distribution in the liquid crystal at the first region and an electric field distribution in the liquid crystal at the second region are different from each other, and an orientation of the liquid crystal in the first region and an orientation of the liquid crystal in the second region are also different from each other;

wherein the first electrode is formed on the first substrate along the first line;

the second electrode is formed on the second substrate along a second line intersecting the first line;

wherein on one side of a parting line dividing the first and the second regions, the first substrate is treated for orientation at a first pre-tilt angle while the second substrate is treated for orientation at a second pre-tilt angle larger than the first pre-tilt angle;

on the other side of the parting line dividing the first and the second region, the first substrate is treated for orientation at a third pre-tilt angle while the second substrate is treated for orientation at a fourth pre-tilt angle smaller than the third pre-tilt angle;

when a voltage is applied between the first and the second electrodes, an orientation of the liquid crystal in the first region is different between the two regions divided by the parting line, and an orientation of the liquid crystal in the second region is different between the two regions divided by the parting line.

36. A liquid crystal display device according to claim 35, wherein the first and the fourth pre-tilt angles are substantially the same; and the second and the third pre-tilt angles are substantially the same.

* * * * *